United States Patent
Sokolov

Patent Number: 5,954,801
Date of Patent: Sep. 21, 1999

[54] CACHE CONTROLLED DISK DRIVE SYSTEM FOR ADAPTIVELY EXITING A HYPER RANDOM MODE WHEN EITHER A CACHE HIT OCCURS OR A SEQUENTIAL COMMAND IS DETECTED

[75] Inventor: Daniel John Sokolov, Rochester, Minn.

[73] Assignee: Western Digital Corporation, Irvine, Calif.

[21] Appl. No.: 08/882,761

[22] Filed: Jun. 26, 1997

Related U.S. Application Data

[63] Continuation of application No. 08/864,525, May 28, 1997.

[51] Int. Cl.$^6$ ............................. G06F 13/14; G06F 13/12
[52] U.S. Cl. ............................ 710/5; 710/6; 710/52; 711/129
[58] Field of Search ................ 395/200.45, 287, 395/375, 840, 872; 707/101; 711/137, 129; 710/5, 6, 52

[56] References Cited

U.S. PATENT DOCUMENTS

| | | | |
|---|---|---|---|
| 4,517,641 | 5/1985 | Pinheiro | 395/840 |
| 5,146,578 | 9/1992 | Zangenehpour | 711/137 |
| 5,377,336 | 12/1994 | Eickemeyer et al. | 395/375 |
| 5,444,847 | 8/1995 | Iitsuka | 395/287 |
| 5,448,709 | 9/1995 | Chandler et al. | 395/872 |
| 5,485,609 | 1/1996 | Vitter et al. | 707/101 |
| 5,664,147 | 9/1997 | Mayfield | 711/137 |
| 5,689,727 | 11/1997 | Bonke et al. | 395/840 |
| 5,764,905 | 6/1998 | Catozzi et al. | 395/200.45 |

*Primary Examiner*—Thomas C. Lee
*Assistant Examiner*—Ilwoo Park
*Attorney, Agent, or Firm*—Leo J. Young; Milad G. Shara

[57] ABSTRACT

A method provides for managing commands received by a disk drive via an intelligent interface from a host. The drive has a magnetic disk, and a cache with the cache being divisible into a number of segments. The cache employs a cache control structure including a cache environment variable. The drive receives a first command that requests data and a second command. The method comprises the steps of: processing the first command and caching only the requested data from the disk drive; and processing the second command and caching prefetched data for the second command if the second command is determined to be sequential with the first command.

15 Claims, 66 Drawing Sheets

SYSTEM ARCHITECTURE

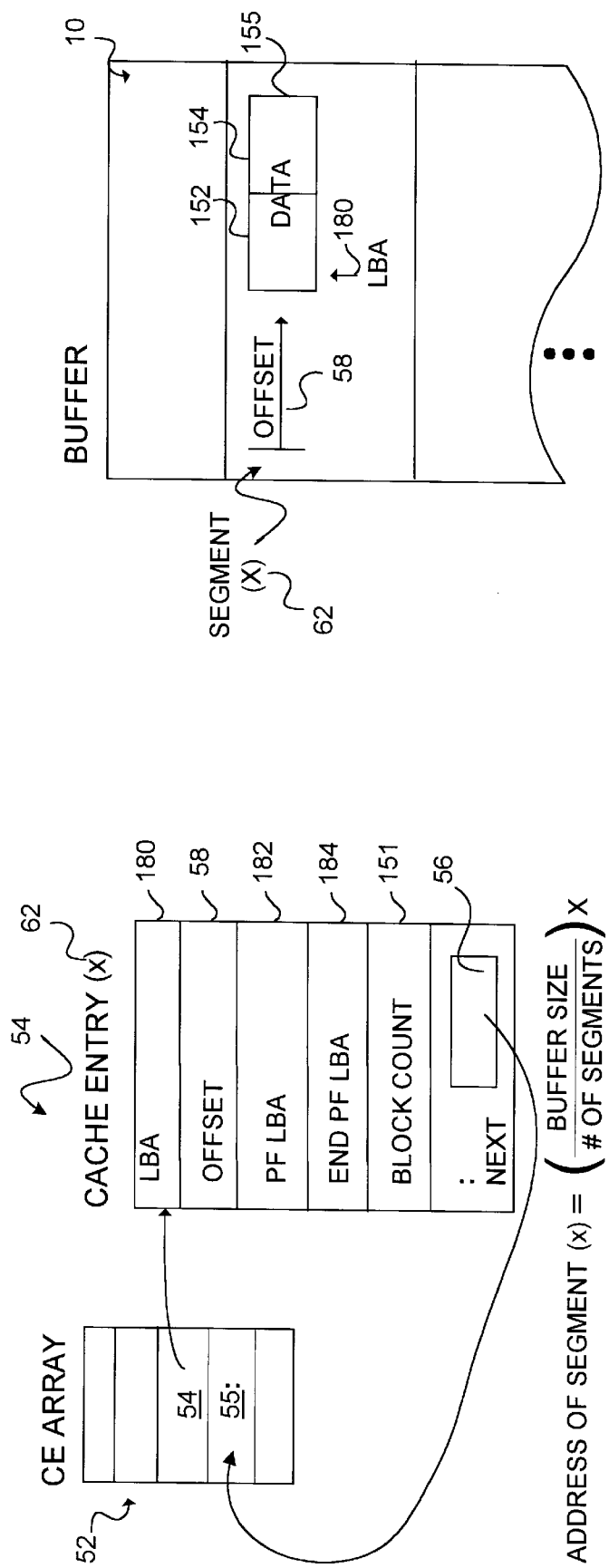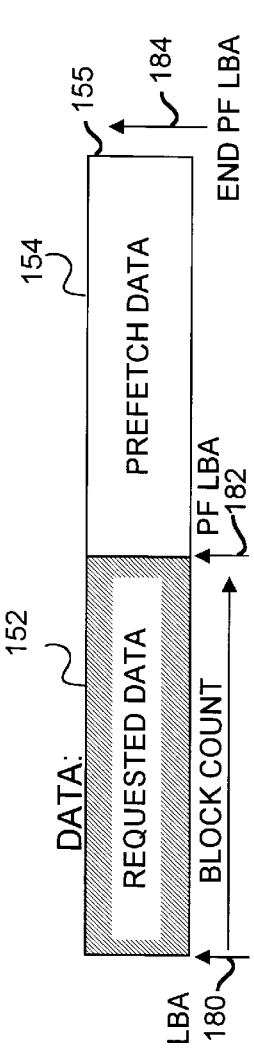

COMMAND MANAGER 2

PREFETCH WAIT

CHECK PREFETCH 2

CHECK PREFETCH 6

INITCACHE 2

UPDATE CACHE1

UPDATE CACHE 5

UPDATECACHE9

CACHE CONTROLLED DISK DRIVE SYSTEM FOR ADAPTIVELY EXITING A HYPER RANDOM MODE WHEN EITHER A CACHE HIT OCCURS OR A SEQUENTIAL COMMAND IS DETECTED

REFERENCE TO RELATED APPLICATION

This application is a continuation of parent application Ser. No. 08/864,525, filed May 28, 1997, titled "DISK DRIVE CACHE SYSTEM" in the names of M. Hicken, S. Howe, D. Sokolov, T. Swatosh, and J. Williams still pending, and assigned to the assignee hereof. The entire disclosure of the parent application, including the appendices thereof (Appendix Listings 1, 2, 3, 4, and 5), is hereby incorporated by reference herein.

NOTICE RE COPYRIGHT

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

An intelligent hard disk drive employs a buffer memory, known as a cache or a cache memory, to buffer data transferred to and from a host computer. The cache may be divided into multiple segments. The disk drive communicates with the host via a host interface. The host interface in some instances may process commands and data associated with those commands independently. One such intelligent interface is the small computer system interface (SCSI).

In SCSI the host computer is known as the initiator and the disk drive is known as the target. The initiator sends a command to the target and the target must determine what appropriate action to take based on the type of command. SCSI commands are communicated by sending a command descriptor block during a command phase. SCSI supports a number of commands including a read command and read extended command, a write command and a write extended command. One of the SCSI commands, the format unit command descriptor block, formats the drive medium into initiator addressable logical blocks. Each logical block has a logical block address (lba). SCSI also includes a caching page that can define parameters associated with the drive's cache.

A read command requests that the drive transfer data to the initiator. The most recent data written in the logical block address is returned. The logical block address specifies the address where the read operation is to begin. A transfer length specifies the number of contiguous logical blocks of data to be transferred to the initiator.

A read extended command also requests that the drive transfer the data to the initiator. The most recent data value written in the logical block address is returned. In the read extended command, a disable page out DPO value indicates that the drive assigns the data returned by this command the lowest priority for cache retention. A force unit access FUA value indicates that the drive accesses the media prior to returning GOOD status. Data is accessed from the media not the cache. As in the read command, the logical block address specifies where the read operation is to begin and the transfer length specifies the number of contiguous logical blocks of data to be transferred to the initiator.

A seek command requests the drive to seek to a specified logical block address. The logical block address specifies the address where the drive seeks to.

A write command requests that the drive write data transferred from the initiator to the drive media. A logical block address specifies the address where the write operation is to begin and the transfer length specifies the number of contiguous logical blocks of data to be transferred from the initiator.

A write extended command requests that the drive write data transferred from the initiator to the media. A disable page out DPO value indicates that the drive assigns the data transfer by the initiator the lowest priority for cache retention. A force unit access FUA value indicates that the drive writes the data to the media prior to returning a GOOD status. Data is written to the media and is not write cached. The logical block address specifies where the write operation is to begin.

The disk drive responds to these and other types of commands as multiple commands are received from the host computer. The way in which the disk drive manages multiple commands and the data associated with these commands directly affects the performance of the disk drive. Also certain features of the disk drive, including the way data is stored on the media and the nature of media access, afford an opportunity to increase drive performance.

SUMMARY OF THE INVENTION

This invention can be regarded as a method for managing commands received by a disk drive via an intelligent interface from a host. The drive has a magnetic disk, and a cache with the cache being divisible into a number of segments. The cache employs a cache control structure including a cache environment variable. The drive receives a first command that requests data and a second command. The method comprises the steps of: processing the first command and caching only the requested data from the disk drive; and processing the second command and caching prefetched data for the second command if the second command is determined to be sequential with the first command.

According to preferred features, the first command requests data with a logical block address range and the second command requests data with a starting logical block address. The method preferably further comprises the step of determining the second command to be sequential with the first command by checking if the starting logical block address is contiguous with the logical block address range. Preferably, the method also comprises the step of initializing the cache environment variable to a hyper random mode which indicates that commands from the host are random, and the step of changing the cache environment variable to sequential mode after the second command is determined to be sequential with the first command.

The invention can independently be regarded as a method for processing multiple commands from the host. According to the method, the cache control structure includes a cache entry table, a buffer counter, a token that allows use of the disk drive, a host pointer and a disk pointer. The method comprises the steps of:

a) selecting a first command from the plurality of commands;
 b) adjusting the cache control structure for the first command;
 c) obtaining the token for disk usage;
 d) starting data transfer to the host if the first command is a read command and starting data transfer from the host if the first command is a write command;

e) determining a future state of the cache and adjusting the cache control structure to reflect the future state of the cache;

f) selecting a next command from the plurality of commands; and g) trying to start the next command before the first command completes.

According to preferred features, the plurality of commands from the host are represented by a command descriptor block following the SCSI standard. the first command is represented by a task control block. The task control block preferably comprises a segmentOffset, representing how far into a segment the start of the requested data begins, a block size, representing the number of bytes in a block, a xferCount, representing the number of bytes being transferred by the host programs to or from the cache, xferOffset, representing where in the cache the bytes are being transferred to or from, and a segmentNumber, representing the segment being transferred.

Preferably, the host pointer is an internal variable in the host side programs and is controlled by setting the xferOffset variable in the task control block structure. The step of obtaining a token for disk usage further includes setting up a disk pointer. The disk pointer is an internal variable in disk side programs that is controlled by setting the xferOffset in the task control block structure and bufcnt. The step of adjusting the cache control structure for the first command further comprises the steps of:

a) adjusting the host pointer to track data being transferred to or from the host; and b) determining a segment of the cache to allocate to the command.

The step of determining the segment to allocate to the command preferably comprises the steps of:

a) selecting a segment from the number of cache segments that is not active or is empty;

b) waiting for a minimum prefetch to complete;

c) waiting for a write operation to complete;

d) checking for a cache hit in the segment e) if there is a cache hit checking a hit count and setting the cache entry table for a virtual hit if the hit count equals zero;

f) if there is not a cache hit setting up the cache entry table for a new access; and g) resetting a scan count and activating the segment.

BRIEF DESCRIPTION OF THE DRAWINGS

FIG. 1D shows a cache buffer showing the cache entry for a segment.

FIG. 1E shows an example cache divided into a multiple number of segments.

FIG. 1F shows an example cache segment.

DETAILED DESCRIPTION OF THE PREFERRED EMBODIMENT

Figure 1A:
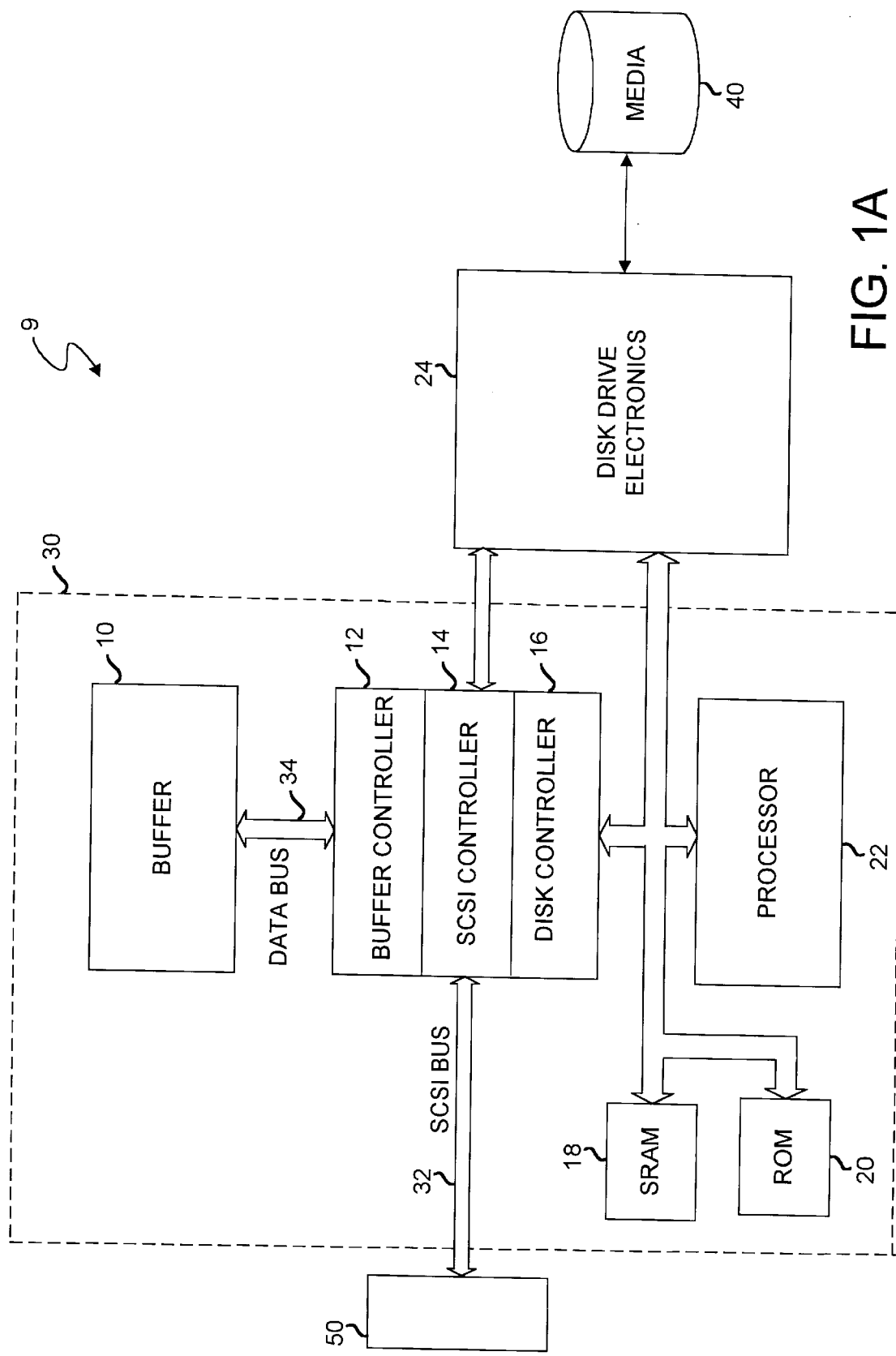
FIG. 1A shows a hard disk drive embodying the invention connected to a host or multiple host computers.

Refer now to FIG. 1A which shows a hard disk drive embodying this invention connected to a host computer or host computers 50. The caching system of the invention will work with one or multiple initiators. The disk drive 9 comprises interface and caching electronics 30 connected to disk drive electronics 24 that control data transfers to and from the drive media 40. A buffer memory 10 interfaces to buffer controller 12 through data bus 34. A SCSI controller 14 interfaces to the buffer controller 12 and controls the SCSI bus 32 which interfaces to a host computer 50 or multiple host computers 50. A disk controller 16 interfaces to a microprocessor 22, the microprocessor 22 connects to SRAM 18 and ROM 20. Disk drive electronics 24 interface to the drive media 40 to control reading and writing of information to the media 40.

The invention provides a caching system that provides a set of cache management software functions executed by microprocessor 22. The cache management software functions provide services to a command manager program, disk side programs, and host side programs all executed by microprocessor 22. The cache management functions manage the segments and data in the buffer memory 10 associated with read and write commands from the host computer 50.

The caching system may be written in the C/C++ programming language and implemented in the disk's firmware located in ROM 20 which contains the basic caching functions and the utilities to support those functions respectively. An example of the methods of the invention is shown in a set of C/C++ programs set forth in the above-identified Appendix incorporated by reference herein.

TABLE 1

Cache Environment

| cacheEnv | Description |
|---|---|
| CH_ENV_RANDOM | The segments are all randomly accessing. |
| CH_ENV_SEQUENTIAL | Most of the segments are sequential. |
| CH_ENV_REPETITIVE | Most of the segments are repetitive. |
| CH_ENV_SCAN_FIRST | Many cache hits have occurred so it is better to scan the cache than start the seek. |
| CH_ENV_HYPER | Accesses are Random and Prefetching is disabled. |
| CH_ENV_ADC_MINPF | Adaptive Minimum Prefetching |
| CH_ENV_ADC_MAXPF | Adaptive Maximum Prefetching |
| CH_ENV_ADC_NUMCS | Adaptive Number of Cache Segments |
| CH_ENV_ADC_MASK | Adaptive Mask for Resetting Random |

The invention maintains a cache environment represented by the cacheEnv variable. The different environment indicator constants for cacheEnv are shown in Table 1. These constants indicate how data is being accessed and are used by various aspects of the invention to control caching functions including adaptive caching. These states change depending on the history of cache memory 10 access. Table 1 also shows the meaning of each constant.

The cache 10 is segmented into a multiple number of segments. FIG. 1E shows an example cache 10 divided into a multiple number of segments, and shows in further detail an example of the xth segment 62. In one example, the cache may be segmented into a power of two number of segments. In another example, the cache may be divided into one or up to sixteen segments of equal size. The caching system manages data in these segments and provides access control to these segments. The address of the xth segment 62 equals the buffer size divided by the number of segments times x; address of segment(x)=x*(bufferSize/number of segments). The address of the cache entry table's first lba, segment start lba 180, for the xth segment 62 equals the address of the x segment 62 plus the offset 58 times the sector size; address of ce[x].lba=(address of segment(x))+(offset*sector size).

Data structures are maintained for the segments that contain information about the data contained in each segment. FIG. 1D shows an example of a cache entry array 52 data structure with an example cache entry 54. These structures referenced through a linked list 52 in order of priority. For example pointer 56 points to the next segment 55 in cache entry table 52. High priority indicates most recent use and likelihood of subsequent cache hits. These segments are at the top of the list 52. Low priority indicates segments that have not been accessed recently, or do not have data, and are at the bottom of the priority list 52. Scanning the cache for a cache hit includes walking through the priority list 52 looking for a data match.

TABLE 2

Cache Entry Segment State

| Segment State | Description |
|---|---|
| CH_SEG_EMPTY | All segment data are meaningless except linked list pointer. If not empty segment can be used. |
| CH_SEG_ACTIVE | Something is being done with the segment. |
| CH_SEG_UNSYNC | Data in segment that is to be written to disk; this is the 'dirty bit' |

Table 2 shows state values for each cache segment. The segment state is used when selecting a segment from the priority list. The CH_SEG_EMPTY is used as a delimiter in the priority list to indicate that all the segments beyond this segment are empty.

TABLE 3

Cache Entry Structure

| | |
|---|---|
| lba | Logical block address for first piece of valid data in the segment |
| offset | Number of blocks relative to the start of the segment address of lba in segment relative to the beginning of the segment |
| pflba | lba for prefetch |
| endpflba | lba for last block in prefetch area |
| blockCount | pflba - lba |
| hitCount | Number of valid blocks of requested data contained in the cache |
| state | State of the segment |
| acctype | Updated each time the segment is locked during a scan |

Refer now to FIG. 1E which shows a schematic of the cache 10 with the associated xth segment 62, also referred to in FIG. 1D. Table 3 shows each element of the cache entry structure of the invention. The cache entry array 52 is comprised of multiple entries each representing one cache entry. One example entry is cache entry 54. Cache entry 54 is comprised of a plurality of data elements including a logical block address 180, an offset 58, a prefetch logical block address 182, an end prefetch logical block address 184, a blockCount 151 and a pointer 56 to the next cache entry 55 in the priority list 52. The cache entry data, also illustrated in FIG. 1D shows the cache buffer 10 showing the cache entry for xth segment 62 with offset 58 pointing to the beginning of data 155 in the buffer memory 10. The logical block address 180 of the data 155 is located at a memory location from the beginning of the segment 62 plus offset 58. The structure of the data element in the cache 10 is shown in FIG. 1F. The cache data 155 comprises requested data 152 and prefetch data 154. The logical block address of the first block of requested data 180 is shown at the left most of the cache data. The first logical block address 182 in the prefetch data begins the prefetch data area 154. The requested data 152 spans a blockCount 151 number of logical block addresses. The end of the prefetch 184 is shown at the next contiguous block following the prefetch data 154.

TABLE 4

Cache Access Types

| Cache Access Types | Description |
|---|---|
| CH_ACC_NEW | Random access; the default for new segments. |
| CH_ACC_REP | If repeating requests have same LBA, the segment is being repeatedly accessed. |
| CH_ACC_SREP | If a segment has a LBA and blockCount −x, the same as a request LBA. |
| CH_ACC_SEQ | If a segment has a LBA + blockCount the same as a request LBA. |
| CH_ACC_RSEQ | If a segment has a LBA + blockCount + x, the same as a request LBA. |
| CH_ACC_FULL | If a segment has a LBA range that contains a request's range. |
| CH_ACC_PREF | If a segment has an LBA range and prefetch such that the prefetch range contains a requests LBA. |

Figure 1B:
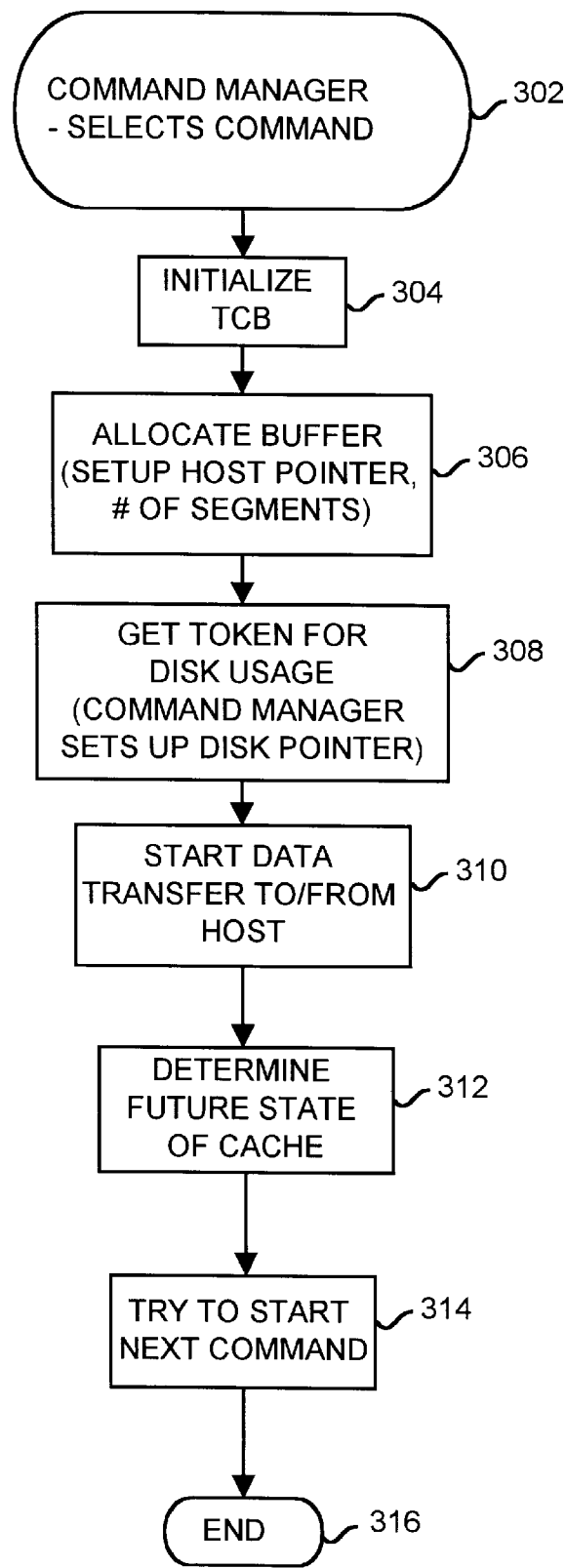
FIG. 1B shows a method of the invention to process commands from a host.
Figure 1C:
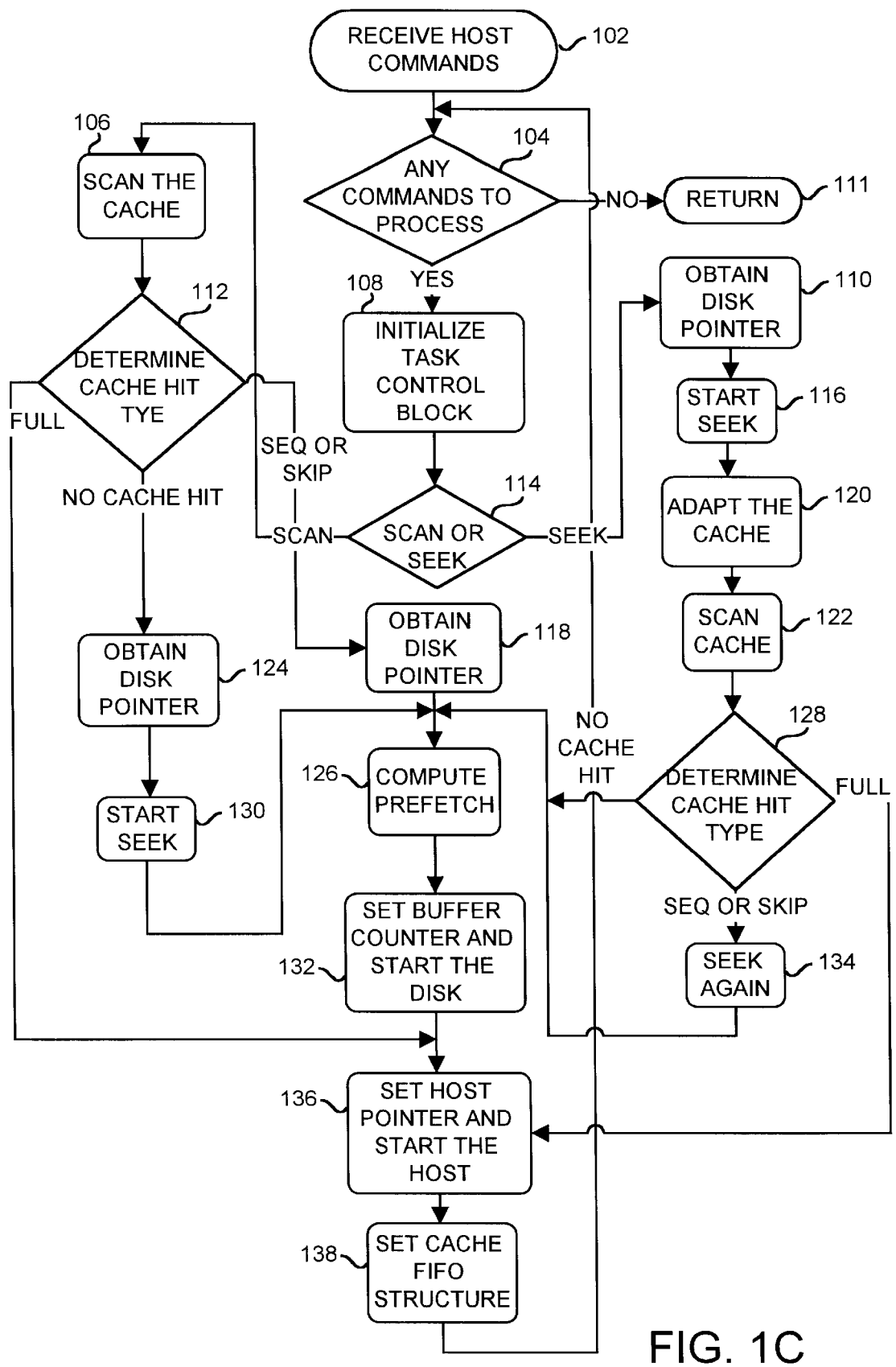
FIG. 1C shows a method of the invention to process commands from a host.
Figure 1G:
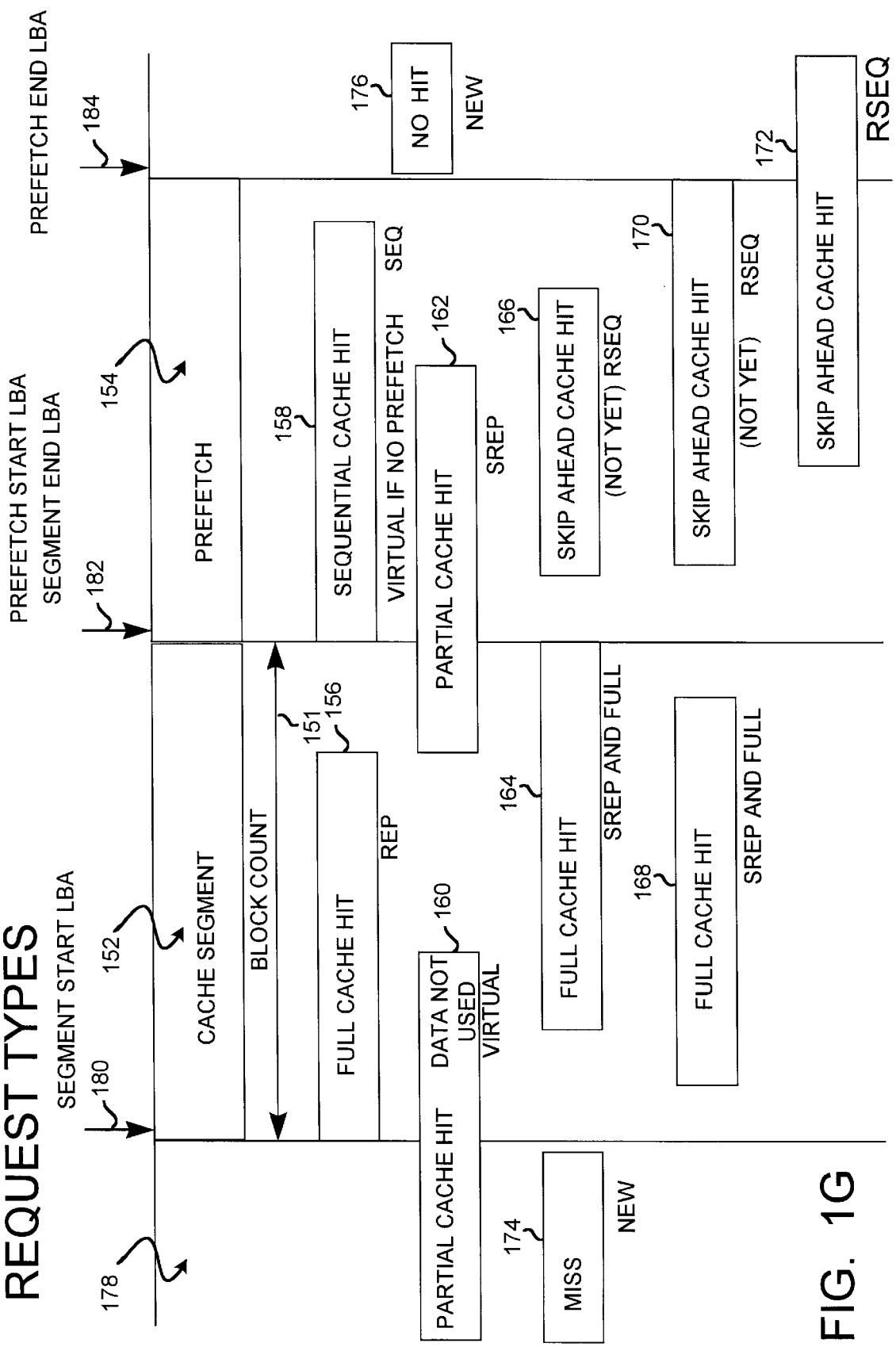
FIG. 1G shows the request types in relation to the cache segment and prefetch areas of cache memory.

Now refer to FIG. 1G which shows the request types in relation to the cache segment and prefetch areas of the buffer memory. Table 4 lists the cache access types. The buffer memory 10 contains an address space 178 which contains a cache segment or multiple cache segments. A representative cache segment 152 is shown with its associated prefetch area 154. The cache segment has a logical blockCount 151 and starts with the segment start logical block address 180 and ends with the block prior to the segment end logical block address 182. The prefetch area begins with the segment end logical block address 182, which is also referred to as the prefetch start logical block address 182, and ends with the prefetch end logical block address 184. The requested data, therefore, extends over a logical block address range and the cache segments prefetch area extends over a contiguous logical block address range. A request can fall in various portions of these ranges and the different types of requests and their associated cache access types are described herein.

A full cache access request contains data fully in the cache segment as shown in full cache access request 156, full cache access request 164, and full cache access request 168. The access types for these requests are different. For full cache access request 156, the access type is known as repeating or CH_ACC_REP. For full cache access requests 164 and 168, the access type is known as semi-repeating or SREP. The next type of request is the partial cache access which is a virtual access because the data is not used. Partial cache access 160 is shown spanning the beginning of the cache segment. Miss request 174 and no-hit request 176 fall outside of the cache segment address range and the prefetch range and are designated as cache access new or CH_ACC_NEW. A sequential cache access request is a request where the data falls in the prefetch area of the cache segment at the prefetch start lba and continues into the prefetch area. The sequential cache access request 158 has a cache access type of CH_ACC_SEQ for sequential. Request 158 is considered virtual if there is no prefetch, for example when the disk drive 9 is in hyper random mode or no prefetch blocks have been read into the cache 10 by the disk side programs yet. A further type of request is the partial cache access request 162 known as the cache access type srep for semi-repeat with the cache access code of CH_ACC_SREP. The skip ahead cache access is a request that falls in the prefetch area but does not include the start lba of the prefetch area, prefetch start lba 182. Skip ahead cache access request 166 and skip ahead cache access request 170 have a cache access type of CH_ACC_RSEQ. These types of requests may also be known as the "not yet" cache access types if the prefetch does not currently contain data included in the request but may contain data included in the request in the future. A skip ahead cache access request 172 which exceeds the prefetch lba is also shown with a cache access type of CH_ACC_RSEQ.

Segments of the cache 10 are selected and deselected when buffer space is required for purposes other than normal data reads and writes. In these cases, there is no data to be maintained by the caching system. Selecting a segment removes the segment from the priority list 52, preventing the segment from being scanned and preventing other attempts to use the same segment. Deselecting a segment returns the segment to the priority list 52 as an empty segment so the segment can be used in subsequent scans for data or selected for other purposes.

The caching system maintains the priority list 52 to preserve a priority based order. This priority is based on a most recently used order with sequential accesses and cache hits being given extra attention.

When a read or write command begins executing in the disk drive 9, a segment is normally chosen for use by scanning the cache 10. Once the command has progressed, the caching state variables are updated. At that point, the segment is removed from the list 52 and added back in as a high priority segment at the beginning of the list 52. Sequentially accessing segments are considered the most important and are kept at the top of the priority list 52. A counter is kept for each segment that keeps track of how many commands have gone by since the segment was used. Once the counter exceeds a predetermined value, for example when the counter exceeds a value stored in the maxmisses variable, the number of segments plus the number of sequential streams divided by two, the segment is taken out of the scan path and the segment is placed at the bottom of the list 52 as a free segment and the data in that segment is discarded.

For those commands where a seek has been started and a scan has not yet been done, the invention adaptively manages the cache. After a predetermined number of commands, approximately every two hundred, a determination is made as to whether the number of segments should be changed. The caching system attempts to keep the number of segments low enough so that the number of blocks per segment is at least twice the block count of recent commands so that two commands worth of data can be prefetched when possible. The number of segments is adaptively managed by the invention so that there are more segments than sequential streams. For example in one embodiment if a determination is made that the number of segments should be adjusted, then the number of segments is adjusted by one factor at a time, for example doubled or halved but it is to be understood that the number of segments may be adjusted by any number.

For every read command the invention determines how much data to prefetch after the requested data is retrieved. When the adaptive prefetching is enabled and Mode Page 8, as described below, Min and Max Prefetch are 0xFFFF, the min and max prefetch are adaptively determined based on the way data is accessing in this segment. If this cache access is a sequential stream, both min and max prefetch are be set to the number of blocks in a segment to fill a segment's worth of data. The system then discards requested data for this command once the data has been transferred. If this cache access is a repetitive type of access, the min is set to the blockCount of the command and the max is the number of blocks in a segment less the blockCount of the command in order to keep the requested data for possible repeated access in subsequent commands. The default values are zero for the min and blocks per segment for the max; this allows the prefetch to be interrupted as soon as a seek can be started for a new command, but fills the segment with new data if the prefetch is not interrupted.

If the DPO bit in the Command Descriptor Block is set, or if the disk drive 9 is in native mode, a mode that allows the disk drive 9 to support special commands intended for use in drive development and manufacturing, or if hyper random mode is active, the invention does not prefetch. If the MF bit is set, the invention determines the amount of data to prefetch for this command based on the values defined in mode page 8.

When the commands being sent by the initiator 50 are random and no prefetch is performed the invention sets the caching system to hyper random mode. The hyper random mode means that the disk drive 9 is not getting cache hits and the invention assumes that the disk drive 9 is operating in a random environment. The hyper random mode, CH_ENV_HYPER, is active when random mode is also active and prefetch is disabled. For example if the segments that are allocated do not have any cache hits the invention determines this condition to be random mode. This mode allows random operations to get the seek started as quickly as possible. The cache 10 does not need to be scanned before the seek is started and the prefetch does not have to be aborted prior to starting the seek since the prefetch was not started. The invention temporarily suspends all prefetching while random operations are being processed by the disk drive 9. This allows random reads and writes to be processed with a minimum of delay because prefetch will not need to be aborted before a seek can be started for the command. The invention enters random mode and exits random mode without compromising the benefits of prefetch.

The caching system of the invention defaults to hyper mode, set during the initialization of the cache 10, if adaptive prefetching has been enabled. Cache scans are still performed for all read and write commands while in hyper mode since the cache scan is occurring behind a seek, and thus does not impact performance of the disk drive 9. If a cache hit is discovered during a cache scan, hyper mode is turned off. Hyper mode is also disabled as soon as sequential operations are discovered. Hyper mode is turned back on when there have been no cache hits in any of the segments currently in use.

When a sequential read stream is recognized, a different caching system path is used to process the commands in that stream. During a sequential read stream, prefetch is active and the command manager checks the prefetch for incoming read commands. This function handles starting the host transfer and extending the disk transfer. The system attempts to get the host up and running as fast as possible and the disk read is extended so that the disk drive 9 can continue an uninterrupted read stream and keep the segment full of new data.

When sequential write commands are received, the disk drive 9 coalesces the writes in order to allow multiple commands to be written to the media 40 without the latency of a disk revolution. This capability is accomplished through the use of a sequential write active status that is communicated between the disk side programs and the command manager. Once a sequential stream is recognized and the drive is sequential write active, the sequential write commands are fed through the same segment and the disk read is extended in a similar manner as when the disk drive 9 is prefetching. The caching system maintains the pointers in the buffer for the sequential write stream. When the invention recognizes that a write command is sequential to a current write command being processed, the invention coalesces the two writes into one command for a single write stream for the disk side.

The following are descriptions of the caching functions of the invention.

InitCache: Sets/resets cache variables and sets the caching system up to begin handling commands. Makes sure no sequential streams are running. Sets defaults for environment indicators. Determines the number of segments based on either the passed in value or the mode page 8 value. The number of segments is set to one when read caching is disabled, RCD=1, and when in native mode. The default adaptive number of segments is two. Makes sure the number of segments is a power of two, rounding down in one example. Sets the flag to indicate whether or not to adapt the number of segments. Sets the min prefetch flag and sets the max prefetch flag to indicate that they are adaptable. Sets default values for min and max prefetch. Sets hyper random mode. Calls SetNumberOfSegments.

GetSegment: Selects an available segment according to priority and takes the lowest priority segment available. Tries for the last segment on the priority list 52, if no segments are available or there are no non-active segments then command processing is terminated.

SelectSegment: Chooses the lowest priority available segment, using GetSegment, and removes the segment from the priority list 52 for use by the caller, RemoveFromPriList.

DeselectSegment: Frees up a segment from special purpose use for normal caching use. Flags the segment as empty and places the segment on the priority list 52 as a usable segment, AddToPriListLow.

InvalidateSegment: Has the same effect as DeselectSegment except that if the segment is in the priority list 52, the segment is first removed, RemoveFromPriList. This is for error cases when the data in a segment is no longer valid and must be discarded.

ScanCacheRead: Macro interface to PreScanCacheRead and GimmeSeg for normal use when selecting a segment for use during a read operation.

PreScanCacheRead: Scans the segment list 52 for a cache hit based on the data in the task control block, tcb. The invention considers a cache assess a miss if the FUA bit is set or caching is disabled. Loop through the priority list 52 until an empty segment is found or the end of list is encountered. First determines if the input command's lba is less than the lba plus block count of the segment plus one and if so, checks if the lba is less than or equal to the same point. The access is not considered a cache hit if the input lba is not in the valid data area. The hit count is the end of the valid data minus the input lba, which may be larger than the block count of the command. When the hit count is zero the cache access type is defined as a virtual hit. A virtual hit could be a sequential 158 cache hit or a partial 160 hit shown on FIG. 1G. The offset is the point at which the cache hit data begins, the offset to the input lba. A cache access is still considered a cache hit if the input lba is not in the valid data but is in the next lba beyond valid data. One is added to the lba plus block count to ensure that the caching system detects a cache hit one lba beyond valid data. On a cache hit, the curScan structure contains the hit count, offset, and segment number of the cache hit. The curScan.flags cache hit flag is also set and the caching system returns without proceeding through the loop. This means that only the first cache hit is chosen.

ScanCacheWrite: Interfaces to PreScanCacheWrite and GimmeSeg for normal use when selecting a segment for use during a write operation.

PreScanCacheWrite: Similar to the read case except that the hit count is not more than the block count of the command and the access is still a cache hit if the input lba is not in the valid segment data but the block count of the command extends into the segment.

GimmeSeg: The prescan cache process is non-destructive in that the prescan cache process does not affect what is in the segment or what is going on in association with the selected segment. The purpose of GimmeSeg is to go ahead and use the segment that was selected in the scan cache. If there was not a cache hit or the selected segment is not valid, for example an error occurred, a new segment is selected using GetSegment. Any prefetch or sequential write must be completed before the selected segment can be used. The segment data is set up for the current command and the segment state is set to active and not empty.

UpdateCache: Updates the segment data for how the segment is expected to look at the completion of the current command, exclusive of prefetch. If an error has occurred in this segment or the DPO bit is set, the segment is flagged as empty and placed on the bottom of the priority list 52. If the access type for the current command has not been determined UpdateCache determines the access type. For write commands, the segment is updated for what data remains in the segment at the completion of the command. The current command's prefetch can be adjusted for previously requested prefetch blocks. If the block count is greater than the segment size, adjustments must be made to determine what the first valid lba in the segment will be. The block count of the segment is calculated based on the command and its prefetch values, which often results in a value of zero since the default prefetch amount is a full segment's worth of blocks. Then the segment is placed at the top of the priority list 52. The caching system then loops through the priority list 52, incrementing the scan counts and invalidating old segments, and collecting a hit count from the current group of active segments. Finally, environment flags are set, for example, scan first if there were a lot of cache hits recently.

SeqWriteUpdate: Fast path function to update the current segment for a sequential write command to how the segment will look at the completion of this command.

CheckPrefetch: Handles read commands that are sequential or semi-sequential to the command for which prefetch is currently being done. This function should take care of everything in the case of a prefetch cache hit. In the case of a miss, the prefetch is usually aborted and a seek started. If the FUA bit is set or the current segment is empty, an error occurred, returning no hit. First checks for a sequential prefetch hit, then gets the prefetch count, bufcnt, from the processor and checks for a prefetch hit. If there is not a hit, returns. If so, updates the blockCount from bufcnt, checks the hit type, accType, fills in the segment and offset, calculates the delta for bufcnt, the delta for bufcnt is the offset from where the disk is reading to where the command is requested, begins the host transfer, extends the prefetch, sets the hitCount, calls UpdateCache, and returns the type of hit. There are two special cases. One is if there was a full cache hit in the prefetch area in which case the data is transferred without bufcnt and the segment is left unchanged. The second case is if there will be a hit in the prefetch area, but the hit has not occurred yet, in which case a special return code CH_ACC_PREF is used to invoke PrefetchWait from the host system.

PrefetchWait: Waits for the prefetch to get to the point of a cache hit in the prefetch area and can continue processing the command. PrefetchWait loops on a ContextSwitch until the disk has read far enough or if a disk error occurs. If the hit will be partial or is close to the end of the segment, the loop waits for the prefetch to reach the beginning lba of the command. Otherwise PrefetchWait waits for the whole command to be in the cache 10 before exiting. After this completes, the host system calls CheckPrefetch again and the command is handled normally.

CompletePrefetch: Increments the block count in the segment by bufcnt. CompletePrefetch is called when the prefetch completes, and/or is aborted, to update the segment to show the additional blocks read.

PurgeConflictData: Called after write commands, this function walks through the segment list 52, identifying segments that have data that overlaps the input lba and block count. If there is a full overlap, the segment is invalidated. Partial overlaps are handled by adjusting the pointers to discard the overlap data.

ComputePrefetch: Compute the prefetch for the current command. If the DPO bit is set or if the disk drive 9 is in native or hyper random mode, the prefetch is zero. Otherwise prefetch is calculated as described in Adaptive Prefetch.

SetNumberOfSegments: Sets the number of segments and all other caching variables affected by doing so. This function discards the data in the cache 10. Sets up the priority list 52 in order from zero up. Calculates segmentSize and related variables. Calculates prefetch related variables. Calls the function that sets the segment size.

AdaptiveCachingStuff: Keeps track of block counts for recent commands and determines the number of segments for adaptive caching. This function is called during seeks when a cache segment has not yet been chosen. First saves the block count of the current command in an array. Then decrements the counter for number of calls until the next adaptive determination, exits if non zero. Determines if the number of segments should be increased or decreased. Determines that there should be more segments than the number of sequential streams and that the average block count should be about half of the number of blocks in a segment. If the number of segments is to change, attempts to abort any active prefetch or sequential write stream. Calls SetNumberOfSegments, resets the counter and returns.

The cacheEnv variable, shown in Table 1, is used by the caching system to keep track of the overall environment in which the disk drive 9 is operating. This variable includes a scan first flag to indicate that a scan of the cache 10 should be done before the seek is started if the disk is busy. If the scan first flag is set, the seek may not necessarily be started for a command until after a scan of the cache 10 has occurred. This flag is set based on the number of cache hits that have occurred. The seek is started first if the disk is not busy with a prefetch or a sequential write operation.

The curScan.flags variable contains an update flag that indicates whether an update cache has been completed for the current command. This flag is used by the caching system to keep the caching system from starting to process a command if the previous command has not yet completed its update phase.

A special prefetch return code from CheckPrefetch causes the host to call PrefetchWait to wait for a potential cache hit to come to fruition.

TABLE 5

Task Control Block Structure

| | |
|---|---|
| segmentOffset | How far into the segment is the start of the requested data |
| block size | Number of bytes in a block |
| xferCount | Number of bytes being transferred by the host programs to or from the cache 10 |
| xferOffset | Where in the cache the bytes are being transferred to or from |
| segmentNumber | What segment is being transferred |

TABLE 6

Disk Control Block Structure

| | |
|---|---|
| task | Task owning this dcb |
| flags | See below for definition |
| segmentNumber | Data available in cache |
| state | State of operation |
| recovery | Recovery flag |
| recoveryDepth | How far into recovery to go |

Refer now to FIG. 1B which shows a method of the invention to process commands from a host. In step 302, a command manager selects a command from the host, represented by the command descriptor block, cdb, following the SCSI standard. The method of the invention then initializes a task control block in step 304 with the structure shown in Table 5. The method of the invention then allocates buffer 10, sets up a host pointer to track the data being transferred to or from the host 50, and determines the segment to allocate in the buffer 10 in step 306. The host pointer is an internal variable in the host side programs and is controlled by setting the tcb.xferOffset variable in the task control block structure. The invention then obtains a token for disk usage which allows the method to transfer data to and from the disk in step 308. Also in step 308, the command manager sets up the disk pointer. The disk pointer is an internal variable in the disk side programs that is controlled by setting the tcb.xferOffset in the task control block structure and bufcnt. In step 310, the method starts data transfer to or from the host. In step 312, the future state of the cache 10 is computed and the cache control variables are adjusted in step 312. The method of the invention then tries to start the next command in step 314. The next command may be able to be started even though the current command is not completed. The method then ends in step 316 where the command manager can process the next command and repeat the method of FIG. 1B until all commands have been completed.

Refer now to FIG. 1C which shows a method of the invention to process commands from the host computer 50. The disk drive 9 receives host commands in step 102. The disk drive 9 monitors and processes commands from the host 50 in step 104. If there are no commands to be processed, the command processing ends in step 111. If there are commands to be processed, the method of the invention initializes a task control block in step 108.

In step 114, a determination is made as to whether or not to scan first or seek first. If scanning first, the process scans the cache in step 106. For seek first, the process obtains a disk pointer in step 110. After step 106, the process of the invention flows to step 112 to determine the cache access type of the request. If the cache access type is a full cache hit, the process flows to step 136 to set the host pointer and start the host. Starting the host involves sending a message to the host side programs that the host program can send data to the initiator. After step 136, the process flows to step 138 to set the caching data structures, for example lba, offset and blockCount, to be ready to process the next command.

If, in step 112, the cache access type indicates a sequential or skip cache hit, the process obtains the disk pointer in step 118 and computes a prefetch in step 126 according to the method described with reference to FIGS. 8A, 8B, 8C, 8D and 8E. The process flows to step 132 to set the buffer counter, bufcnt, and start the disk. When the process starts the disk, the caching system sends a signal to the disk side programs to start the transfer of data to or from the disk. From step 132, the process again flows to step 136. If, in step 112, the cache access type is determined to be a no cache hit or miss, the disk pointer is obtained in step 124 and the seek is started in step 130. The process flows to step 136 to compute the prefetch and again flows to step 132 to set the buffer counter, bufcnt, and start the disk, then flows again to step 136 to set the host pointer and start the host.

If, in step 114, the method determines to seek first, the process flows to step 110 to obtain the disk pointer. The process then starts the seek in step 116. The process then flows to step 120 to adapt the cache to the sequence of commands that have been processed. In one embodiment the invention also adapts the cache to the commands available from the host or hosts that have not been processed yet and are still in the queue. In step 122, the scan cache routine is called to assign the command to a segment and in step 128 the hit count is determined.

If, in step 128, there is no cache hit, the process flows to step 126 to compute the prefetch. If the cache access type in step 128 is determined to be a partial cache hit, a seek again is executed in step 134 and the process flows again to step 126 to compute the prefetch. An example of a partial cache hit is a sequential or skip hit. If, in step 128, the cache hit was determined to be a full cache hit, the process flows to step 136 to set the host pointer and start the host.

Figure 2A:
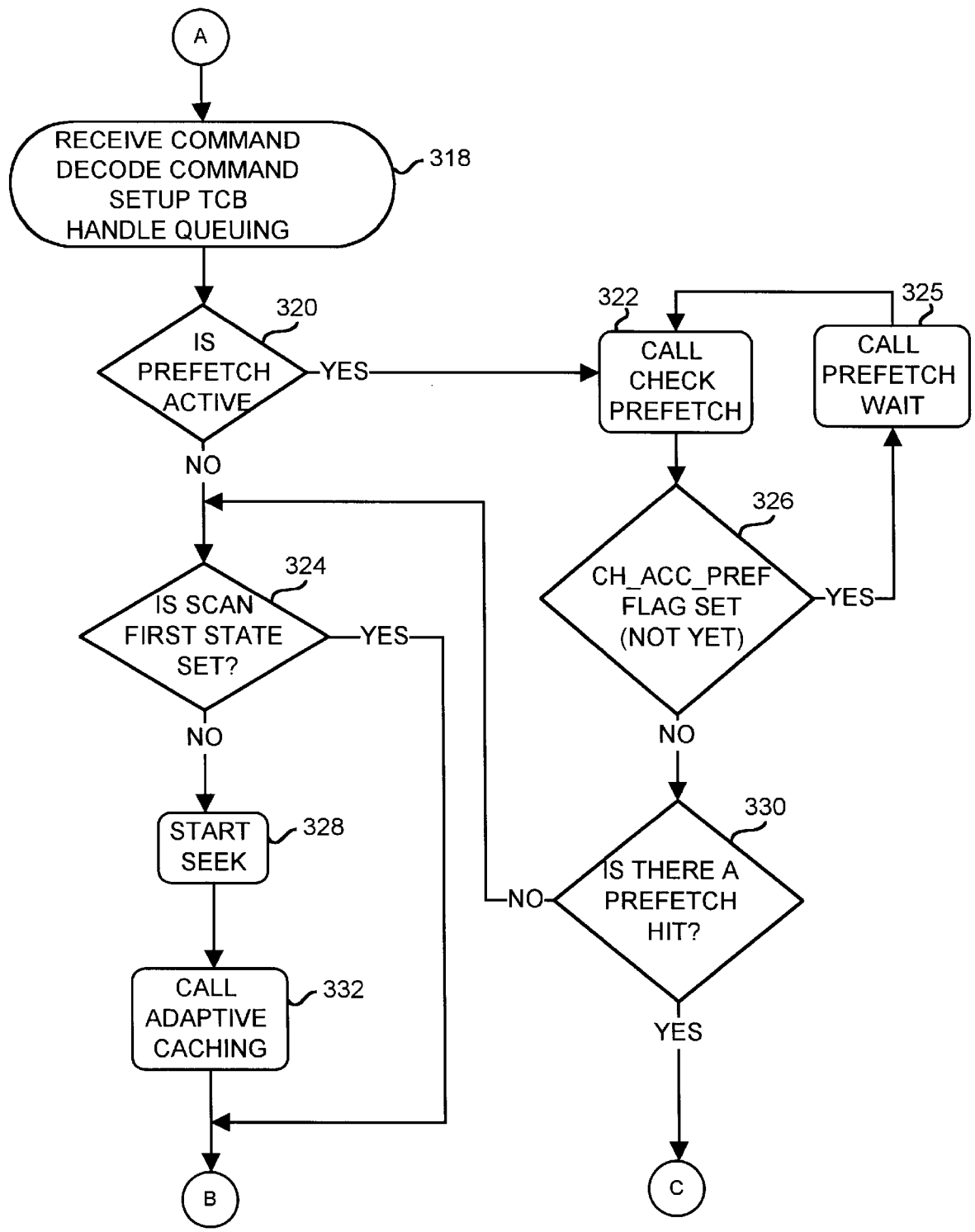
FIGS. 2A and 2B show a method of the invention for managing commands.
Figure 2B:
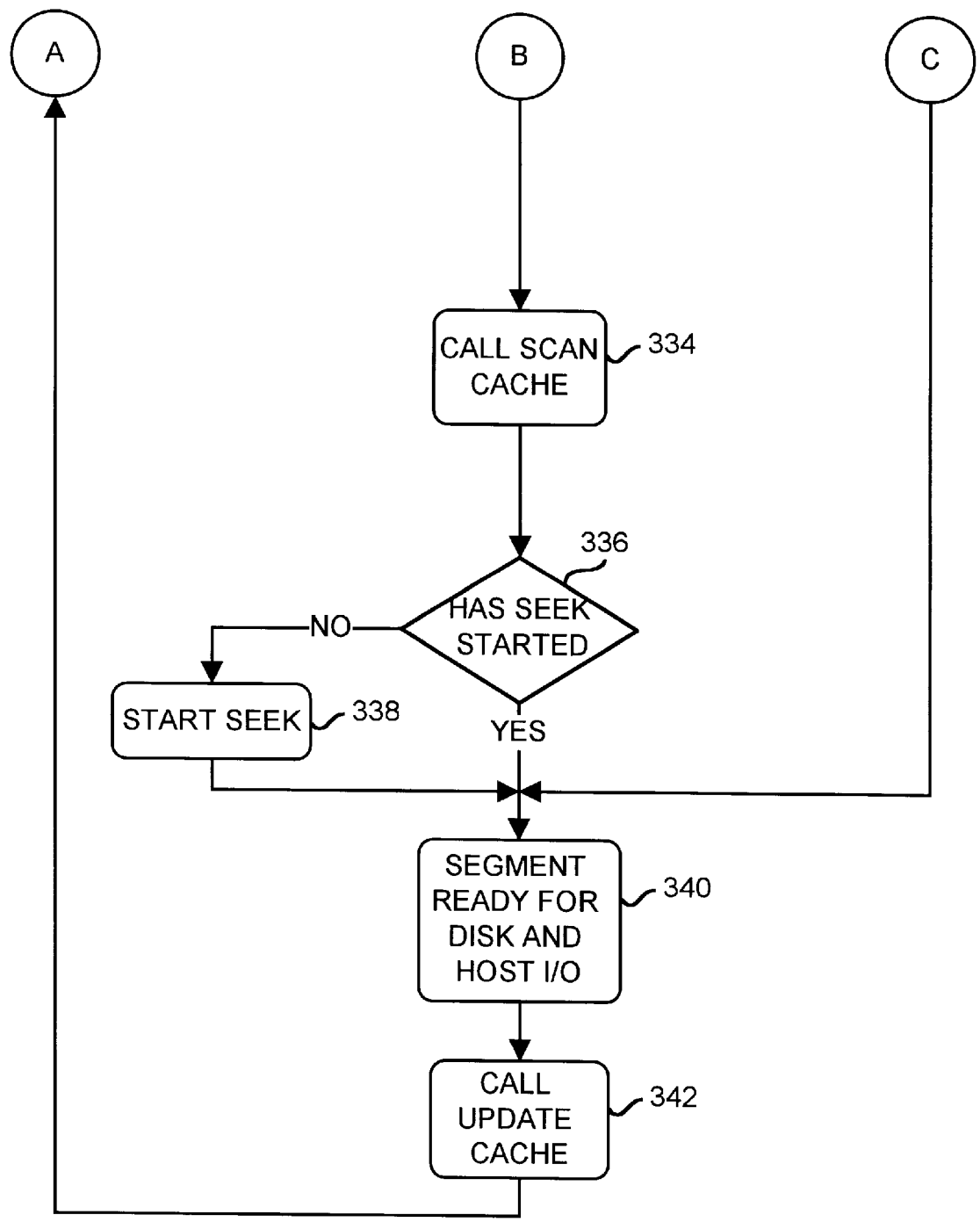

Now refer to FIGS. 2A and 2B, which shows a method of managing commands of the invention. In step 318, the process receives a command from the host and decodes the command, sets up the task control block shown in more detail in Table 5 and determines queuing of the command. In step 320, the process determines if a prefetch is active. If a prefetch is active the process flows to step 322 to call the check prefetch routine which determines the status and establishes the state variables that control the prefetch. In step 326, the prefetch flag is checked and a determination is made about whether or not the prefetch has completed. A determination is also made as to whether this cache access is a potential prefetch cache hit. If the prefetch has not completed and there is a potential prefetch cache hit then the process flows to step 325 to wait for the prefetch to complete. The method of the invention to wait for the prefetch to complete is shown in more detail in FIG. 2C. The process then returns to step 322 after the prefetch wait has completed. The cache access flag is set to the CH_ACC_PREF state which indicates that a cache access may occur if the prefetch is allowed to proceed. If the CH_ACC_PREF flag is not set, the process flows to step 330 where the invention checks if there was a prefetch cache access. If there was not, the process flows to step 324 to determine if the scan first state was set. If the scan first state was set, the process flows to step 334 to scan the cache 10. If the scan first state was not set, then the seek is started in step 328. After the seek is started, the adaptive caching method of the invention is implemented in step 332. Then the process flows to step 334 to scan the cache 10. In step 336, a check is made to see if the seek has started. If the seek has not started the seek is started in step 338. If the seek has started, the process flows again to step 340 to prepare the segment for disk and host input and output by updating the caching entry structure variables and scan structure variables. If there was a prefetch cache access in step 330, the process flows to step 340 to prepare the segment for disk and host input and output. In step 342, the cache controls variables and cache entry table are updated. The process flows back to step 318 to process the next command, either in the queue or received from the host.

Figure 2C:
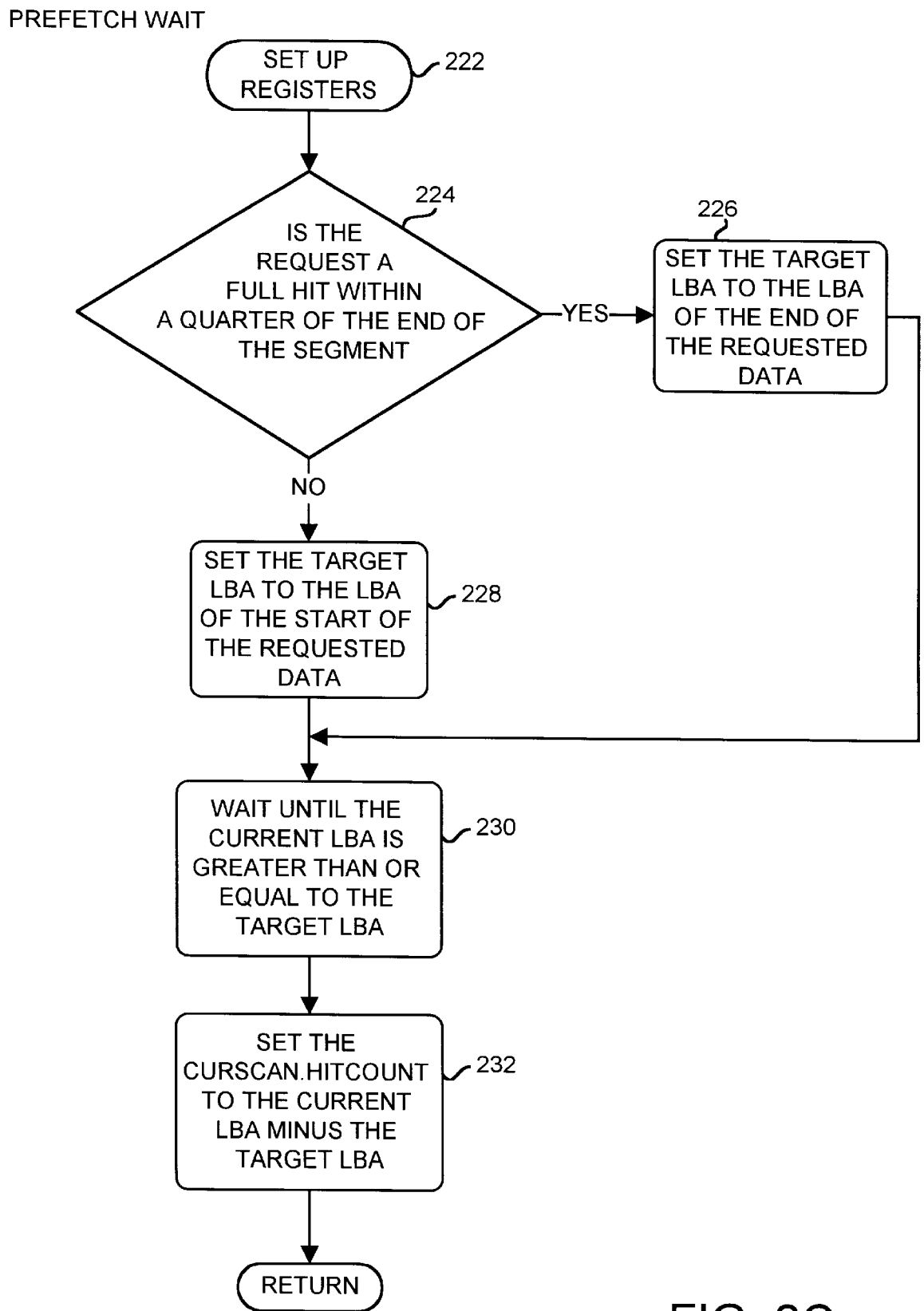
FIG. 2C shows a method of the invention to wait for a prefetch to complete.

Now refer to FIG. 2C which shows the method of the invention to wait for a prefetch to complete. The method start in step 222 to setup the registered variables for the cache entry pointer, r_ceptr, equal to the cache entry table pointer for the segment number, &ce[dcb.segmentNumber]. The registered lba addresses r_lba1 and r_lba2 are set to the lba of the start of requested data, tcb->cdb[2]. The registered block count, r_blockCount is set to the requests block count, tcb->cdb[6]. If, in step 224, the start of requested data is within a quarter of the end of the segment, r_lba1+r_blockCount is less than or equal to the end of the prefetch and r_lba1 less than the end of the prefetch minus the blocks per segment for this segment number, then the registered target variable r_lba2 is incremented by the block count of the request, r_blockCount, in step 226. Otherwise the invention sets the target lba to the lba of the start of the requested data in step 228. The process then waits for the disk to prefetch up to or beyond the target lba, r_lba2, in step 230. If no errors had occurred the process then sets the current scan hit count, curScan.hitCount, to the current lba minus the start of requested data in step 232.

Figure 2D:
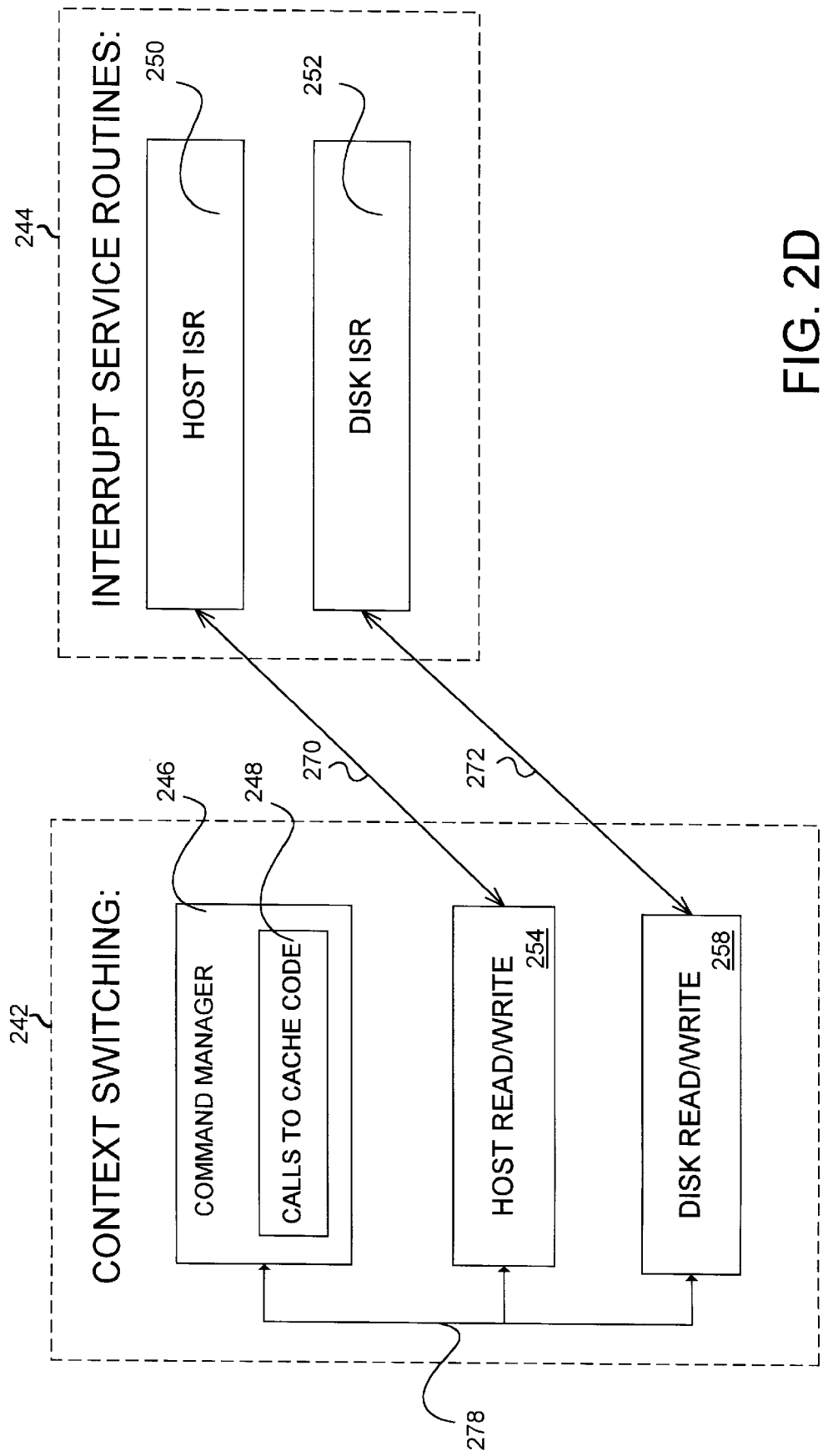
FIG. 2D shows the method of context switching and interrupt processing of the invention.

Refer now to FIG. 2D which shows the method of context switching and interrupt processing of the invention. The context switching program 242 runs the command manager 246 which calls the cache code 248, the host read/write program 254, and the disk read/write program 258. Line 278 shows the communication between the command manager 246 and the host read/write program 254 and the disk read/write program 258. In the interrupt service routine programs 244, the host interrupt service routine 250 and disk interrupt service routine 252 are run when called or executed immediately when interrupt pins are pulled by the processor. The host side programs comprise the host read/write program 254 and the host ISR 250. The disk side programs comprise the disk read/write program 258 and the disk ISR 252. Line 270 shows the communication between the host interrupt service routine 250 and the host read/write program 254. For example, the host read/write program 254 sets parameters to be used by the host ISR 250 when handling interrupts. The line 272 shows the communication between the disk interrupt service routine 252 and disk read/write program 258. The context switching programs are called in a round robin fashion. Each routine must explicitly relinquish control to each other. For example, the host read/write program 254 must relinquish control before the command manager 246 may start processing again. Also, disk read/write program 258 must relinquish control before the host read/write program 254 or command manager 246 execute. The interrupt and context switching methods of the invention coordinate their activities through the state variables of the invention described herein. The command manager 246 and calls 248 to the caching system code allow the invention, for example, to scan the cache, adapt the number of segments, determine cache hit types, check for a prefetch hit, set the disk and host pointers, check for the disk being busy, checking for disk done, checking for a command to complete, and starting a seek.

Now refer to FIGS. 3A, 3B, 3C, 3D, 3E and 3F showing the method of the invention to check the prefetch operation of the cache for a prefetch cache hit. In step 344, a task control block is input to the process. In step 346, a check is made of the FUA state to determine whether or not disk access is required on read, write, read extended, or write extended commands. If the segments are empty, there is not cached data in the buffer. The process then flows to step 348 to return not hit. If either one of these two states are true, then the cache access type is designated as CH_ACC_NEW indicating that there cannot be a cache access. The process flows to step 350 if the segment is not empty and the FUA state is false.

In step 350, a check is made for a sequential cache access. A sequential cache access is defined as a cache access where the first logical block request is the same as the first logical block of the current segment prefetch area. A sequential cache access is also shown in FIG. 1G as sequential cache access 158. If the access type is sequential, the process flows to step 352 to set the cache access type to sequential access. The sequential access type is designated as CH_ACC_SEQ. The offset is set to the segment offset minus the block count. The hitCount is set to buffer count. These two variables are used by other routines to control the transfer of data in and out of the cache 10.

If there is no sequential cache access in step 350, the process flows to step 354 to check if the start of the request is in the current segment. If the start of the request is in the current segment a check is made for a full cache access in the prefetch area in step 356. If there is not a full cache access in the prefetch area in step 356, the method of the invention determines whether or not the request is less than the end of the prefetch area minus the blocks per segment divided by four in step 358. If in step 356, a check for a full cache access in the prefetch area is true, then the cache access type is set to full, designated as CH_ACC_FULL, shown in FIG. 1G as fill cache access 164 or 168. The hitCount, is adjusted from the end of the cache segment by block count in step 360. After the cache access type is set to full CH_ACC_FULL in step 360, the method of the invention sets the host pointers to set up the host data for the host side transfer in the task control block (TCB). The offset is computed into the cache entry table and the segment number is set as the disk control block segment number in step 362. The task control block transfer offset is set to be the relational block address based on the segment number in the offset and the physical sector size.

The process then flows to step 366 to start the host transfer. The task control blocks are set to indicate that the host data transfer has been started and that the host active flag is set for this segment. The task control block is saved for this command and the prescan flag is set to indicate there was a prefetch cache access in step 368. In step 372, the command count is decremented. The command count is used in the adaptive caching method of the invention. In step 374, hyper mode is turned off in the cache environment variable. In step 378, the process returns the cache access type.

If, in step 358, the request is less than the end of the prefetch area minus blocks per segment for the current segment divided by four, the process flows to step 364 to set the cache access type to be CH_ACC_PREF, which indicates that the request is not a cache hit yet but that the request will be a cache hit in the future. The result of the divide by four indicates to the caching system that the segment should be rolled forward. When the requested lba of the read gets too close to the end of the prefetch data contained in the cache segment then, even if the access is a full cache hit, the request is treated as a skip ahead. In a skip ahead the data prior to the prefetch and the prefetch data is overwritten by new prefetch data. This mechanism holds the prefetch data until the read lba gets within a predetermined amount, for example one quarter of the current prefetch data range, from the end of the current prefetch data range. This structure is analogous to a read threshold where a decision is made not to handle small transfers as full cache hits and handles the host and disk as skip ahead sequentials. The process flows to step 370 to set the hitCount to the number of additional blocks to be prefetched before this is a fill cache access. The hitCount is set to a non zero value equal to the request plus block count minus the prefetched lba plus bufcnt even though the transfer was not done. In step 380, the process returns the cache access type.

If, in step 358, the request is not less than the end of the prefetch area minus blocks per segment for the current segment divided by four, the process flows to step 382. In step 382 the invention checks if the lba of the request is greater than the prefetch lba.

If the lba of the request is greater than the prefetch lba the process flows to step 384 to set semi-sequential access. The process then sets a registered lba variable, r_lba2, to the lba of the request minus the segment lba plus blockCount in step 388. The process then decrements Bufcount by r_lba2 in step 392. The process then sets offset to the segment offset plus blockCount plus r_lba2 in step 398. In step 402 the segment lba and offset are adjusted. In step 406 the hitCount is adjusted to bufcount - r_lba2.

If, in step 382, the lba of the request is not greater than the prefetch lba the process flows to step 386 to set semi-repeating access. The process then sets a second registered lba variable, r_lba2, to the prefetch lba minus the segment lba in step 390. The process then checks if the request lba is equal to the segment lba in step 394. If the request lba is equal to the segment lba then the hitType is set to Repeating access, CH_ACC_REP, in step 396 otherwise the process flows to step 400 to set the hitType to semi-repeating access, CH_ACC_SREP. The process then sets offset to the segment offset plus the prefetch lba minus the segment lba minus r_lba2 in step 404. In step 408 the hitCount is adjusted to bufCount plus r_lba2.

Figure 3A:
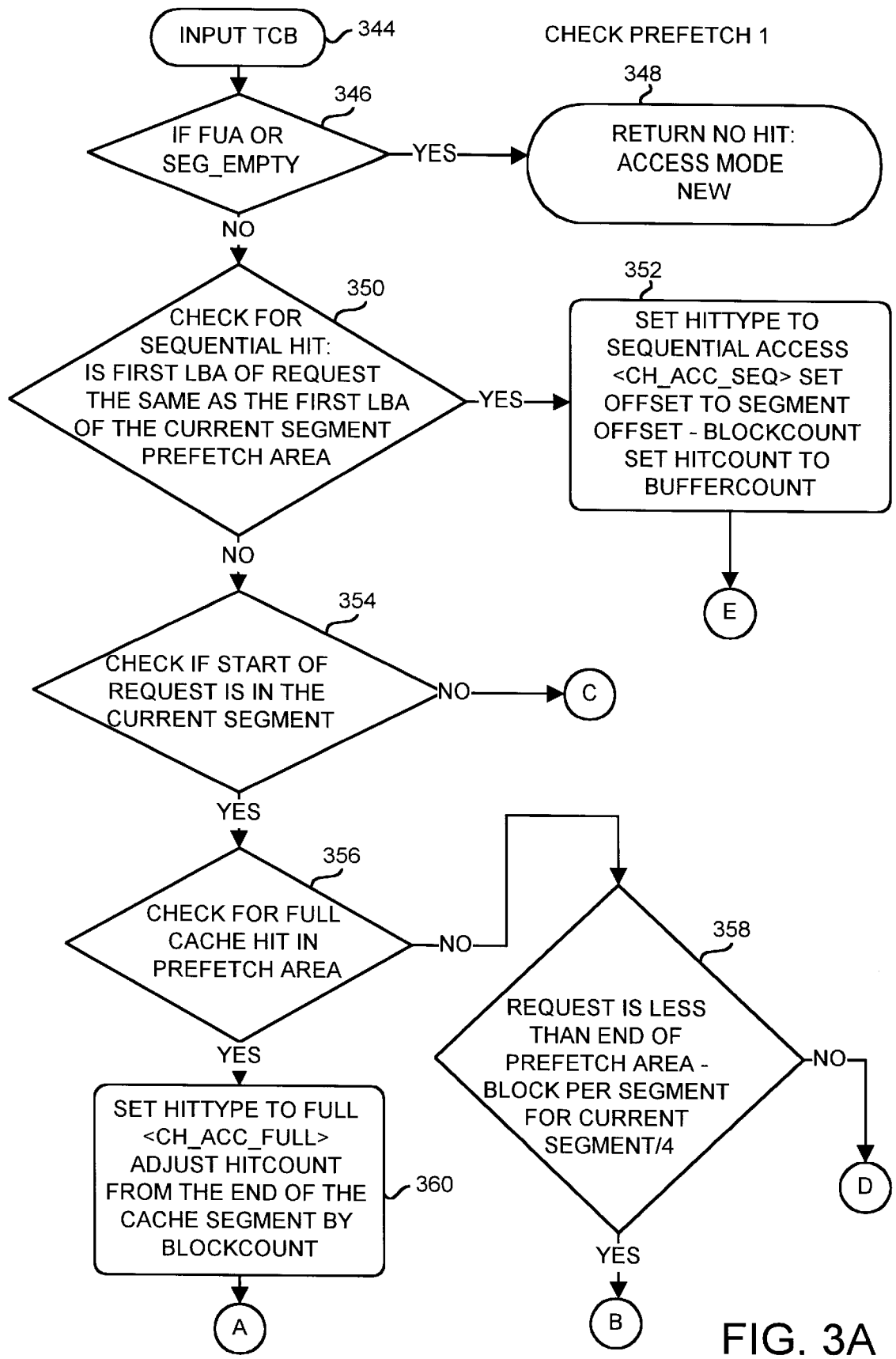
FIGS. 3A, 3B, 3C, 3D, 3E and 3F show a method of the invention to check the prefetch operation of a cache.
Figure 3B:
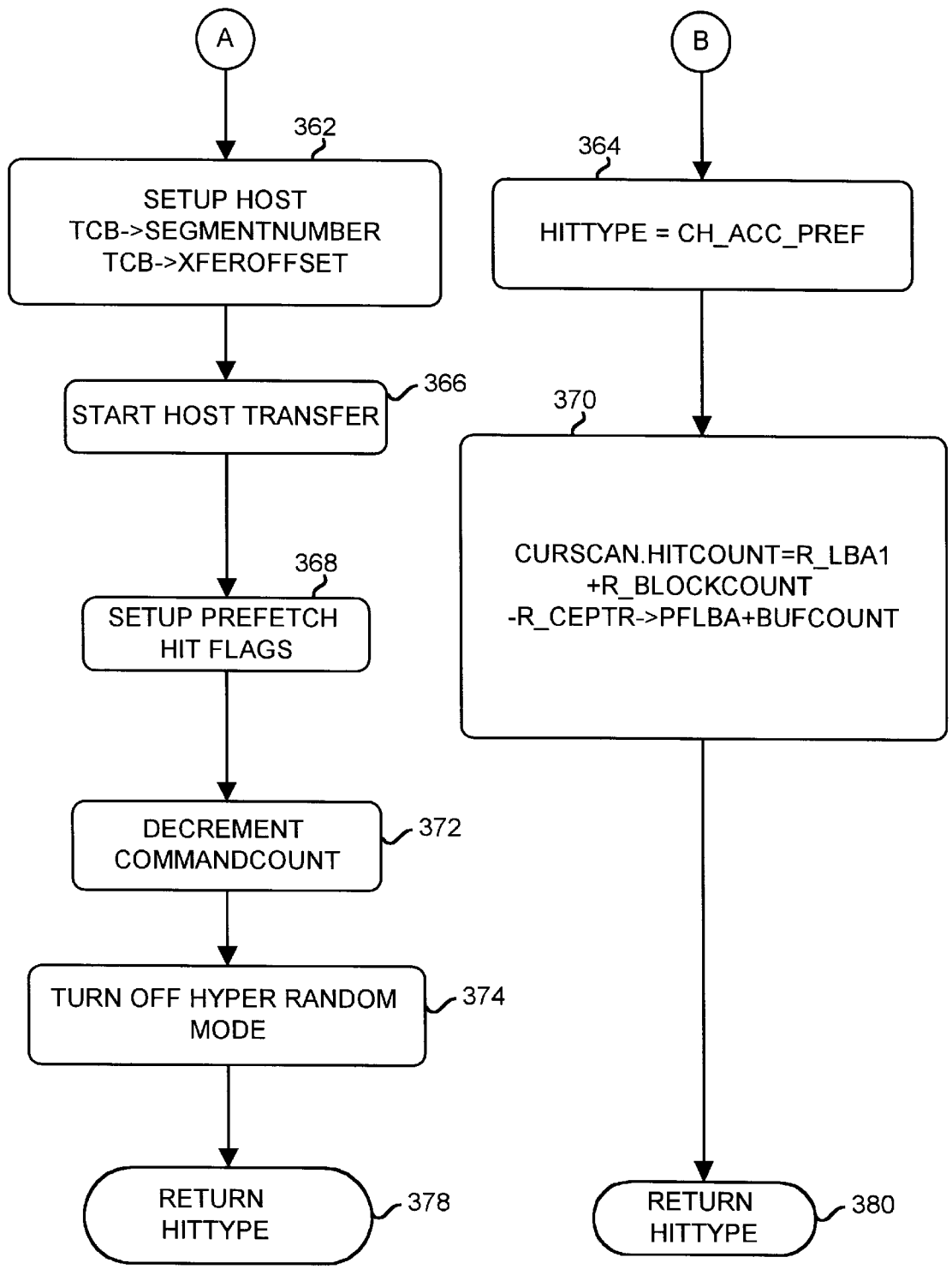
Figure 3C:
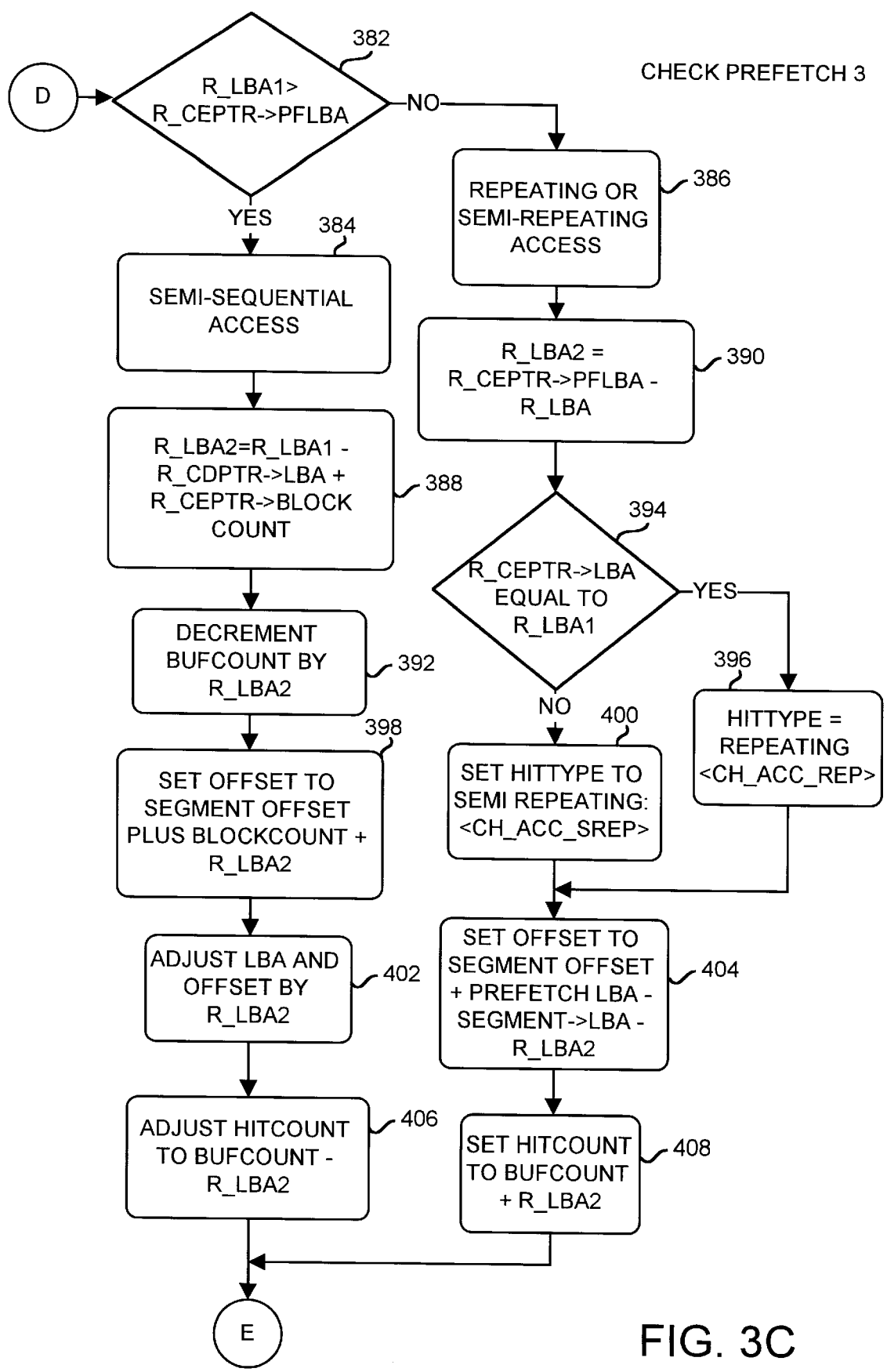
Figure 3D:
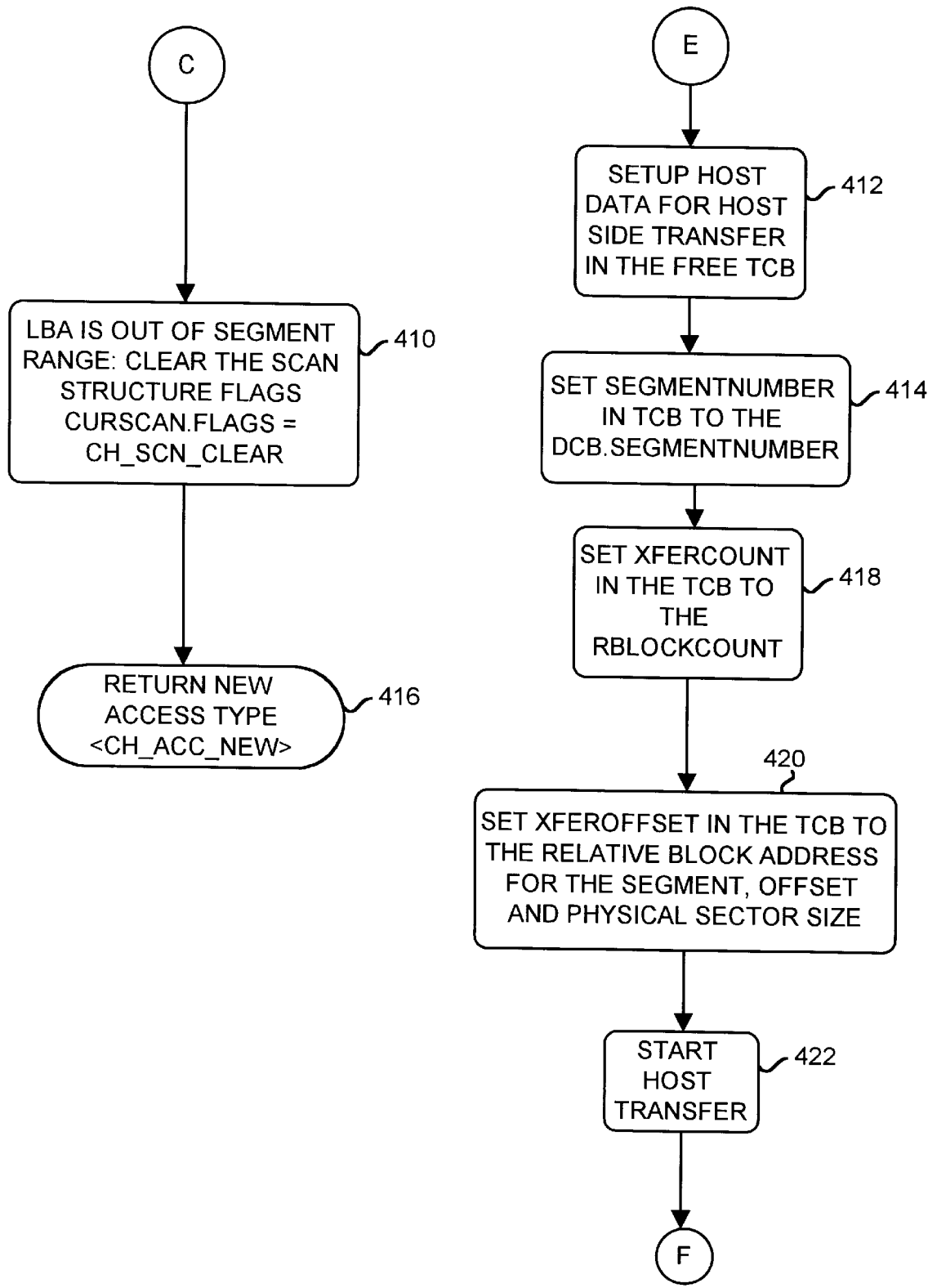
Figure 3E:
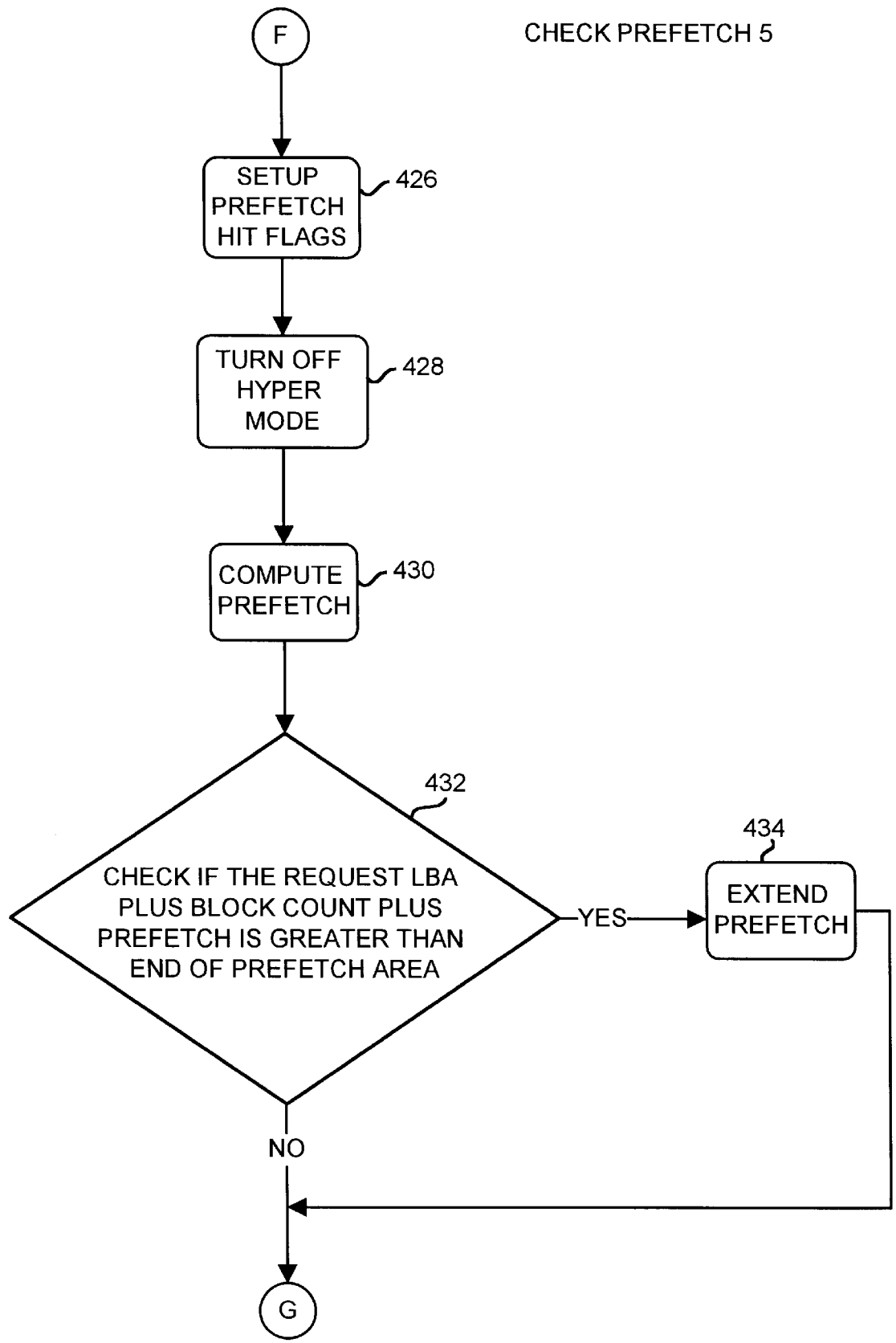
Figure 3F:
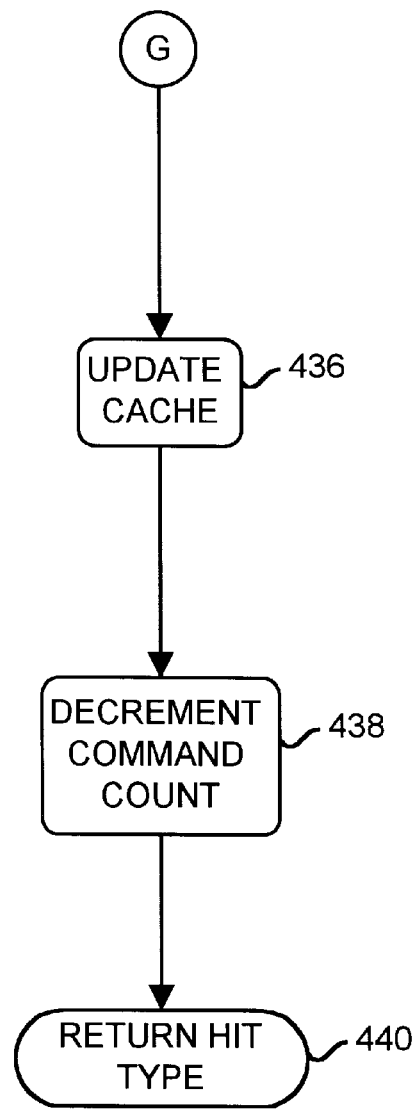

After step 352, the process flows to step 412 shown in FIG. 3D, to set up data for the host side transfer in the TCB. The process flows to step 414 to set the segment number in the task control block to the disk control block segment number. The process then flows to step 418 to set transfer count in the TCB to the rblockCount value. The variable rblockCount is the requested block count from the cdb. The process flows to step 420 to set the transfer offset in the TCB to the relative block address for the segment, offset and physical sector size. In step 422, the host transfer is started. In step 426, the prefetch cache access flags are setup. In step 428, hyper mode is turned off. In step 430 the prefetch is computed. If, in step 432, the request lba plus block count plus prefetch is greater than the end of the prefetch area the prefetch is extended in step 434. The invention instructs the disk side programs, which are responsible to implement the prefetch, to read additional blocks. The disk drive 9 may be at any point in the prefetch when instructed to extend the prefetch. If the result of comparison in step 432 is not true the process flows to step 436, shown in FIG. 3F, to update the cache state variables. Command count is decremented in step 438. The process returns the cache access type in step 440.

In step 354, if the start lba of the request is not in the current segment, then the process flows to step 410 where the logical block address of the request is determined to be out of the segment range and the scan structure flags are cleared. The new access type CH_ACC_NEW is returned in step 416 to indicate a cache miss shown also in FIG. 1G as MISS 174 or NO HIT 176.

Figure 4A:
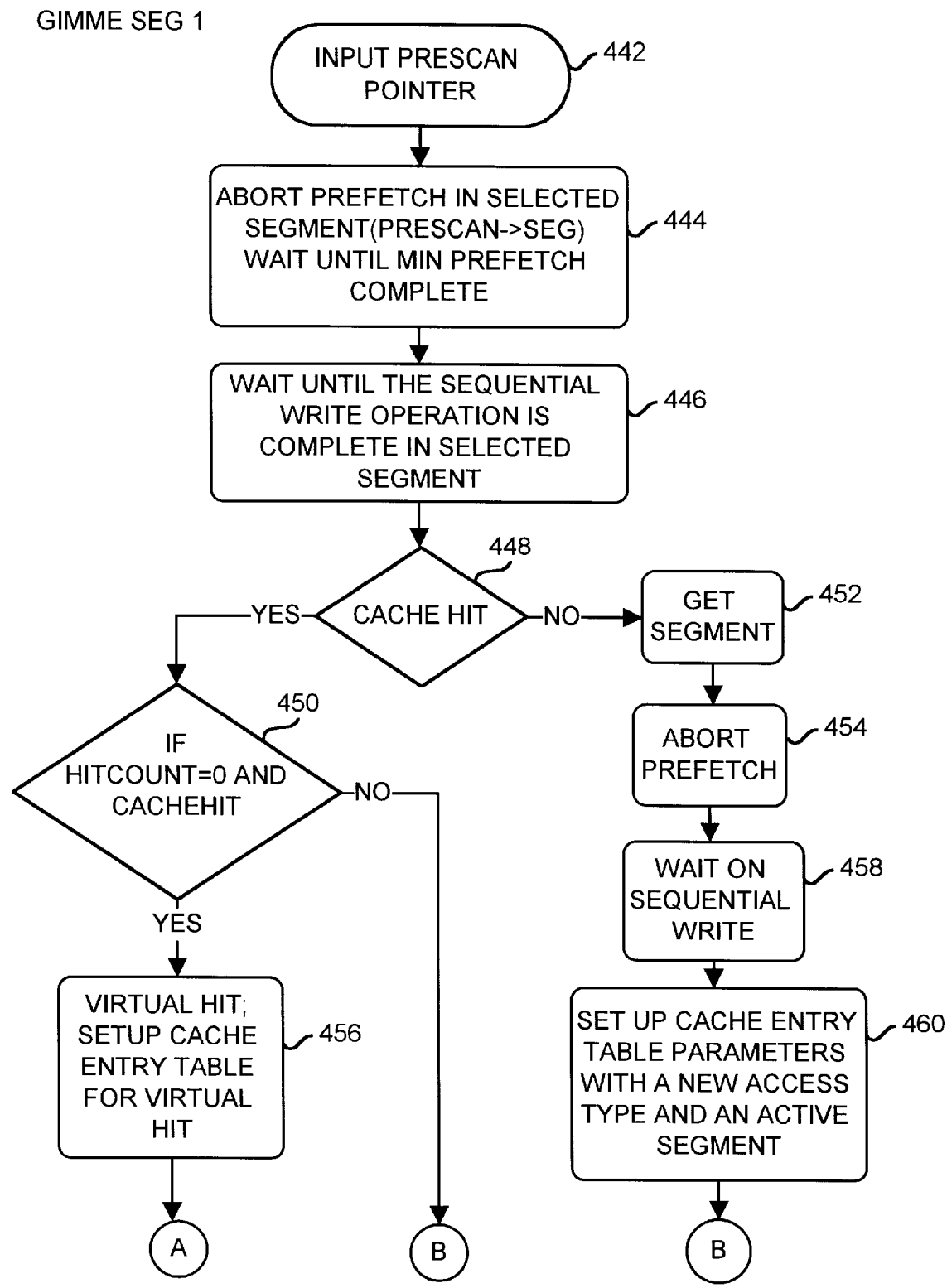
FIGS. 4A and 4B show a method of the invention to provide a cache segment.
Figure 4B:
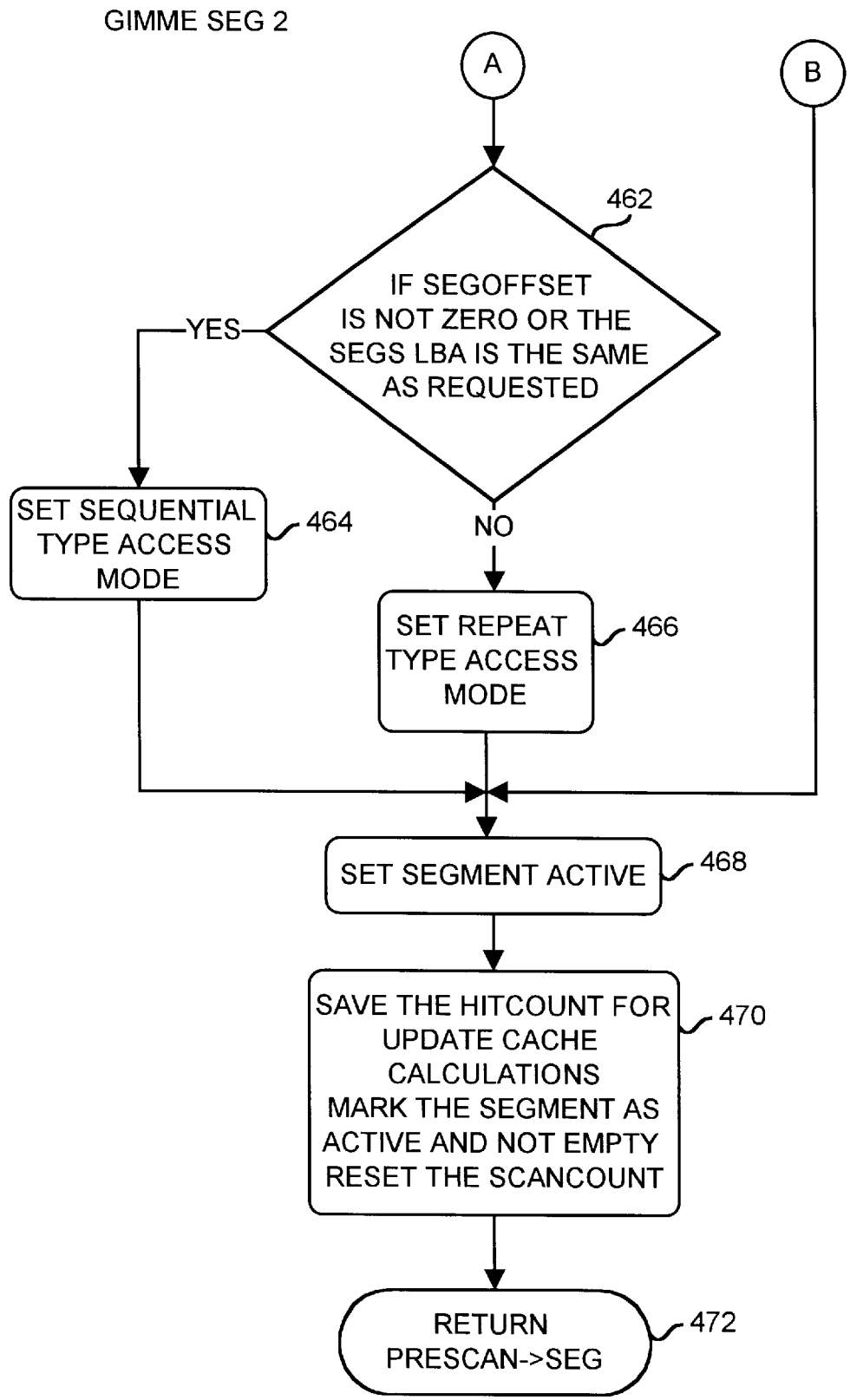

Refer now to FIGS. 4A and 4B that show the method of the invention used to obtain a segment. The Gimmeseg routine returns the segments selected after either a Prescan-CacheRead or a PrescanCacheWrite. The Gimmeseg routine may modify the hit count in blocks of a cache hit stored in the segment entry's hit count. Gimmeseg also flags a selected segment as active and resets the segment's scan count. The Gimmeseg routine may initialize the selected segment if GetSegment is called during the Gimmeseg routine. The selected segment is initialized if there would have been a repeat hit if data was not overwritten.

The method begins in step 442 by inputting the PreScan pointer into the GimmeSeg routine. The PreScan pointer indicates the segment that will be the selected segment.

The method of the invention first checks to see whether the prefetch is active in the selected segment in step 444. If the prefetch is active in the selected segment, then the method waits until a predetermined minimum prefetch has been completed. While the minimum prefetch is completed, the method may release the processor to perform other tasks. The method of the invention then checks to see whether a sequential write operation is active in the selected segment in step 446. If a sequential write operation is active in the selected segment, the method waits until the sequential write operation is complete in the selected segment. While the sequential write operation is being completed, the method may once again release the processor to complete other tasks until the sequential write operation is complete in the selected segment. Once the sequential write operation is complete in the selected segment, the sequential write may be aborted if necessary and the method continues to step 448.

In step 448, the method checks to see if there is a cache hit. If there is no cache hit, the method flows to step 452 to call the GetSegment routine. The GetSegment routine is described more fully with reference to FIG. 4C. The GetSegment routine returns the segment number and the method flows to step 454 to abort the prefetch if the prefetch is active in the selected segment. Once again, the method waits until a minimum prefetch is complete before aborting the prefetch. The method of the invention then proceeds to check if a sequential write routine is active in step 458. If a sequential write is active in the selected segment, the method waits until the sequential write is completed. In both steps 454 and 458, the method may release the processor to complete other tasks until their conditions are satisfied. The method then flows to step 460 where cache entry table parameters are set up with the new access type, CH_ACC_ NEW, and an active segment. The offset is set to zero, blockcount is set to zero, hit count is set to zero, access type is set to new, the state is set to empty, the scanCount is set to zero and the preScan pointer is set to the segment.

If there is a cache hit in step 448, then the method flows to step 450 to determine if the hit count equals zero and the cache hit flag is set. If these conditions are true, the method flows to step 456 and determines a virtual hit. The cache entry table is set up for a virtual hit and the method flows to step 462. Otherwise, the method flows to step 468 to set the segment active. At step 462, the method checks to see whether the Segoffset is not equal to zero or if the segment's logical block address is the same as the requested logical block address. If either of these conditions are true, then the segment access mode is set to sequential in step 464. Otherwise, the segment access mode is set to repeat in step 466.

After the access mode is set, the method continues to step 468 and marks the segment as active. In step 470, the method saves hitcount for use in update cache calculations. The method marks the segment as active and not empty. The method also resets the scan count to zero. In step 472, the GimmeSeg method returns the segment.

Figure 4C:
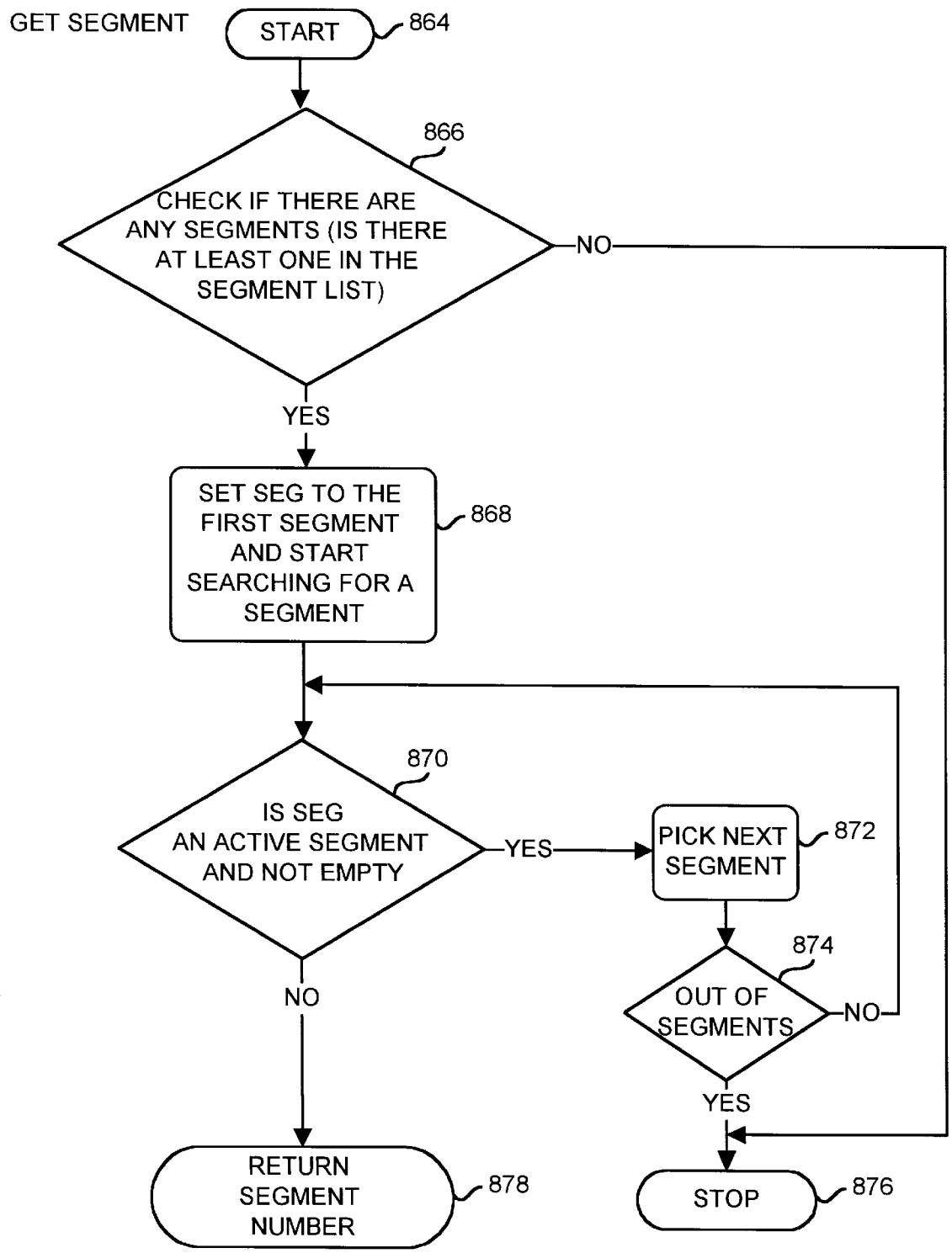
FIG. 4C shows a method of the invention for getting a segment.
Figure 5A:
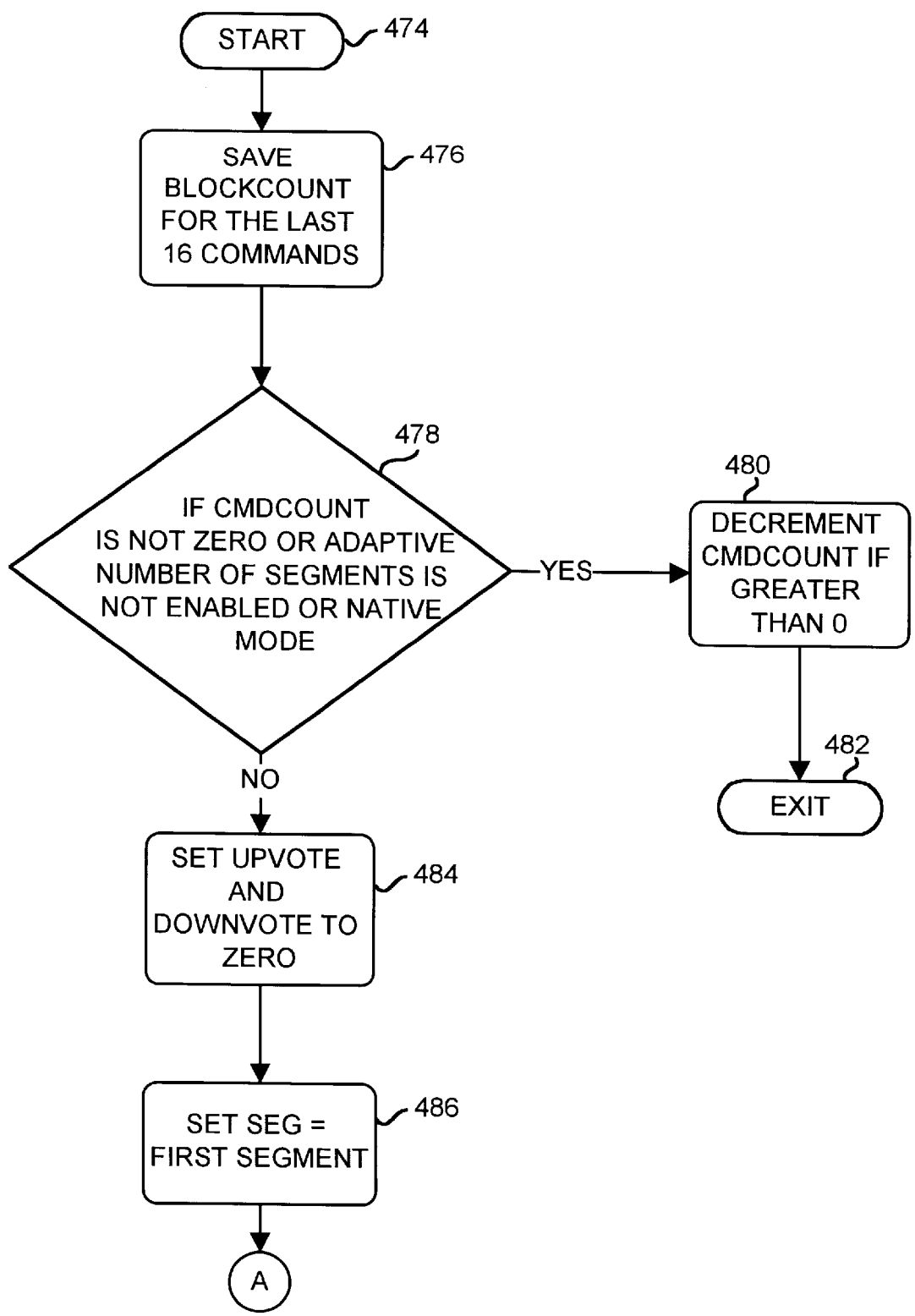
FIGS. 5A, 5B, 5C, 5D and 5E show a method of the invention for adaptive caching.
Figure 5B:
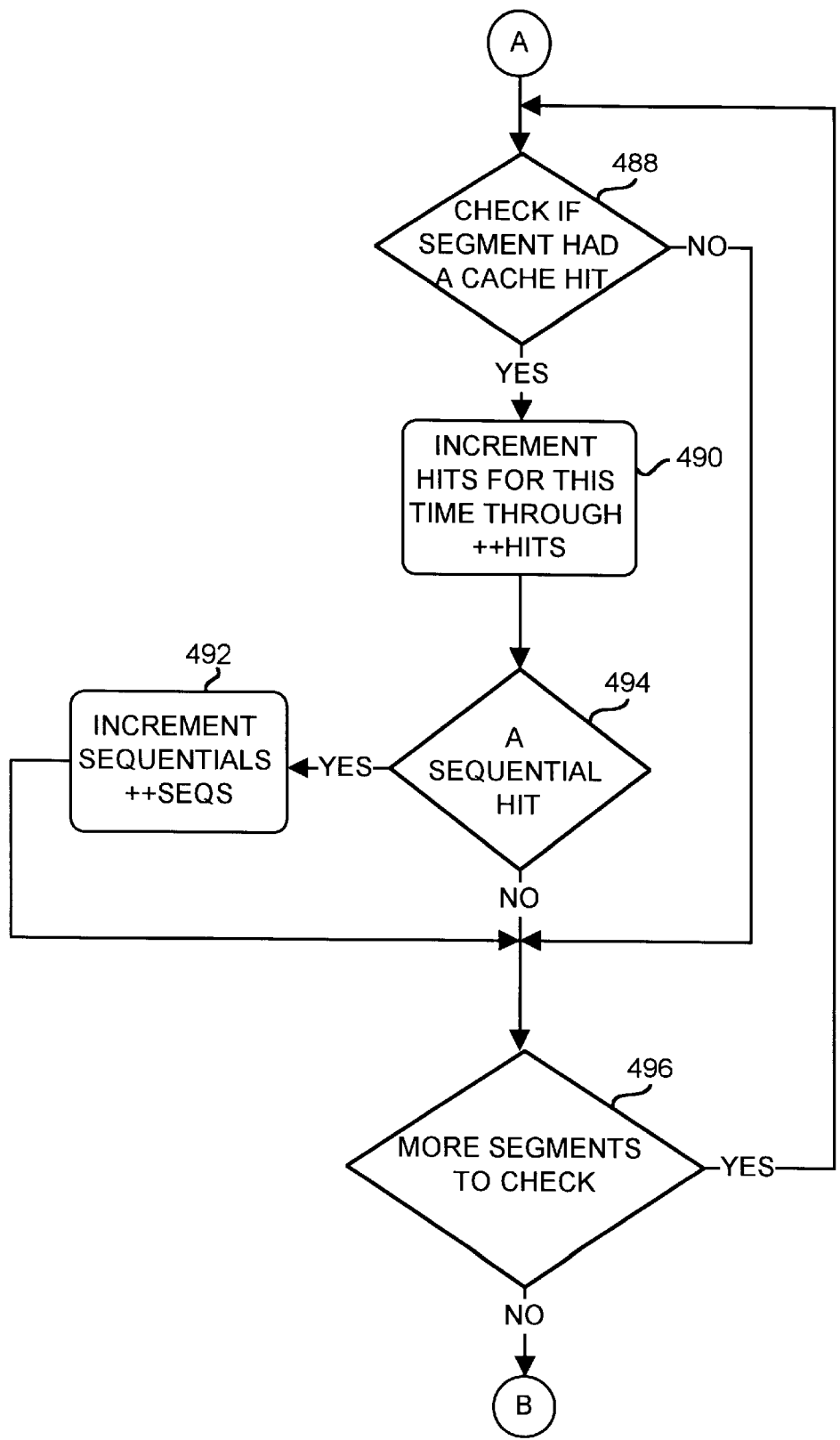
Figure 5C:
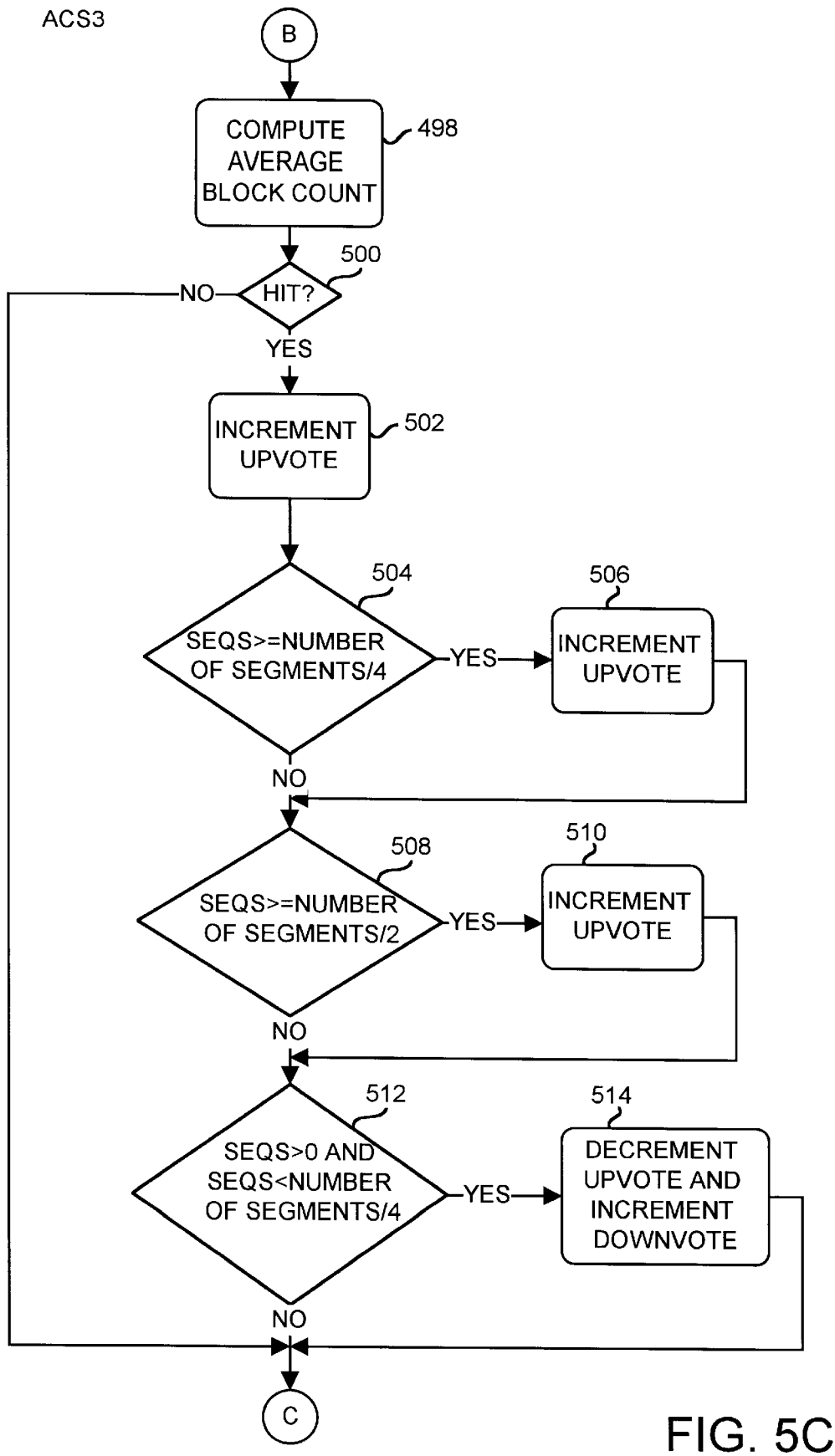
Figure 5D:
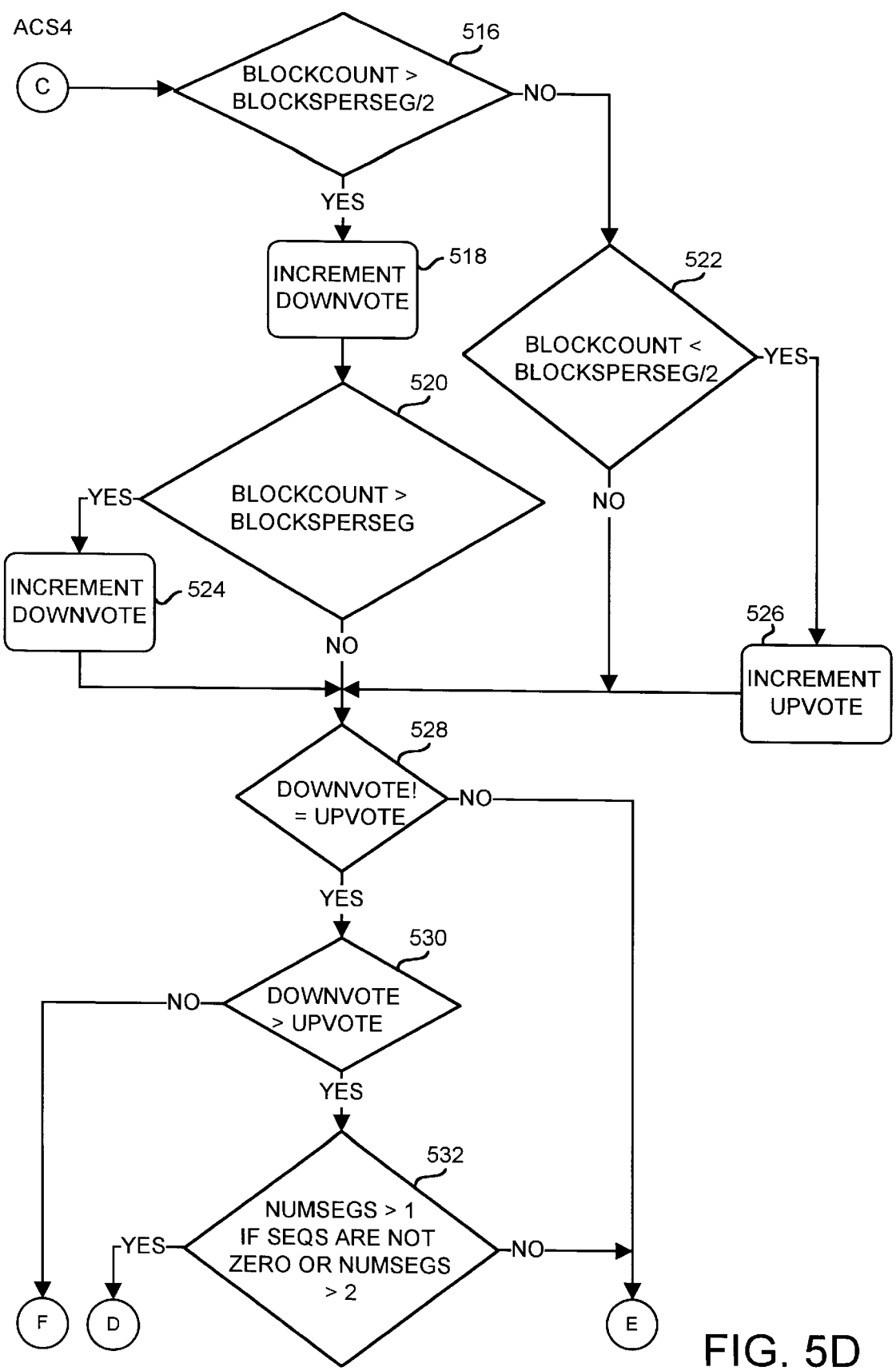
Figure 5E:
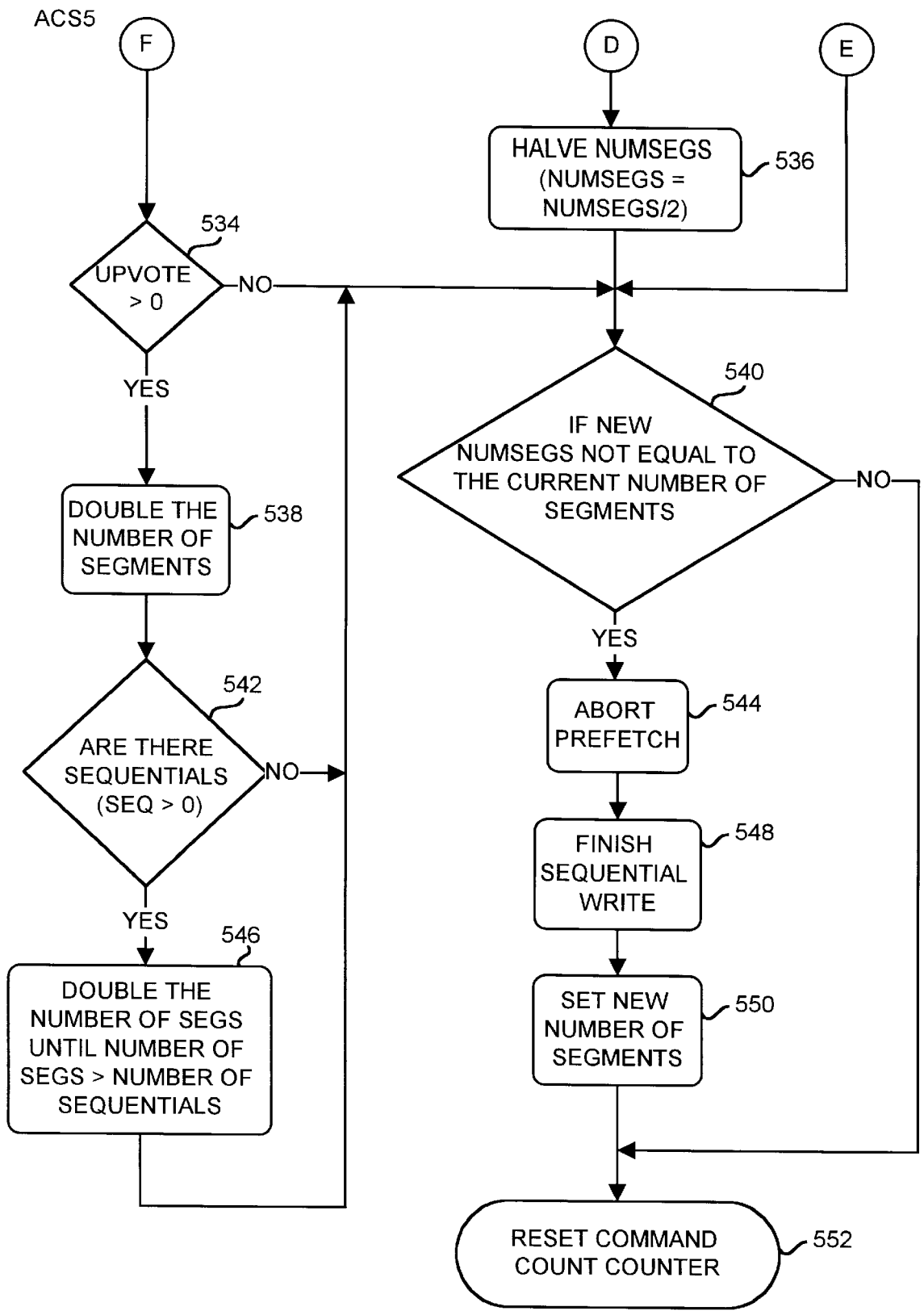

FIG. 4C shows the GetSegment method of the invention. The GetSegment routine returns a segment entry to use and selects that segment according to a priority list and takes the lowest priority segment available.

The GetSegment routine starts in step 864. The method checks if there are any segments in step 866, and if there are no segments, the method determines that there is an error and stops in step 876. Otherwise, the method flows to step 868 and selects the first segment as an active segment. In one embodiment, the method checks the selected segment's sync state, otherwise known as the 'dirty' bit, and if the segment is unsynced, the method syncs the segment before proceeding to search for a segment. Syncing a segment involves writing cached write data to the media 40 that may still be in the segment.

In step 868, the first segment is set as the selected segment and the method proceeds to step 870 to check the state of the segment. If the state of the segment is active and the segment is not empty, then the method flows to step 872 to select the next segment. In step 874, the method checks to make sure that a nonactive segment is available. If the method is out of segments in step 874, the method continues to step 876, finds an error and stops. Otherwise, the method returns to step 870 to check the new selected segment to determine whether the segment is an active segment and not empty. When the method finds a segment that is either not active, or active and empty, the method finishes by returning the segment number in step 878.

Refer now to FIGS. 5A, 5B, 5C, 5D and 5E, that show an adaptive caching method of the invention. The adaptive caching method provides for modifying the number of the segments in the cache 10. The disk drive 9 determines the number of segments to use for optimal performance and, when required, changes the number of segments during normal operations. The disk drive 9 transfers data for sequential read commands without the latency time of the disk revolution between each command.

The adaptive caching method begins in step 474 and proceeds to step 476 to save the blockcount for the last 16 commands. BlockCount is a measure of the number of blocks requested by a command. In step 478, the method checks to see whether cmdCount is equal to zero or if the adaptive number of segments is not enabled or if native mode is set. If any of these conditions is true, the method proceeds to step 480 to decrement cmdCount by one if cmdCount is greater than zero. The initial value of cmd- Count is predetermined. In one embodiment of the invention, cmdCount may be initialized to 200, so that the adaptive caching method proceeds to step 484 after 200 commands. This provides for reevaluating the cache strategy after every 200 commands. After decrementing cmdCount, the method exits in step 482. The invention can also take into account the commands in the drive command queue when determining to increase or decrease the number of segments. For example the command manager decodes the command descriptor block which includes the command's lba and blockCount. The command's lba and blockCount may then be used to determine the command's expected cache access type. These cache access types may be used following the methods described herein to adaptively increase or decrease the number of segments. This allows the invention to anticipate the type of caching environment for commands that have not yet been processed but are in the command queue.

If the predetermined number of commands have been processed and cmdCount is equal to zero in step 478, and the adaptive number of segments is enabled, the method proceeds to step 484 to set the counters upvote and downvote to zero. The method continues to step 486 to set the selected segment equal to the first segment.

The method then checks the segments to determine whether each segment had a cache hit, and if so, the type of hit. The number of hits and the types of hits are used to determine the adaptive caching strategy.

The method proceeds to step 488 to check if the selected segment has a cache hit. If the selected segment does not have a cache hit, the method proceeds to the next segment in step 496. If the selected segment had a cache hit, the method increments a hits counter by one in step 490. The hits counter counts the number of cache hits in the priority list 52. The method continues to step 494 to check to see whether the cache hit was a sequential hit. If the cache hit was a sequential hit, the method increments the seqs counter by one in step 492. After checking for hits and sequential hits, the method proceeds to step 496 to determine whether there are more segments to check. If there are more segments to check the method then loops back to step 488 to check if the selected segment has a cache hit.

After all the segments have been checked, the method proceeds to step 498 to compute an average block count. After computing the average block count, the method proceeds to step 500 to check to see if there were any hits. If there are no hits, the method proceeds directly to step 516 to determine if the block count is greater than the number of blocks per segment divided by two, to make sure that there is room for two commands worth of data on average in the segment.

If the method finds a cache hit in step 500, then the method proceeds to step 502 to increment the upvote counter by one. The method then proceeds to step 504 to determine whether the seqs counter is greater than or equal to the number of segments divided by four, indicating that over one quarter of the segments are sequential. If true, the method proceeds to step 506 to increment upvote by one because the invention is intending to increase the number of segments to the number of sequentials observed. After testing against the number of segments divided by four, the method proceeds to step 508 to determine whether the seqs counter is greater than or equal to the number of segments divided by two, indicating that over half of the segments are sequential. If true, the method proceeds to step 510 to increment upvote by one, again to drive the number of segments to the number of sequentials observed. The method then continues to step 512 to determine whether seqs is greater than zero and if seqs is less than the number of segments divided by four, indicating less than one quarter of the segments are sequential. If these conditions are true, the method proceeds to step 514 to decrement upvote by one and increment downvote by one because the invention is intending to make the number of segments equal to the number of sequentials.

Other methods of determining the number of segments may be used without deviating from the scope and spirit of the invention. For example by determining the number of sequential streams currently in the cache and setting the number of segments one more than the number of sequential streams currently in the cache allows the invention to handle all the sequential streams currently occurring plus additional data or an additional sequential stream. The invention first counts the number of sequential streams. One is added to the number of sequential streams to calculate the new number of segments. The SetNumberofSegments routine is called to set the number of segments to the new number of segments. The newly structured cache is now able to handle all currently running sequential streams plus any additional data or sequential streams.

After performing the check in step 512, the method proceeds to step 516 to determine whether blockCount averaged in step 498 is greater than blocksPerSeg divided by two. This step biases the segment size to maintain a segment size large enough to handle blocks requested by commands. If true, the method proceeds to step 518 to increment downvote by one and then to step 520 to determine if blockCount is greater than blocksPerSeg. If blockCount is greater than blocksPerSeg, the method proceeds to step 524 to increment downvote by one. The method then flows to step 528.

If blockCount is not greater than blocksPerSeg divided by two in step 516, then the method proceeds to step 522 to check if the blockCount is less than blocksPerSeg divided by two. If true, the method proceeds to step 526 to increment upvote by one and continues to step 528.

In step 528, the method determines whether downvote is not equal to upvote. If downvote is equal to upvote, the method proceeds to step 540. Otherwise, the method proceeds to step 530 to determine whether downvote is greater than upvote. If true, the method continues to step 532 to check whether numSegs is greater than one if Seqs is not zero, or if the number of segments is greater than two. These checks are performed to determine whether a further adjustment to the number of segments is necessary. For example, if downvote is larger than upvote, blocksPerSeg may be too small to permit more segments.

If the condition of step 532 is true, the method proceeds to step 536 to divide numSegs by two. Otherwise, the method proceeds to step 540. If downvote is not greater than upvote in step 530, then the method proceeds to step 534 to check if upvote is greater than zero. If upvote is greater than zero the method determines that the command history shows that more segments would improve performance. If upvote is not greater than zero, no further adjustments to numSegs is necessary and the method proceeds to step 540. Otherwise, the method doubles the number of segments in step 538.

The method then continues to step 542 to determine whether there are any segments that have sequential cache hits, also known as sequential streams. The method determines that there have been sequential streams if the seq counter is greater than zero. If there are no sequentials, the method continues to step 540. Otherwise, the method proceeds to step 546 to double the number of segments until the number of segments is greater than the number of sequentials. The method then continues to step 540. This ensures that there are enough segments to handle each sequential stream detected by the method.

In step 540, the method checks to see if the new number of segments is not equal to the current number of segments. If the new numSegs are equal to the current number of segments, the method proceeds to step 552 to reset the command count counter. The number of segments in the cache 10 will be reevaluated after the command count counter expires again. In one example, if there are sequential streams, the number of segments is increased to at least one greater than the number of streams, but also as few as possible. If the block counts of commands arriving are larger than half the number of blocks in a segment, decrease the number of segments. If commands are random, and there are no cache hits, the number of segments are increased. The invention predetermines a maximum number of segments, for example sixteen segments may be the maximum number of segments.

If the new number of segments determined by the method is not equal to the current number of segments, the method adjusts the number of segments. In step 544, the method checks whether a prefetch is active, and if so, aborts the prefetch after a minimum prefetch is completed. The method then continues to step 548 to determine if a sequential write operation is active. If a sequential write operation is active, the method waits until the sequential write is completed. While the sequential write operation is completing, the processor may be released to perform other operations. After the sequential write is finished, the number of segments may be adjusted. The method proceeds to step 550 to set the new number of segments. The method calls the SetNumberOfSegments routine and the new number of segments is input into the routine. After the cache 10 is divided into the new number of segments, the method proceeds to step 552 and resets the command count counter.

Thus the invention is able to change the number of segments during normal operations without initiator involvement. In one example, the number of segments are changed while waiting for a seek to complete.

Figure 6A:
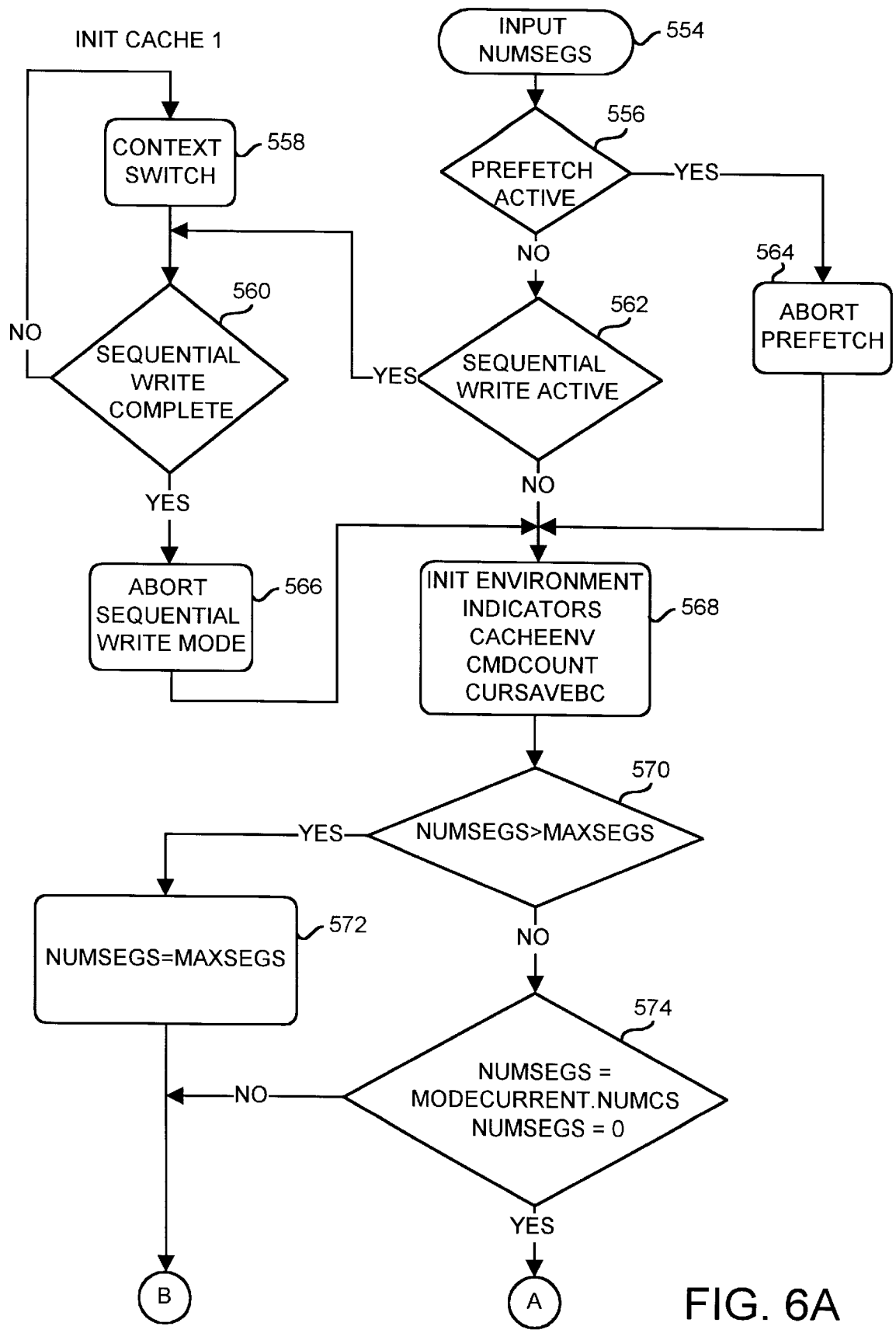
FIGS. 6A, 6B and 6C show a method of the invention for initializing a cache.
Figure 6B:
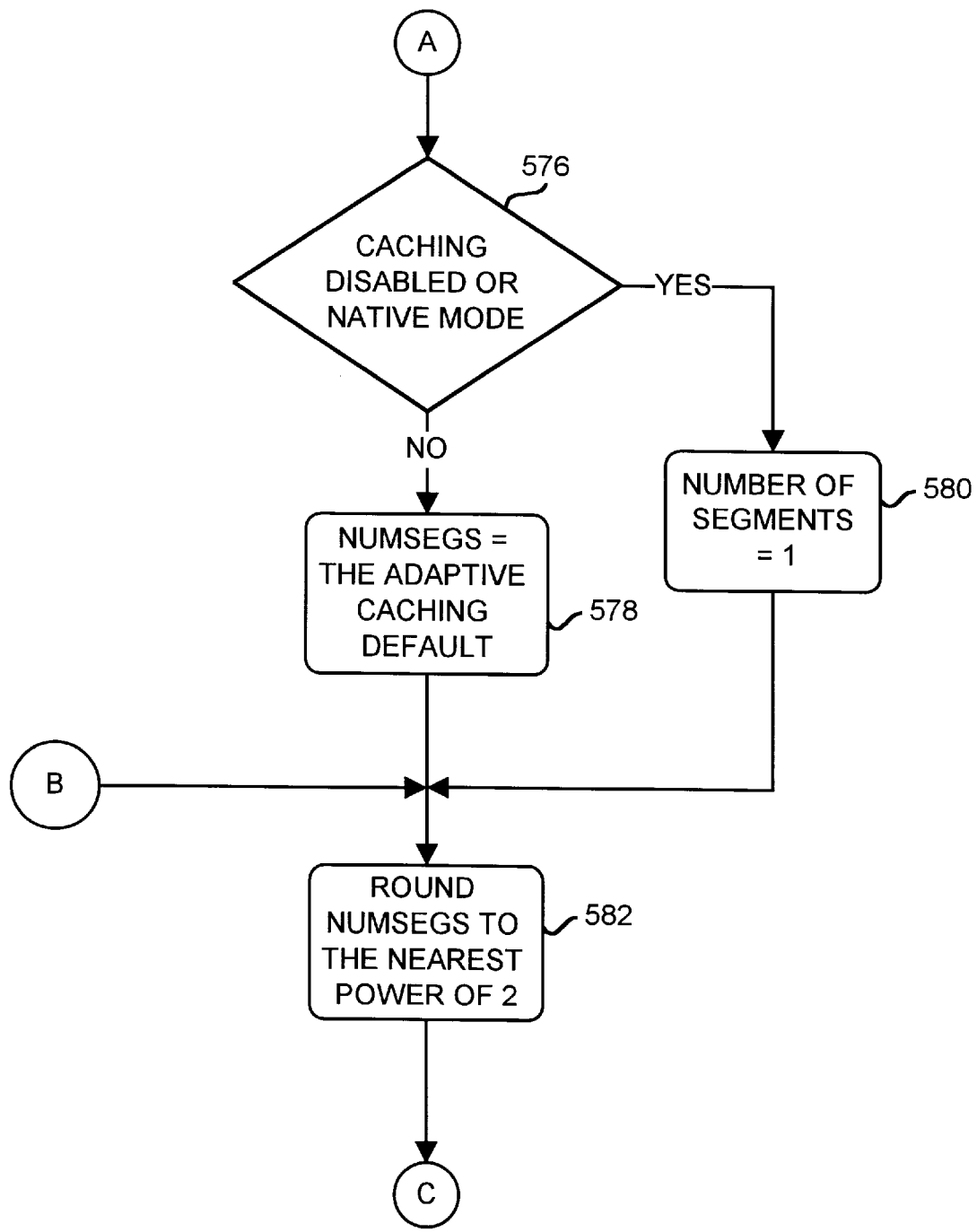
Figure 6C:
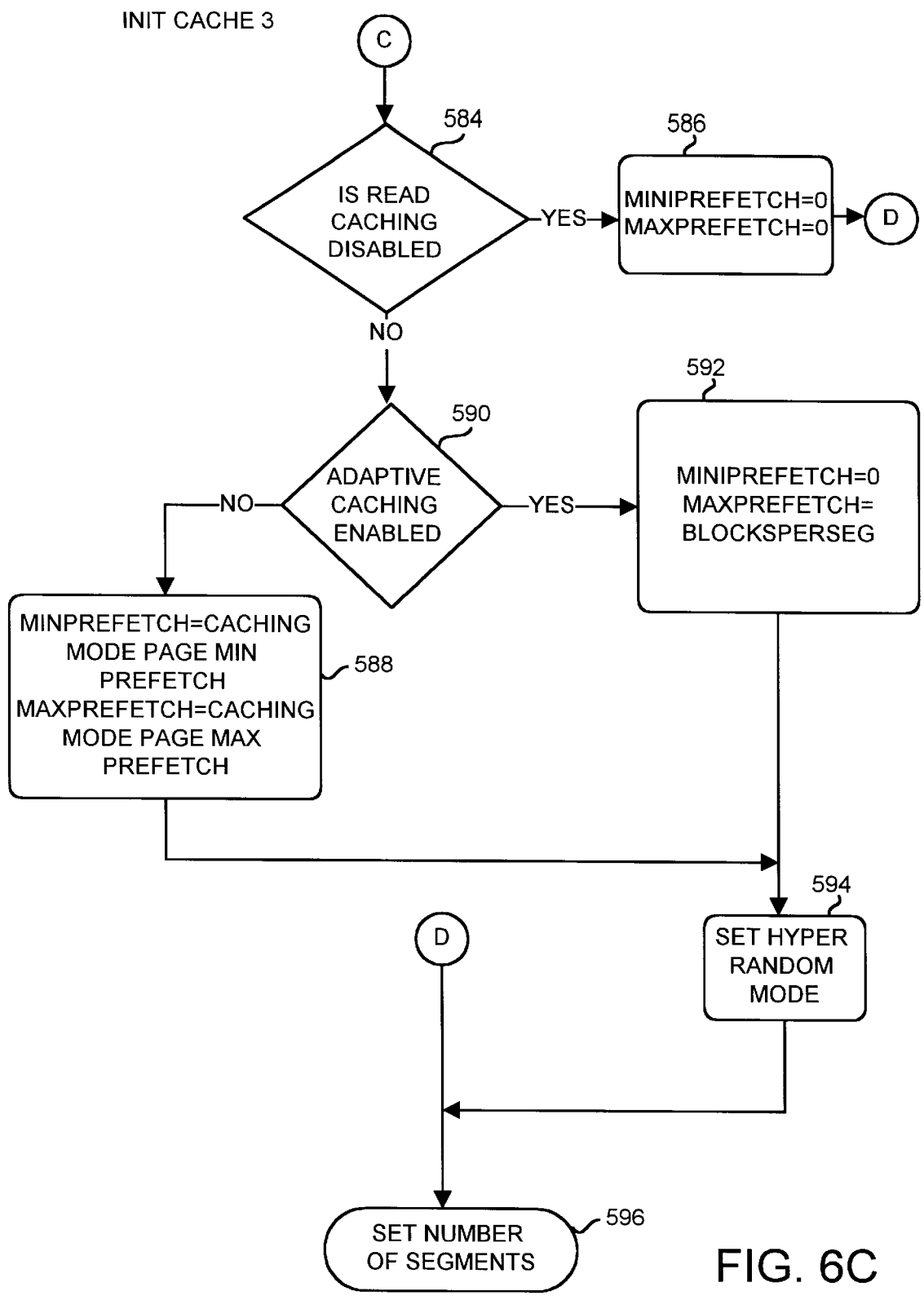

Refer now to FIGS. 6A, 6B and 6C, that show a method of the invention for initializing a cache. The method of the invention for initializing a cache, InitCache, sets the number of segments, segment size and blocks per segment. InitCache also initializes the segment list and the adaptive caching variables.

The method begins in step 554 by inputting the number of segments into which the cache will be divided into the routine. The method then flows to step 556 where the method checks to see whether the prefetch is active. If the prefetch is active, the method flows to step 564 where the prefetch is aborted. The prefetch is aborted whether or not a minimum prefetch is complete.

If the prefetch is not active, the method flows to step 562 to check whether a sequential write operation is active. If a sequential write operation is active, then the method flows to step 560 to check if the sequential write operation has completed. If the sequential write is not complete, then the method performs a context switch in step 558 to release the processor to perform other operations and loops back to step 560 to check whether the sequential write has completed. When the sequential write completes in step 560, the method proceeds to step 566 to abort the sequential write mode. The sequential write mode must be aborted before the cache may be initialized.

The method continues in step 568 to initialize the environment indicators to a basic setting. Adaptive caching is disabled and the cache environment is set to random mode. CmdCount and CurSaveBC are initialized. The method then flows to step 570 to check if the number of segments input in step 554 is greater than the maximum number of segments allowed. If the number of segments input in step 554 is greater than the maximum number of segments allowed, then the method proceeds to step 572 where the number of segments to divide the cache into is set equal to the number of maximum segments allowed. The method then proceeds to step 582 to round the number of segments to the nearest power of two.

If the number of segments input in step 554 is not greater than the maximum number of segments permitted in step 570, the method proceeds to step 574 where the method checks to see if the number of segments input in step 554 is equal to zero. If the number of segments input is equal to zero, then the process continues to step 576 to check to see if caching is disabled or if native mode is set. If caching is disabled or native mode is set, then the method proceeds to step 580 to set the number of segments equal to one. Otherwise, the number of segments is set equal to the adaptive cache default in step 578. In one embodiment, the default number of segments is two segments.

After the number of segments has been determined or adjusted, the method flows to step 582 to round the number of segments down to the nearest power of two. In one embodiment, the number of segments may be rounded down to the nearest power of two by shifting the binary variable numSegs right until numSegs equals zero. Then numSegs shifts a "1" left the same number of times to round down to the nearest power of two.

When the number of segments has been rounded down to the nearest power of two, the method continues to step 584 to check to see whether read caching is disabled in the mode page 8 parameters. If read caching is disabled, the method flows to step 586 to set the minimum prefetch amount, minprefetch, and the maximum prefetch amount, maxprefetch, to zero. Otherwise, if read caching is not disabled, the method proceeds to step 590 to check whether adaptive caching has been enabled. If adaptive caching is enabled, then the method flows to step 592 where minprefetch is set equal to zero and maxprefetch equal to the number of blocks per segment. The method then proceeds to step 594 where hyper random mode is set. If adaptive caching is not enabled, then the minprefetch and maxprefetch values are set from a caching mode page in step 588. In one example embodiment, these values may not exceed the number of blocks per segment. The method then continues to step 594 where hyper random mode is set. After the minprefetch and maxprefetch values are set, the method concludes by setting the number of segments in step 596.

When the commands sent to the disk drive 9, from one or more than one initiator 50, are randomly accessing the drive, prefetching is turned off accordingly. The extra step of aborting the prefetch for each command wastes time when the disk drive 9 is being randomly accessed. A significant performance advantage is achieved by recognizing this situation and eliminating prefetch. The invention determines when to prefetch and when not to prefetch. The invention turns prefetch on for cache hits and sequential operations and turn prefetch off during random access.

Figure 7A:
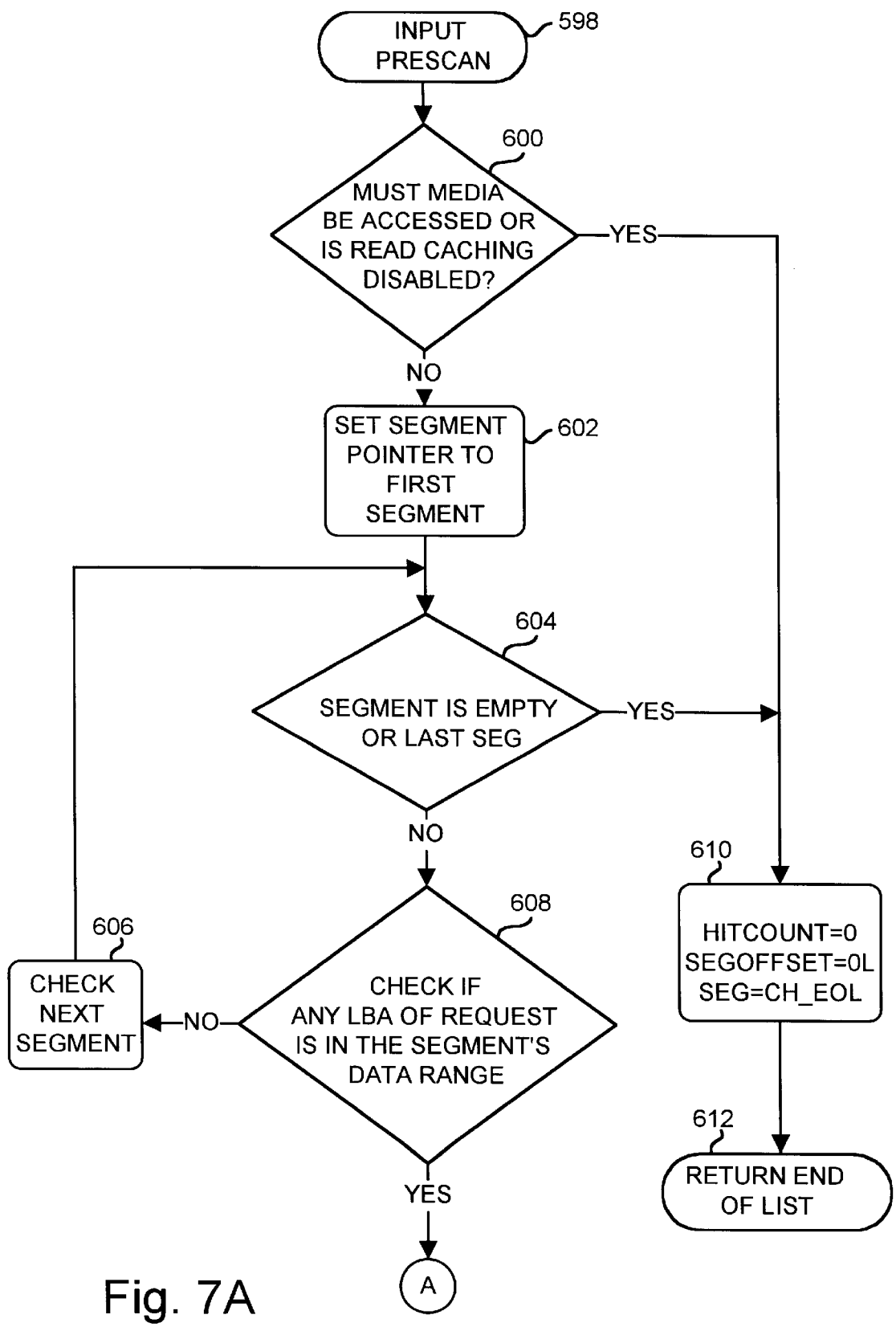
FIGS. 7A and 7B show a method of the invention for performing a scan of the cache for a read or a read extended command.
Figure 7B:
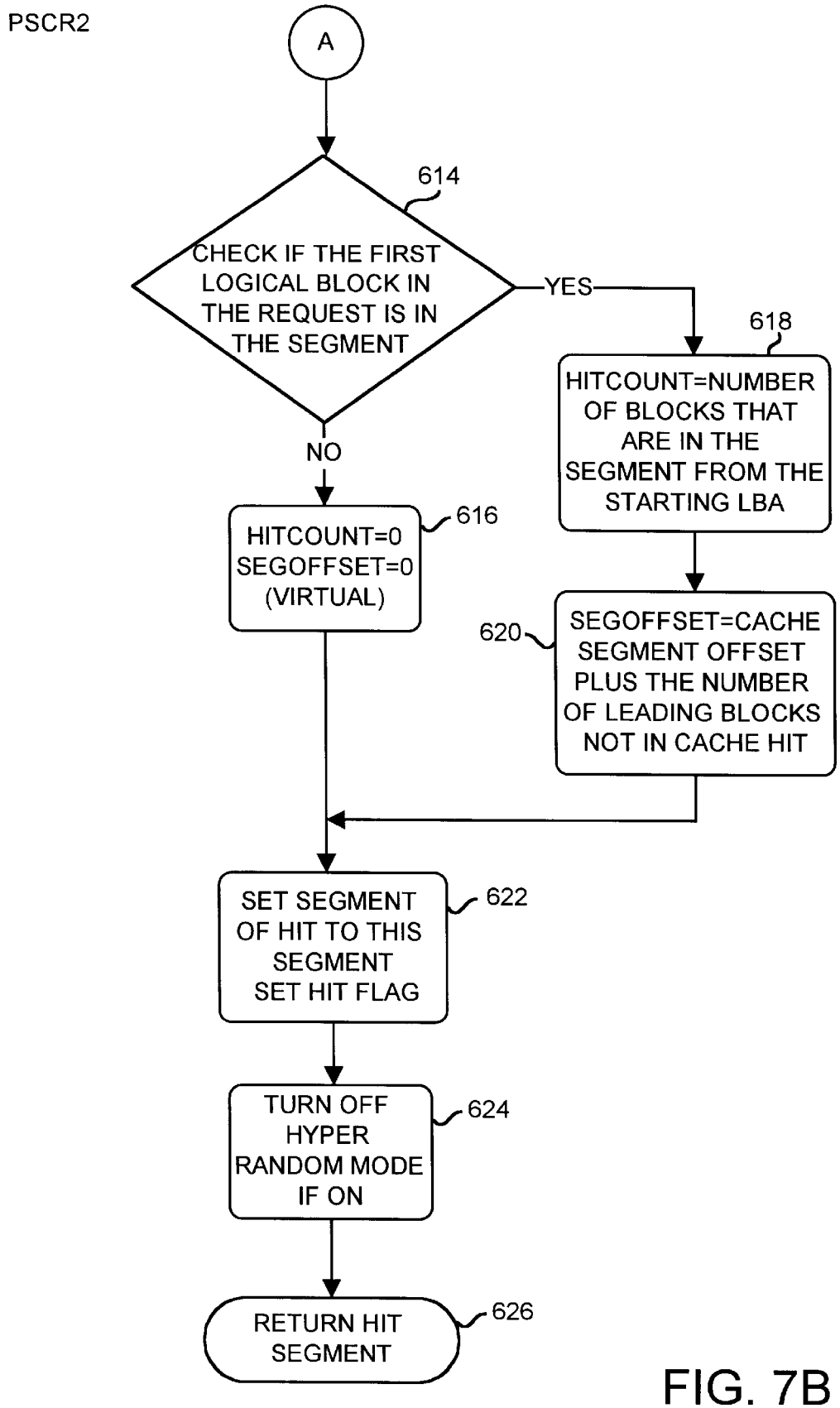
Figure 8A:
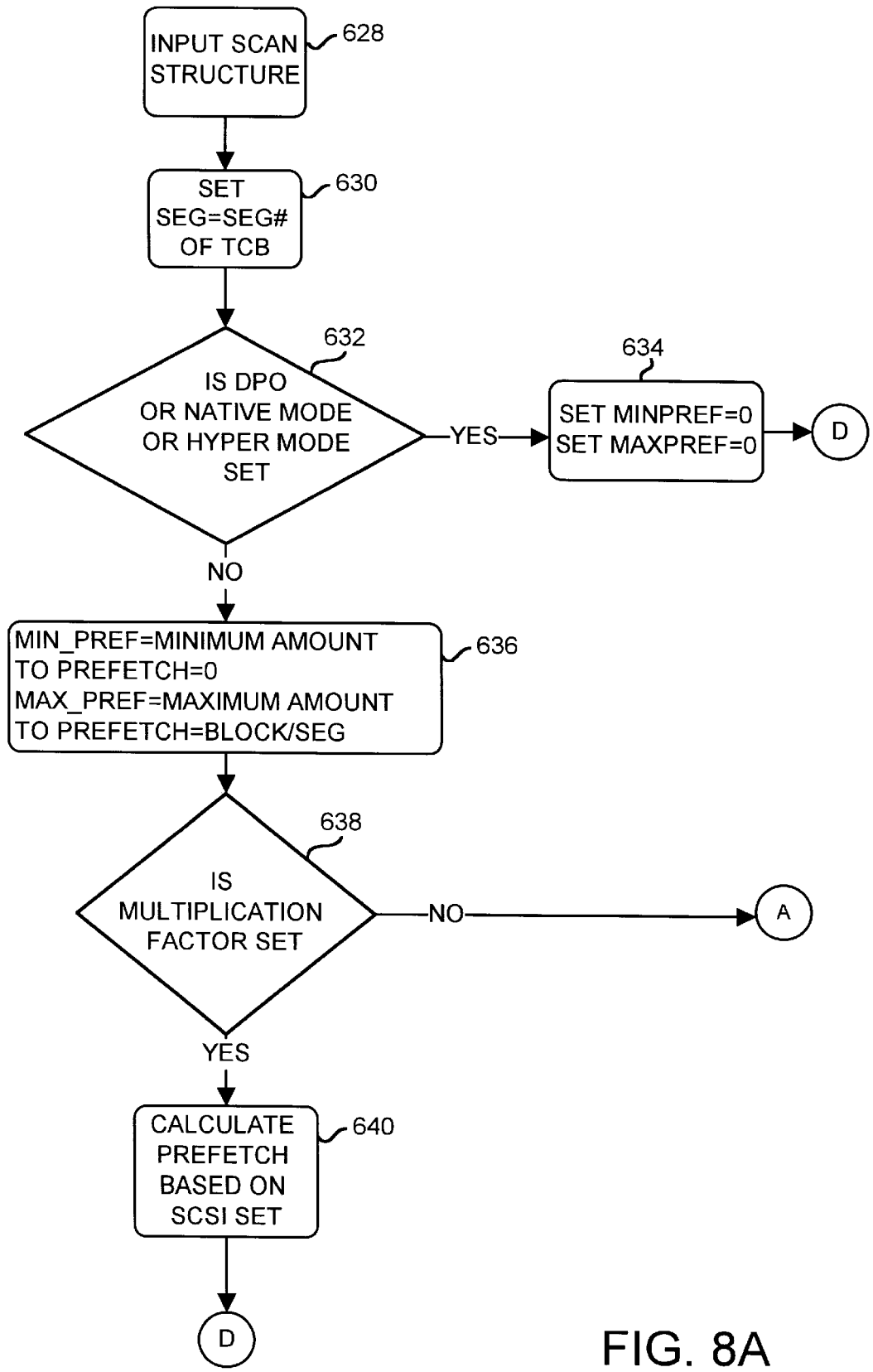
FIGS. 8A, 8B, 8C, 8D and 8E show a method of the invention to compute parameters for a prefetch.
Figure 8B:
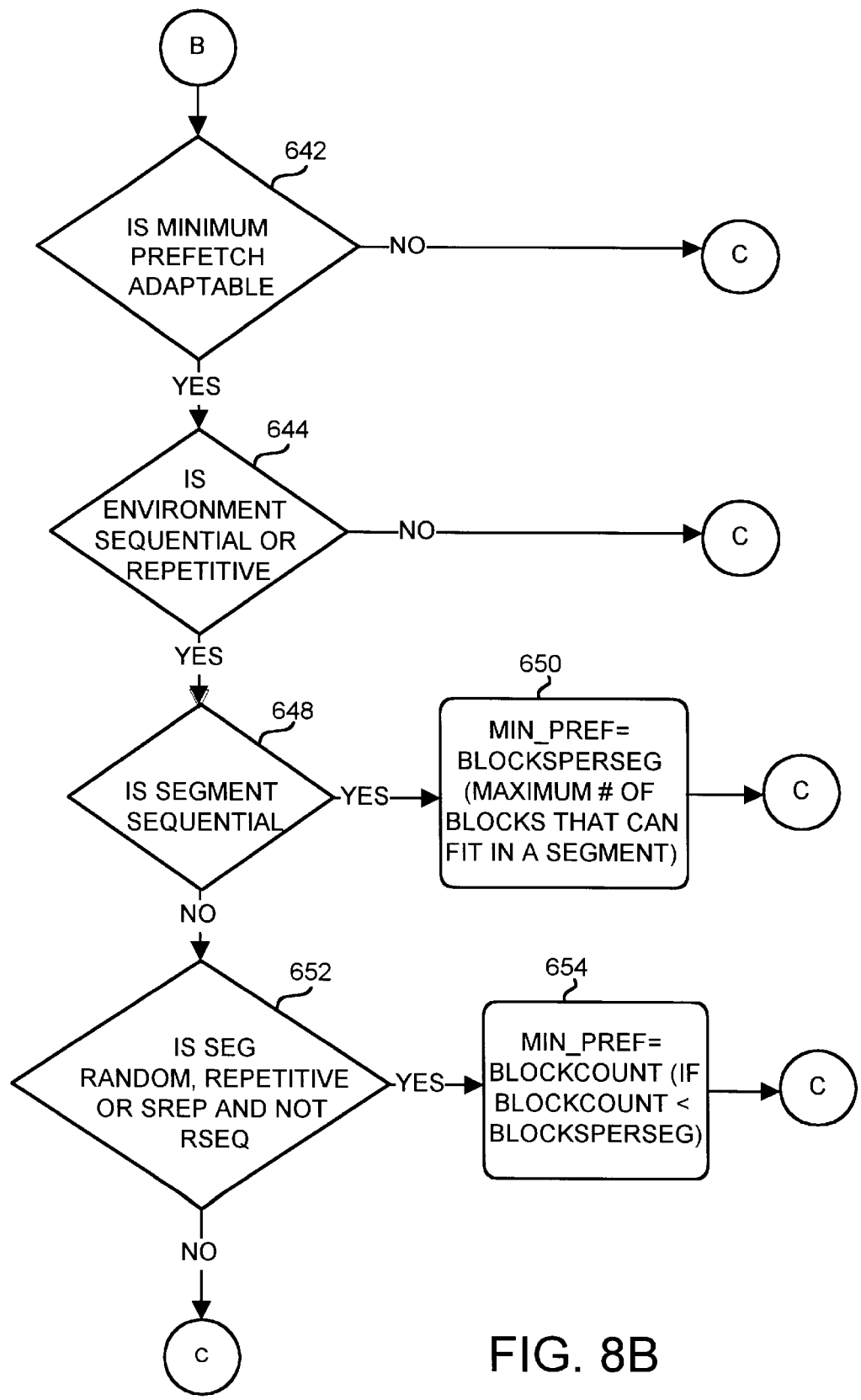
Figure 8C:
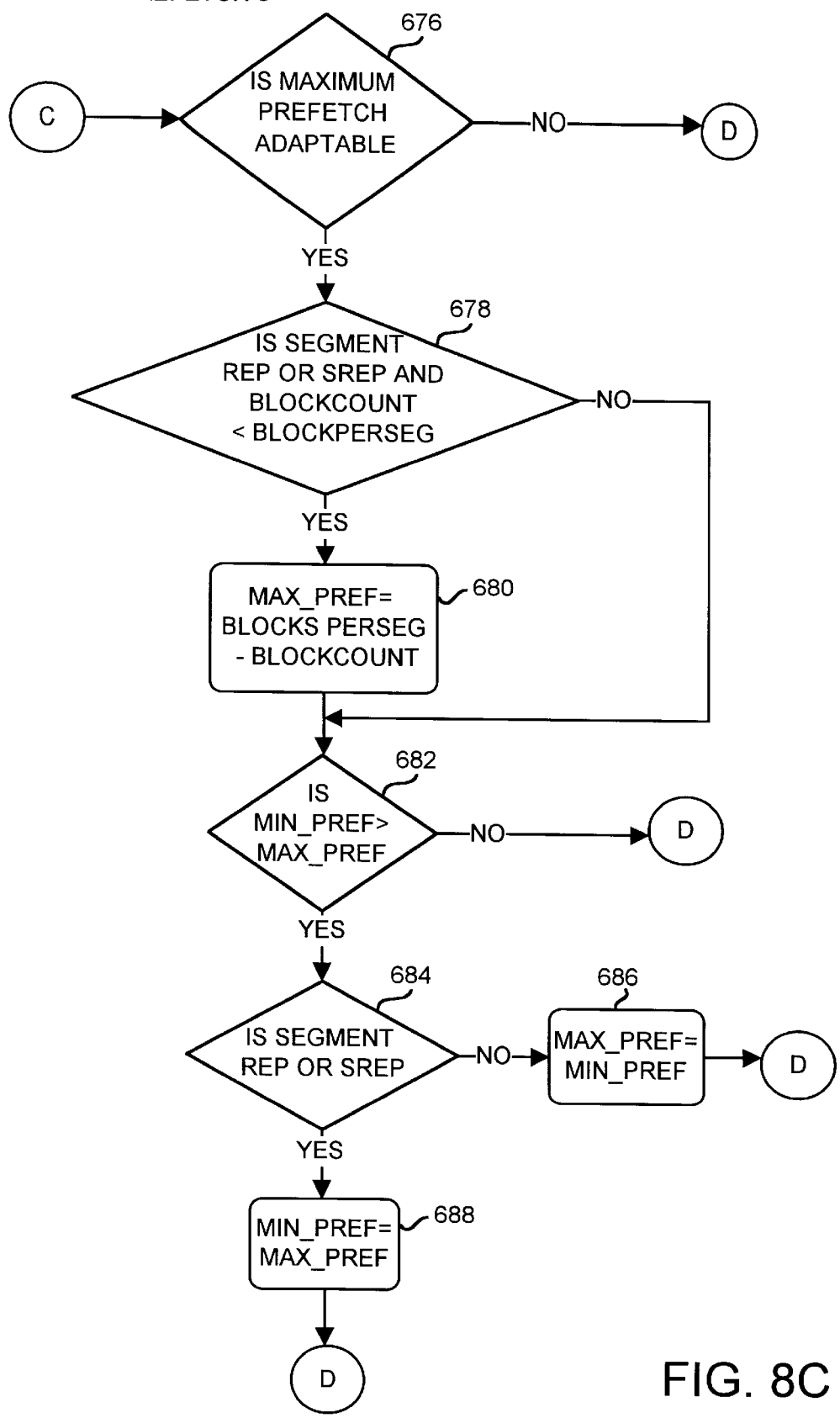
Figure 8D:
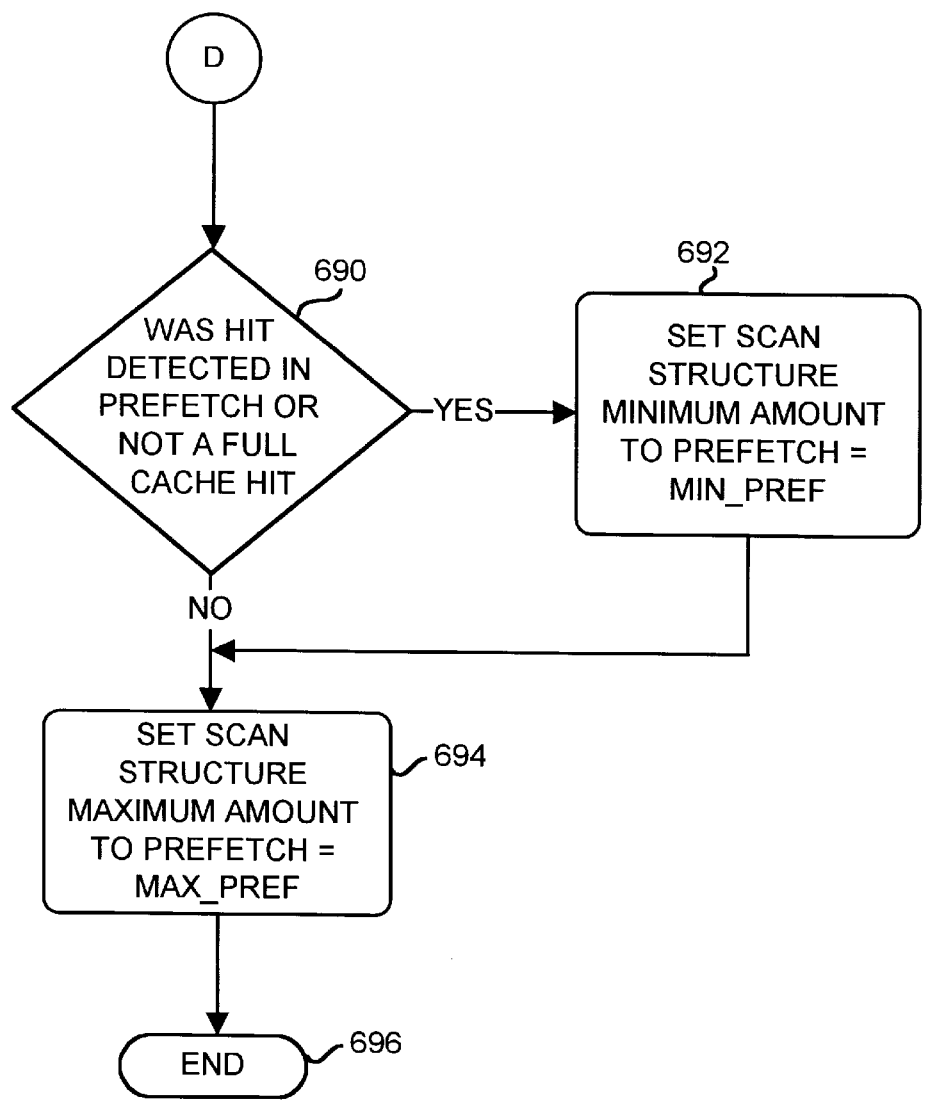
Figure 8E:
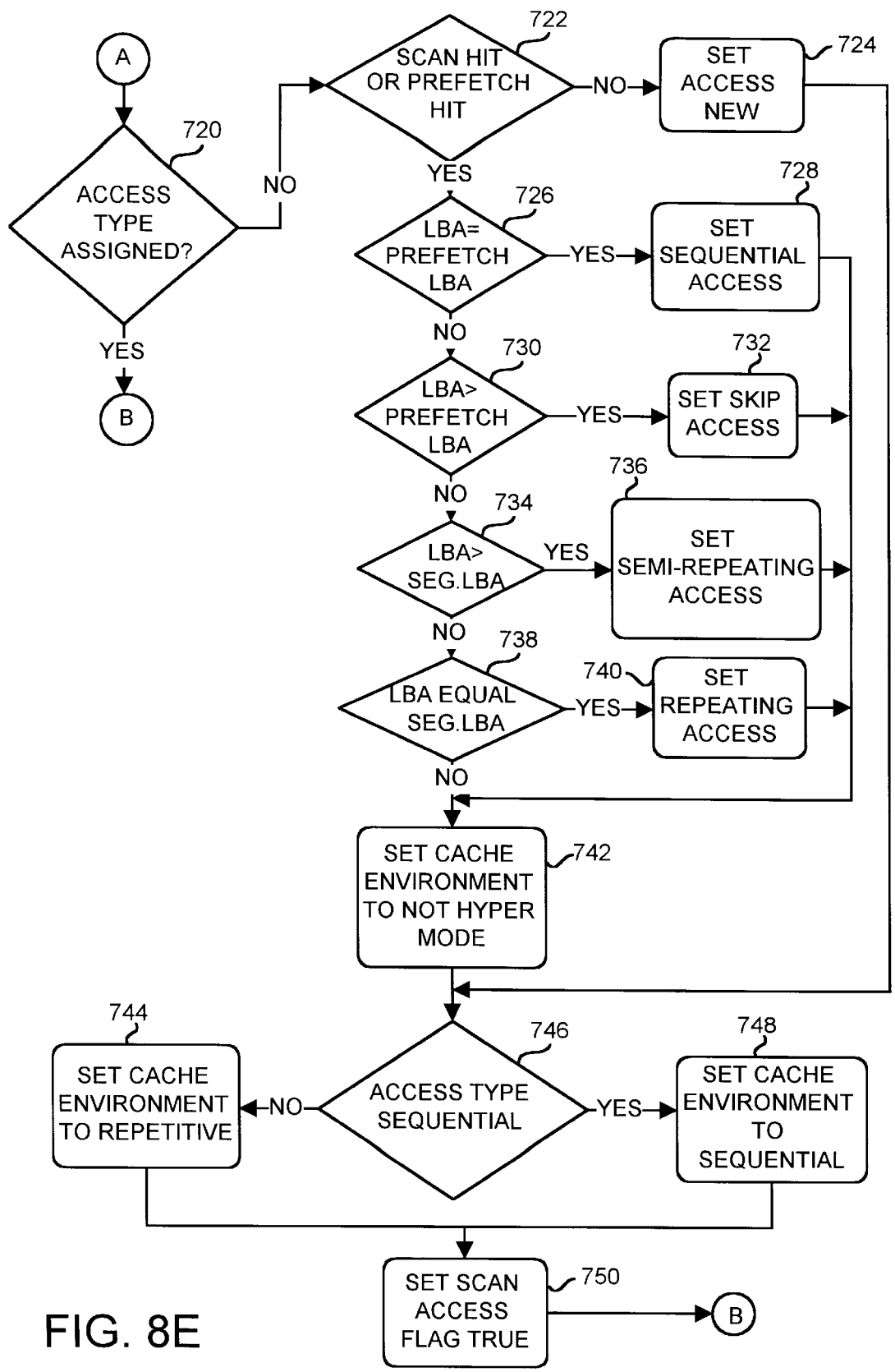

Refer now to FIGS. 7A and 7B that show a method of the invention for performing a scan cache for a read or read extended command. The scan cache method, implemented as the PreScanCacheRead routine, receives as an input a pointer to a task control block. The PreScanCacheRead routine determines whether there is a cache hit. If there is a cache hit, the method returns the segment number of the segment containing the cache hit, the access type as shown in FIG. 1G, a hit count and a segment offset for the cache hit.

The PrescanCacheRead method of the invention begins in step 598 where the method receives a pointer to the task control block. The method then proceeds to step 600 to determine whether the method should scan for a hit. The method does not scan for a hit if the FUA bit is set, indicating that the media 40 must be accessed for this command. The method also does not scan for a hit if read caching is disabled, which indicates that the media 40 must be accessed for this command. If any of these conditions are true, the method proceeds to step 610 to set hitCount equal to zero, SegOffset is set to zero and Seg is set to the CH_EOL. These results indicate that there are no further cache entries and no further checks need to be made. The method then proceeds to step 612 to return the end of list, CH_EOL, indicating a cache miss, shown as access request 174 or 176 on FIG. 1G.

If the method determines that a scan for a hit should be performed, then the method proceeds to step 602 to set the segment pointer to the first segment. The method then proceeds to step 604 to check if the segment pointer is set to a segment that is empty or the last segment. If this condition is true, the method proceeds to step 610. Otherwise, the method proceeds to step 608 to check if any logical block address of the request is in the segment's data range.

If none of the logical block addresses of the request are in the segment's data range, the method proceeds to step 606 to check the next segment and loops back to step 604.

Otherwise, when a logical block address of a request is determined to be in the segment's data range in step 608, then the method proceeds to step 614 to check if the first logical block address in the request is in the segment. If the first logical block address of the request is not in the segment, then the method sets hitCount equal to zero and SegOffset equal to zero and determines a virtual hit in step 616.

If the first logical block address of the request is in the segment, the method proceeds to step 618 to set hitCount equal to the number of blocks that are in the segment from the starting logical block address of the request. The method then proceeds to step 620 where SegOffset is set equal to the cache segment offset plus the number of leading blocks not in the cache hit. After hitCount and SegOffset are set, the method proceeds to step 622 to set the segment of the hit to the current segment and to set the hit flag. The method then proceeds to step 624 to turn off hyper random mode if activated and to return the hit segment in step 626.

Refer now to FIGS. 8A, 8B, 8C and 8D, which show a method of the invention to compute parameters for a prefetch. The ComputePrefetch method computes a maximum prefetch, MaxPrefetch, which is an amount of prefetch, in blocks, to cache. The method computes MaxPrefetch based upon a selected prefetch strategy. Compute prefetch also computes a minimum prefetch, MinPrefetch, which is a minimum amount of prefetch in blocks to prefetch when prefetch is active.

TABLE 7

Scan_T Structure

| | |
|---|---|
| tcb | Pointer to task control block obtained by command manager |
| segOffset | Relative to beginning of segment address of cache hit in blocks |
| hitCount | Number of blocks that are in buffer that satisfy request |
| prefetch | Maximum number of blocks to prefetch |
| min_ref | Minimum number of blocks to prefetch |
| seg | Segment to use for this command to satisfy request |
| flags | See Table 8 |

TABLE 8

Values for variable 'Flags' in Scan Structure

| | |
|---|---|
| clear | Initial condition, nothing has happened, or use this scan structure |
| TCB | There is a time frame where a scan has been allocated and no tcb has been assigned. If true the tcb has been assigned. |
| pres | If true prescan is done |
| Gimme | If true Gimmeseg is done |
| atype | Access type has been determined |
| update | If true update cache has finished |
| hit | Cache hit on segment |
| SCN_PF_HIT | Cache hit in prefetch |
| Error | Caching code sets this on errors |

The method of the invention begins in step 628 by passing the scan structure, shown in Table 7 and Table 8, to the routine. Table 8 shows the flags' values that indicate how far processing has proceeded. For example, if the atype value is true, the cache access type has been determined. This mechanism provides a method for monitoring the progress of the caching system as commands are processed. The method then proceeds to step 630 where Seg is set to equal the segment number of the task control block. The method then proceeds to step 632 to check if the DPO flag is set or if native mode is set or if the environment is in hyper mode. If any of these conditions are true, the prefetch parameters will not be computed. In this case, the method proceeds to step 634 to set the MinPref and MaxPref equal to zero. The method then proceeds to step 690.

If the conditions of step 632 are not true, then the method computes the prefetch parameters. The method sets min_pref equal to the minimum amount to prefetch that, for example, may be zero, and the max_pref equal to the maximum amount to prefetch in step 636. The maximum amount to prefetch may be limited to the blocks per segment, blocksPerSeg.

The method then proceeds to step 638 to check if a multiplication factor is set. The multiplication factor indicates that the prefetch is calculated based on the block count of the command. If the multiplication factor is set, then the method proceeds to step 640 to calculate a prefetch based on an available SCSI set, and continues to step 690.

If the multiplication factor is not set then the method proceeds to step 720 to check if an access type is assigned. These access types are illustrated in FIG. 1C. If an access type is assigned, then the method proceeds to step 642.

If an access type is not assigned, then the method proceeds to assign an access type using the following procedure. In step 722, the method determines if there was a scan cache hit or a prefetch hit. If there was no scan cache hit or prefetch hit in step 722, then the access type is set as new in step 724.

If there was a scan cache hit or a prefetch hit, the method proceeds to step 726 to check if the logical block address of the hit is equal to the prefetch logical block address. If this condition is true, then the access type is set as sequential access in step 728. Otherwise, the method checks in step 730 to see if the logical block address is greater than the prefetch logical block address. If this condition is true, then the access type is set as skip access in step 732. Otherwise, the method checks if the logical block address is greater than the segment logical block address in step 734. If this true, the access type is set as semi-repeating access in step 736. Otherwise, the method checks to see if the logical block address is equal to the segment logical block address in step 738. If this condition is true, then the access type is set as repeating access in step 740.

Unless the access type was set as new in step 724, the method then proceeds to step 742 to set the cache environment to not hyper mode. The method then continues to step 746 to check if the access type is sequential or skip sequential. If the access type is set to sequential or skip sequential, then the method proceeds to step 748 to set the cache environment to sequential. Otherwise, the cache environment is set to repetitive in step 744. The method finishes assigning the access type in step 750 by setting the scan access flag true.

Once the access type is determined, the method proceeds to step 642 to determine if the minimum prefetch amount is adaptable as specified by the mode page 8 parameter described below. If the minimum prefetch amount is not adaptable, the process proceeds to step 676 to see if the maximum prefetch is adaptable.

If the minimum prefetch is adaptable then the method calculates a minimum prefetch. The method proceeds to step 644 to check if the environment is sequential or repetitive. If the environment is neither sequential nor repetitive, the process proceeds to step 676. Otherwise, the method determines whether the segment is sequential in step 648. If the segment is sequential, the method sets the min_pref equal to the blocks per segment, since a large prefetch is desirable for sequential streams to maximize efficiency. The blocks per segment is the maximum number of blocks that can fit in a segment. After min_pref is set in step 650, the process proceeds to step 676.

If the segment is determined to not be sequential in step 648, the method continues to step 652 to determine whether the segment is random, repetitive or semi-repeating (srep), and not skip ahead sequential (rseq). If this condition is true, the method sets min_Pref equal to blockCount in step 654. Min_Pref is set equal to blockCount if blockCount is less than the blocksPerSeg. BlocksPerSeg is the maximum number of blocks that can fit in the segment. BlockCount is the number of blocks a command is requesting. The method then proceeds to step 676.

In step 676, the method checks to see if the maximum prefetch is adaptable. If the maximum prefetch is not adaptable, the maximum prefetch is not computed and the method proceeds to step 690.

If the maximum prefetch is adaptable the method proceeds to step 678 to determine whether the segment access type is rep or srep and that blockCount is less than the blocksperseg. If this condition is true, the method continues to step 680 to set the max_pref equal to BlocksPerSeg minus blockCount. By subtracting blockCount from the blocksPerSeg for the maxprefetch, the method of the invention avoids overwriting data that may be re-requested.

The method then proceeds to step 682 to check whether the min_pref is greater than max_pref. If min_pref is not greater than max_pref then the method proceeds to step 690. If min_pref is greater than max_pref then the method proceeds to step 684 to determine whether the segment access type is repeating access or semi-repeating access. If the segment access type is repeating or semi-repeating then min_pref is set equal to max_pref in step 688 and the process continues to step 690. Otherwise, max_pref is set to equal to min_pref in step 686 and the method proceeds to step 690. This procedure allows the method to set a maximum prefetch so that re-requested data is not overwritten by keeping the minimum prefetch equal to the maximum prefetch. However, if the segment is not repeating or semi-repeating, the method sets the maximum prefetch to equal the minimum prefetch, so that as much data may be prefetched as possible.

In step 690, the method determines if a hit was detected in the prefetch or if the hit was not a full cache hit. If so, the method proceeds to step 692 to set the scan structure minimum amount to prefetch equal to min_pref. The method then proceeds to step 694 to set the scan structure maximum amount to prefetch to equal max_pref. The method concludes in step 696.

Figure 9:
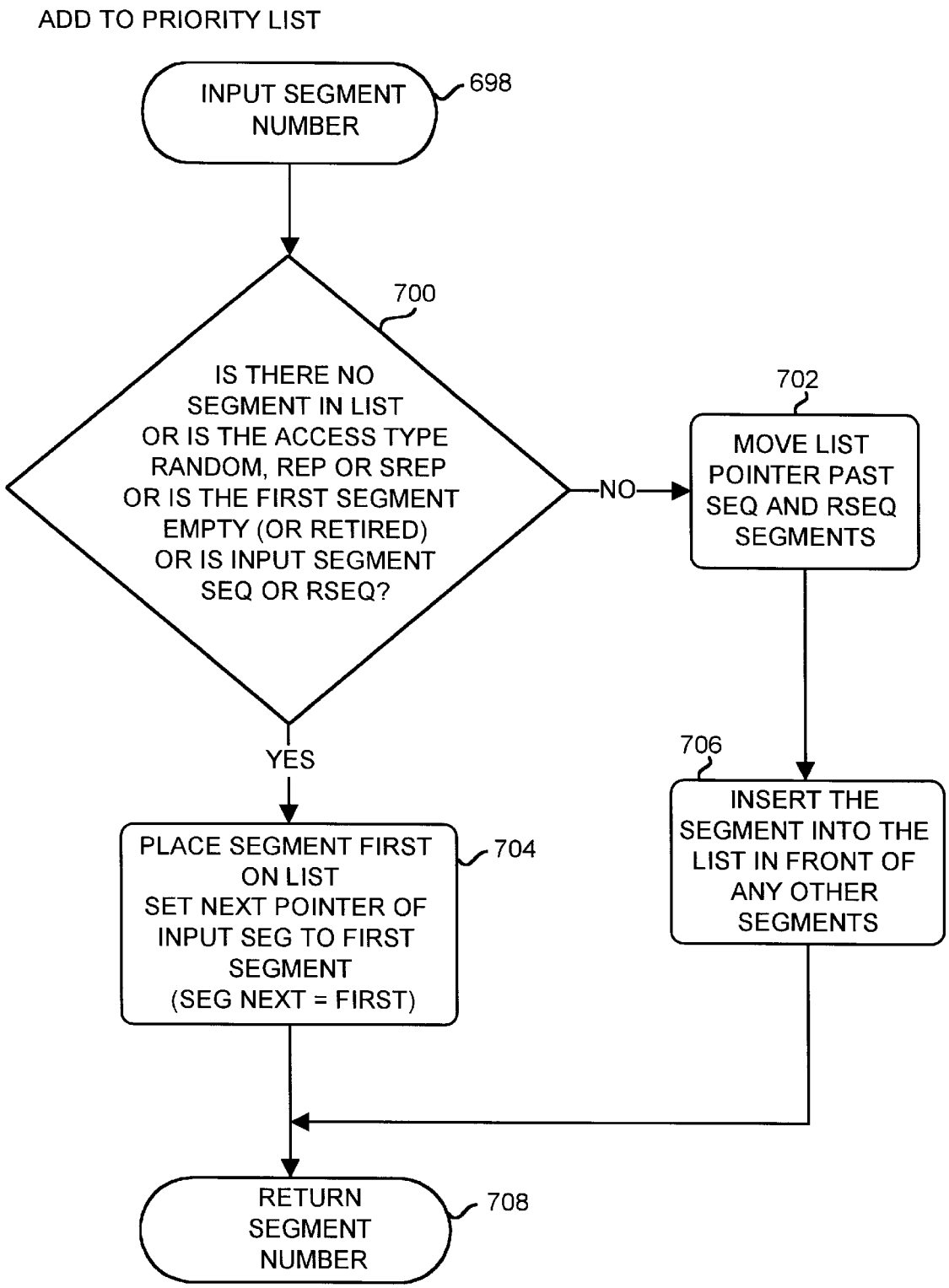
FIG. 9 shows a method of the invention to add to a priority list.

Refer now to FIG. 9 which shows the Add to Priority List routine of the invention. This routine places a selected segment into a priority list. The method places sequential and rseq segments first.

The method begins in step 698 by passing in the segment number of a segment entry to be added onto a priority list to the routine. The method continues in step 700 to check if there is no segment in the list or if the access type of the first segment on the list is random, repeating, or semi-repeating, if the first segment is empty or retired or if the input segment is sequential or rseq. If any of these conditions is true, the method proceeds to step 704 to place the segment first on the list. The next pointer of the input segment is set to the prior first segment. This procedure places the input segment as a segment first on the list and provides a link to the previous first segment as the next segment.

If none of the conditions in step 700 are true, then the method proceeds to step 702, to move the list pointer past any sequential or rseq segments in the priority list. This keeps the sequential and rseq segments at the top of the priority list. The method then proceeds in step 706 and inserts the segment into the list after any sequential or rseq segments and in front of any other segments. The method then proceeds to step 708 to return the segment number. The Add to Priority List method therefore keeps sequentials or rseq segments at the top of the list, in the order of how recently they have been accessed, as shown with reference to FIG. 17C. Other segment access types are placed further down the list, also in the order of how recently they have been accessed.

Refer now to FIGS. 10A, 10B, 10C, 10D, 10E, 10F, 10G, 10H and 10I, that show a method of the invention to update the cache. The method of the invention begins in step 710, and receives as an input, in step 712, the pointer to the task control block request, TCB request. After receiving the pointer to the TCB request in step 712, the method determines if the DPO flag is set or a fatal error flag is set or an empty segment flag is set. If so, the method proceeds to step 716 to invalidate the segment and returns from the routine in step 718.

If the flags in step 714 are not set, the method then proceeds to step 720 to check to see if an access type is assigned, and to assign an access type if an access type is not assigned. If an access type is not assigned, then the method proceeds to assign an access type using the following procedure.

In step 722, the method determines if there was a scan hit or a prefetch hit. If there was no scan hit or prefetch hit in step 722, then the access type is set as new in step 724.

If there was a scan hit or a prefetch hit, the method proceeds to step 726 to check if the logical block address of the hit is equal to the prefetch logical block address. If this condition is true, then the access type is set as sequential access in step 728. Otherwise, the method checks in step 730 to see if the logical block address is greater than the prefetch logical block address. If this condition is true, then the access type is set as skip access in step 732. Otherwise, the method checks if the logical block address is greater than the segment logical block address in step 734. If this true, the access type is set as semi-repeating access in step 736. Otherwise, the method checks to see if the logical block address is equal to the segment logical block address in step 738. If this condition is true, then the access type is set as repeating access in step 740.

Unless the access type was set as new in step 724, the method then proceeds to step 742 to set the cache environment to not hyper mode. The method then continues to step 746 to check if the access type is sequential or skip sequential. If the access type is set to sequential or skip sequential, then the method proceeds to step 748 to set the cache environment to sequential. Otherwise, the cache environment is set to repetitive in step 744. The method finishes assigning the access type in step 750 by setting the scan access flag true.

After the access type is assigned the process flows to step 725 to check the type of command. If the command involves a READ operation the process flows to step 752 in FIG. 10C. If the command involves a WRITE operation the process flows to step 816 in FIG. 10G depending on the type of command.

The update cache method of the invention handles a READ operation using the following method as shown in FIGS. 10C, 10D, 10E, 10F, 10G, 10H and 10I. The method begins in step 752. The method checks in step 754 to see if there is a partial hit in the prefetch and whether or not the prefetch from a previous command will fetch a higher LBA address than the current command. If this condition is true, the method proceeds to step 756 to adjust the prefetch length, pref, to accommodate the data already requested. The prefetch length is adjusted by:

$$pref\mathrel{+}=(endPfLba-(lba+r\_blockCount+prefetch))$$

The method then continues in step 758 to check to see if there is a cache hit in the prefetch area. If there is no cache hit in the prefetch area, the method proceeds to step 768. Otherwise, the method then flows to step 760 to check if the access type is semi-repeating. The access type is semi-repeating if the data requested includes data used by the previous command and data prefetched in response to the previous command. If the access type is semi-repeating, then the method sets hitCount equal to the prefetch logical block address minus the logical block address in step 762. Otherwise, the hit count is set to zero in step 764. The method then flows to step 768.

In step 768, the method determines whether there is a full cache hit and if the prefetch from the previous command will fetch a smaller logical block address than the current command. If this condition is true, the prefetch is adjusted to accommodate the data already requested in step 770. For example, the prefetch may be adjusted by:

pref-=((lba+r_blockCount+prefetch)-endPfLba)

The method then proceeds to step 772 to get the blocks per segment, BlocksPerSeg, for the current task control block. The method then calculates the block count of the data retrieved in step 774. The block count, bc, is the total number of blocks that will have been read into the cache if no error occurs and the prefetch is not aborted. The method then compares blockCount of the data retrieved to the BlocksPerSeg for the current task control block in step 776. If blockCount is not greater than BlocksPerSeg, then the method proceeds to step 782.

If blockCount is greater than BlocksPerSeg in step 776, the method calculates a new logical block address location in step 778. The method then calculates a new offset in step 780. The new logical block address and the new offset allows the method to get the address into the buffer where the first valid block starts.

The method then proceeds to step 782 to update the cache tables with new prefetch data. The prefetch lba is set equal to the request lba plus blockCount; pflba=lba+r_blockCount.

The method then proceeds to step 784 to check whether the hit was not a cache scan hit or if hitcount is less than blockCount. If this condition is true, the method proceeds to step 786 to set endprefetch equal to the prefetch logical block address plus the prefetch, pref; endPfLba=pflba+pref. The method then proceeds to step 788 to check whether there was a scan cache hit and that hitCount is greater than or equal to blockCount and the access type is sequential. If these conditions are true, the method determines that there is a full cache hit on the sequential read in step 790. The method then proceeds to end the read in step 814 and proceeds to step 824.

If the scan cache hit and hit count are greater than or equal to blockCount and the access type sequential test is not true in step 788, the method proceeds to step 792 to check if the hitcount is greater than blockCount.

If hitcount is greater than blockCount, then the method flows to step 794 to set blockCount equal to hitcount minus blockCount. Otherwise, the method flows to step 796 to set blockCount equal to zero.

The method then determines the number of blocks of data that are expected to be overwritten by the prefetch. This information is used in adaptive caching to determine the access type and may be used to recover the data blocks that are not overwritten when a prefetch does not complete. In step 800, the method checks to see if prefetch is greater than blockCount.

If the prefetch is greater than block count then the method flows to step 802 to check if the blockCount of data retrieved from step 774, bc, is less than blocks per segment, bps, for the current task control block in step 772. If so, the method sets blockCount equal to bc minus the prefetch in step 806. Otherwise, the block count is set equal to bps minus prefetch in step 812. The method then flows to step 810.

If prefetch is not greater than blockCount then the method flows to step 798 to check if bc is less than bps. If so, the method flows to step 808 to set blockCount equal to bc minus blockCount. Otherwise, the method flows to step 804 to set blockCount equal to bps minus blockCount. The method then continues to step 810.

In step 810, the method saves the number of blocks of data that are expected to be overwritten by the prefetch in hitcount. The method then ends the read in step 814.

Figure 10A:
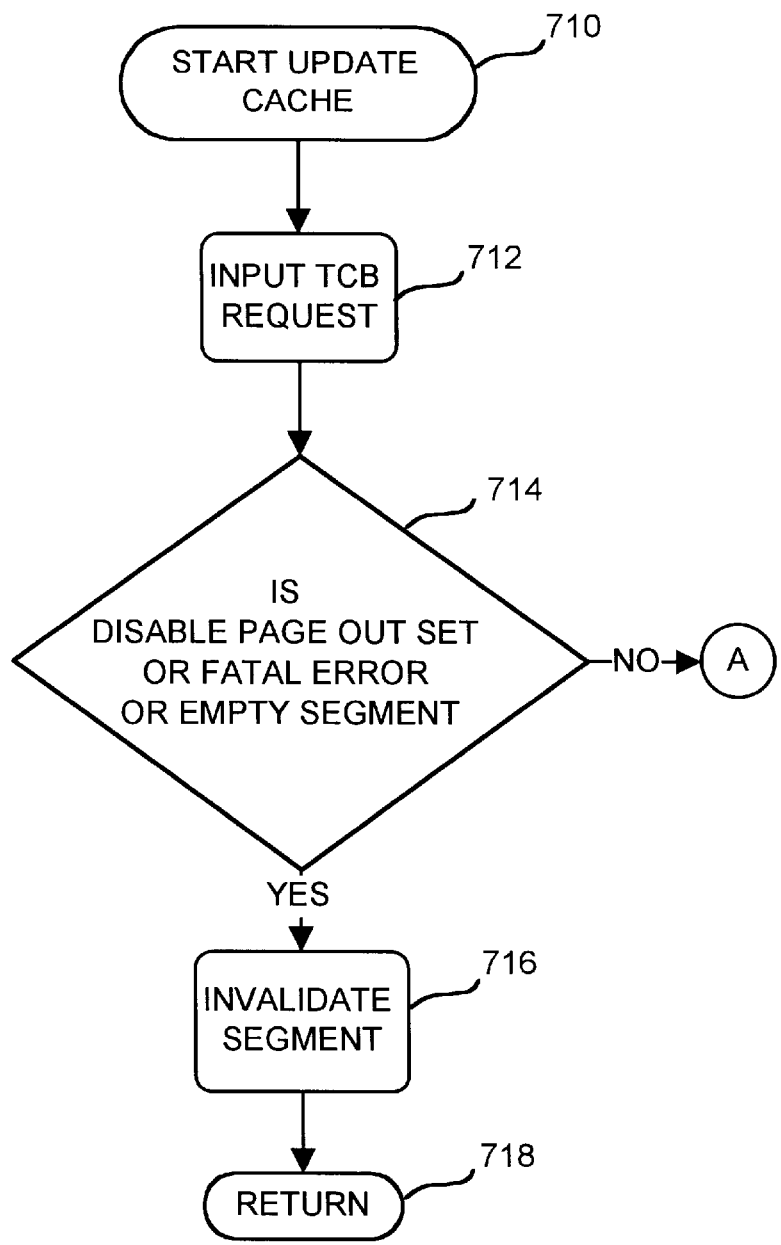
FIGS. 10A, 10B, 10C, 10D, 10E, 10F, 10G, 10H and 10I show a method of the invention to update the cache.
Figure 10B:
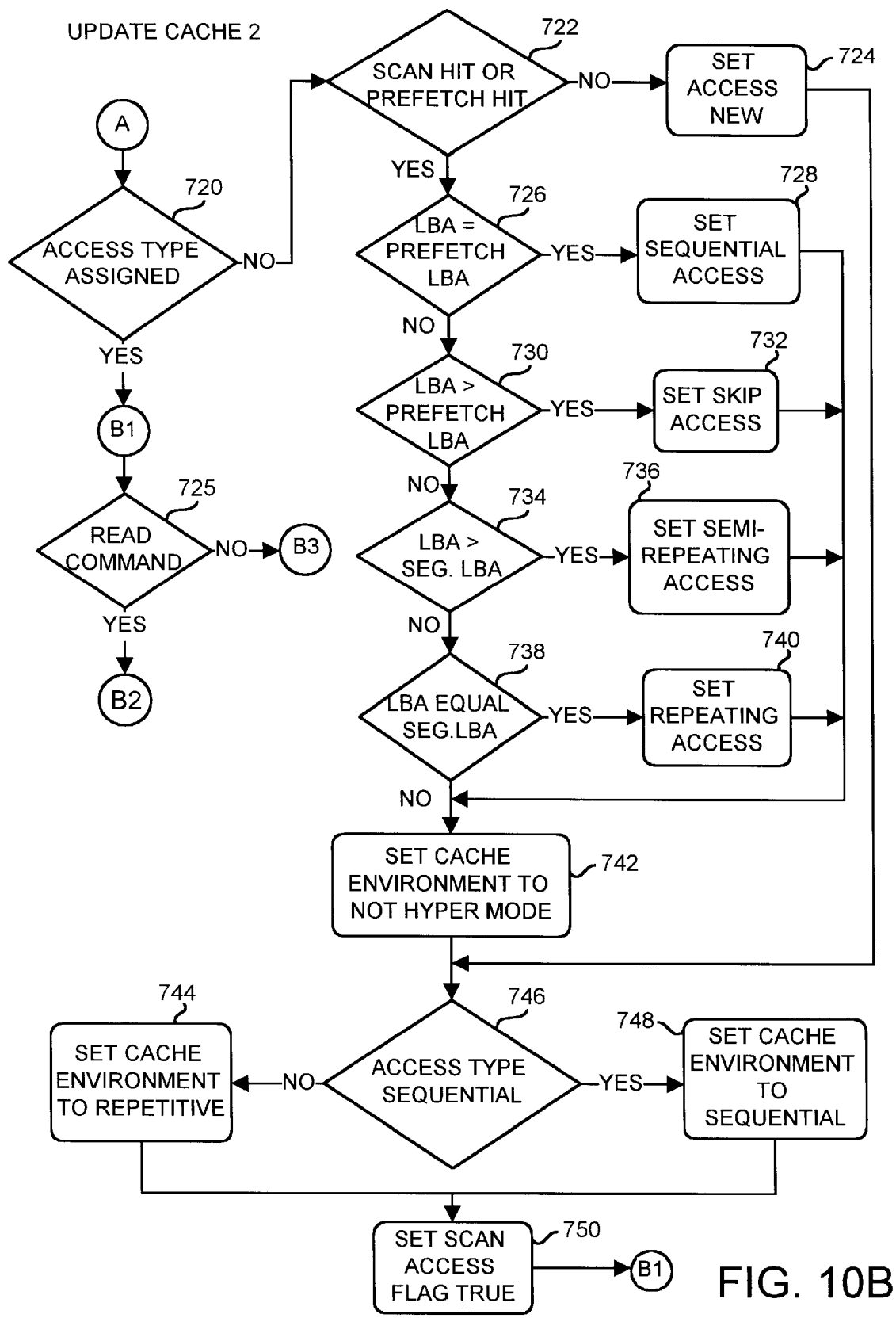
Figure 10C:
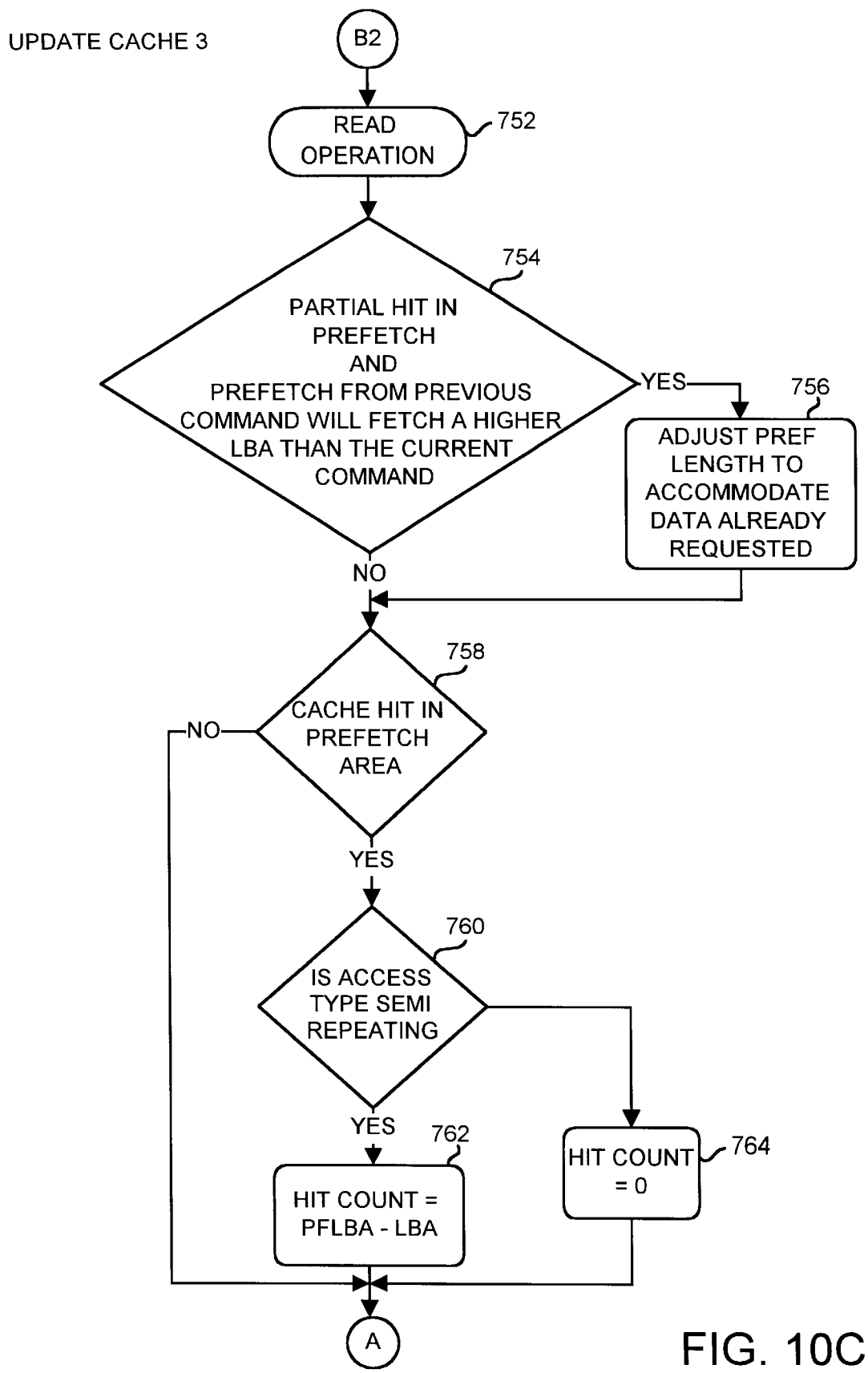
Figure 10D:
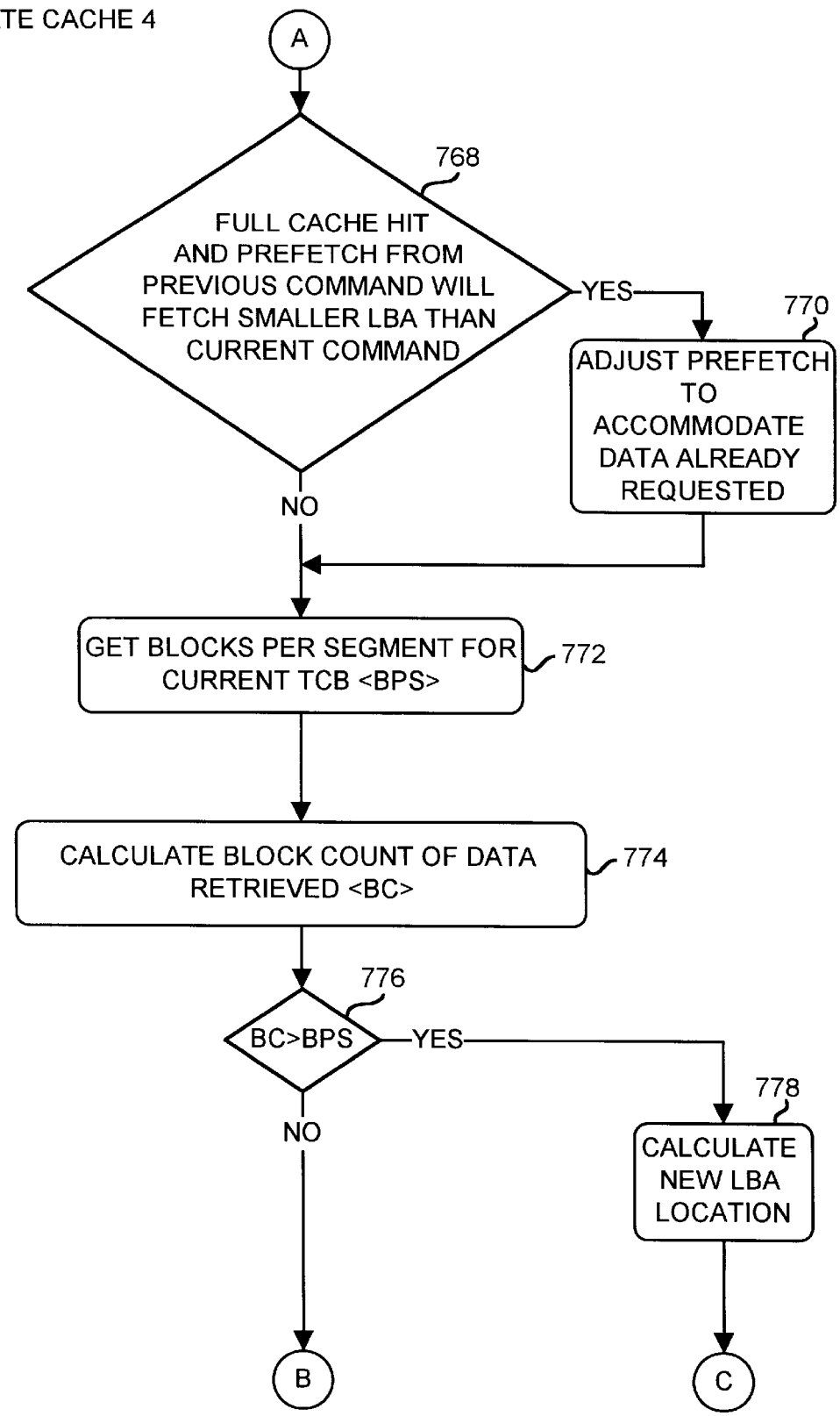
Figure 10E:
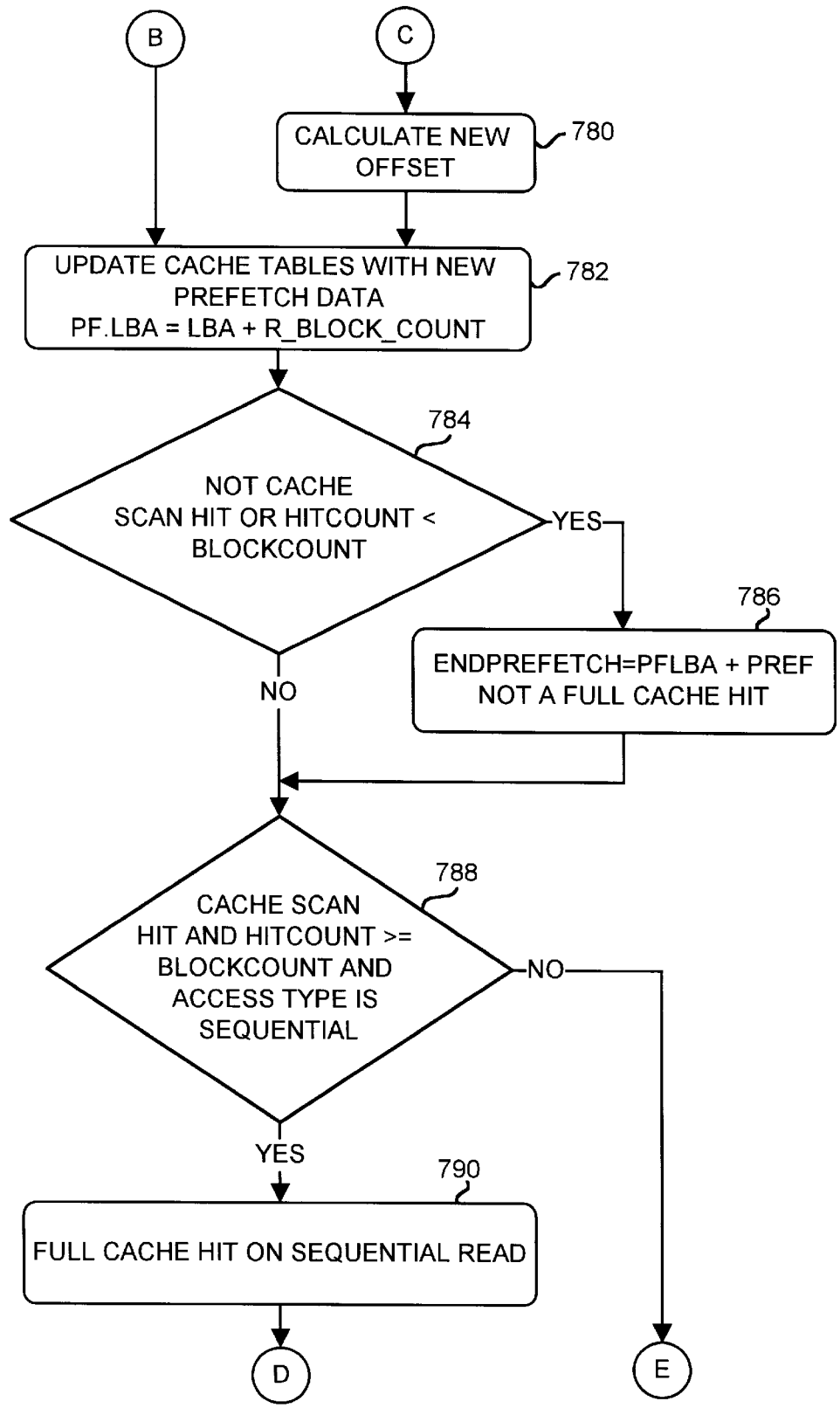
Figure 10F:
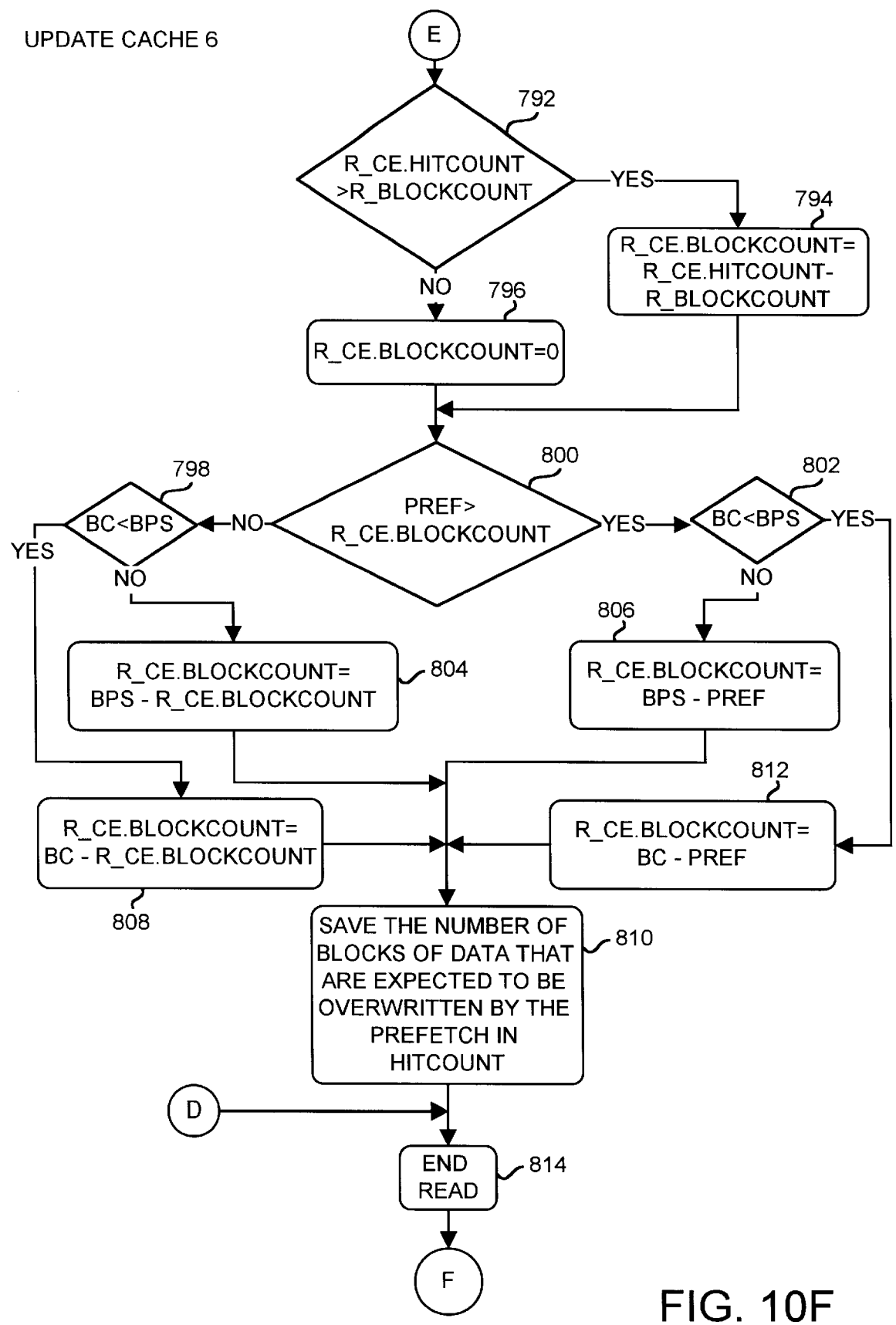
Figure 10G:
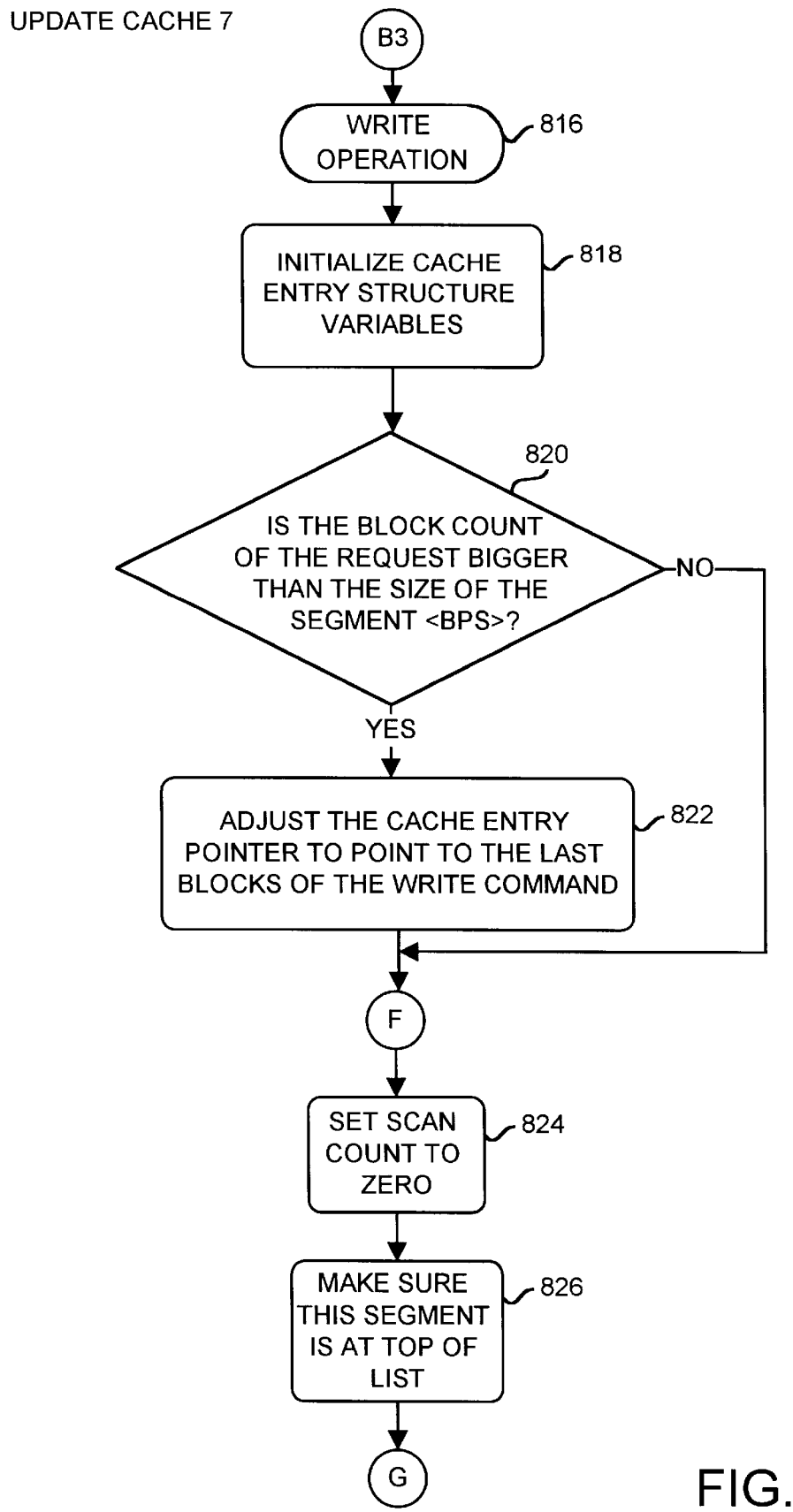
Figure 10H:
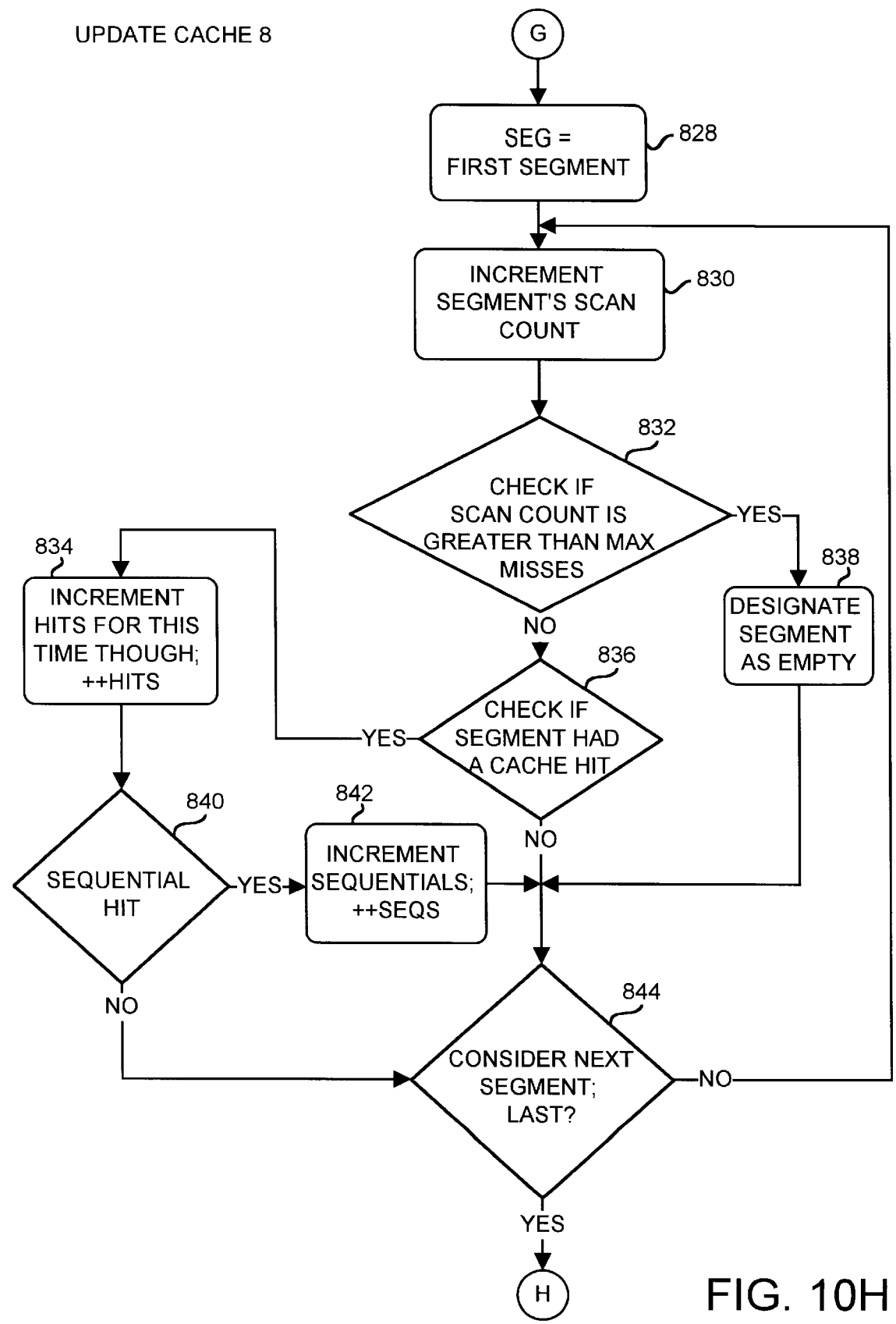
Figure 10I:
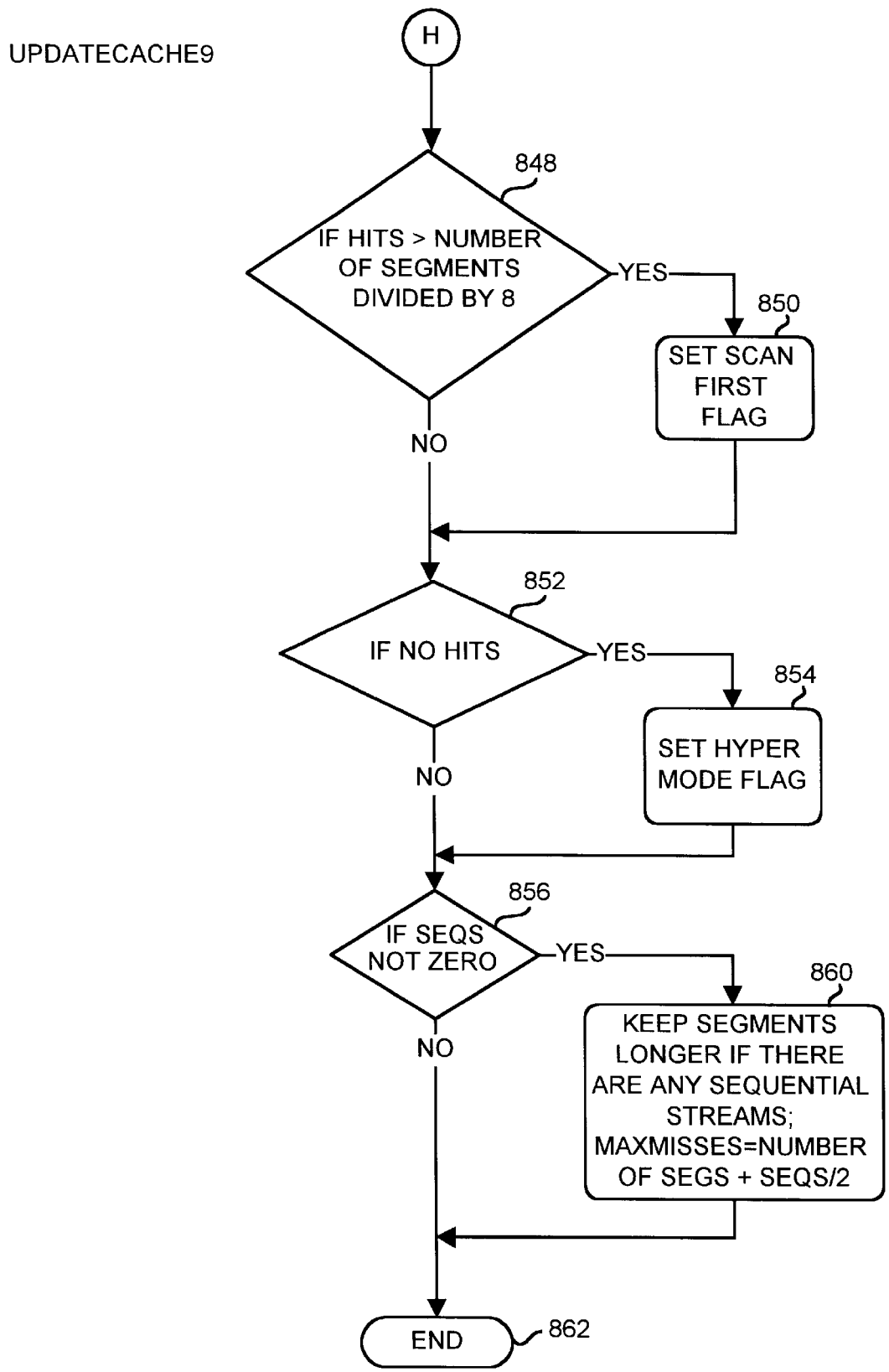

FIGS. 10G, 10H and 10I shows a WRITE operation employed by the method of the invention. The WRITE operation begins in step 816. The method initializes the cache entry structure variables in step 818. These variables include lba, prefetch lba (pflba), end prefetch lba (endPflba), hitCount and offset.

The method then flows to step 820 to determine if the block count of the request is greater than the size of the segment. A determination is done is BlocksPerSeg. If the block count of the request is larger than BlocksPerSeg, then the method flows to step 822 to adjust the cache entry pointer to point to the last blocks of the write command.

The method then continues to step 824 to set the scan count to zero. The method then checks to see that the current segment is at the top of the list in step 826. The segment is set equal to the first segment in step 828 to prepare to loop through the segment list 52. The method increments the segment scan count in step 830. If the scan count is greater than the max number of misses in step 832, then the segment is designated as empty in step 838 and the method proceeds to step 844 to consider the next segment. Otherwise, the method checks to see if the segment had a cache hit in step 836, and if so, flows to step 834 to increment the hits counter by one in step 834. The method then checks to see if the hit was a sequential hit in step 840, and if the hit was a sequential hit, the seqs counter is incremented by one in step 842. If the segment did not have a cache hit in step 836, the method flows to step 844.

In step 844, the method checks to see if the segment is the last segment. If the segment is the last segment then the method proceeds to step 848. Otherwise, the method loops back to step 830 to check the next segment.

In step 848, the method checks to see if the hits counter is greater than the number of segments divided by eight. If so, then the method sets the scan first flag in step 850. The invention divides the number of hits by eight to set the scan first flag to work in conjunction with the adaptive number of segments to determine how many cache hits there needs to have been to show that cache hits are common. When the number of segments is small they are either large transfers and/or sequential streams. When the number of segments is large, they are either random requests and/or small transfers. In both cases, the number of hits needed can be determined by dividing the number of segments by eight and adding one. Table 10 shows the effect on the number of hits before scan first is set for different segment sizes.

TABLE 10

| Segments and No. of Hits Needed Before Scan First is Set | | |
|---|---|---|
| No. of Segments | No. of Segments/8 | No. of Hits Before Scan First is Set |
| 16 | 2 | 3 of 16 |
| 8 | 1 | 2 of 8 |
| 4 | 0 | 1 of 4 |
| 2 | 0 | 1 of 2 |
| 1 | 0 | 1 of 1 |

The method then checks to see if there were any hits in step 852. If hits equal zero, then the method sets the hyper mode flag in step 854. The method then proceeds to step 856 to see if the number of sequentials is not zero. If there is at least one sequential, the method sets the maximum number of misses, maxmisses, equal to the number of segments plus sequentials divided by two in step 860 and finishes in step 862. This provides for keeping segments longer if there are any sequential streams. If there are no sequential streams, the method finishes in step 862.

Figure 11A:
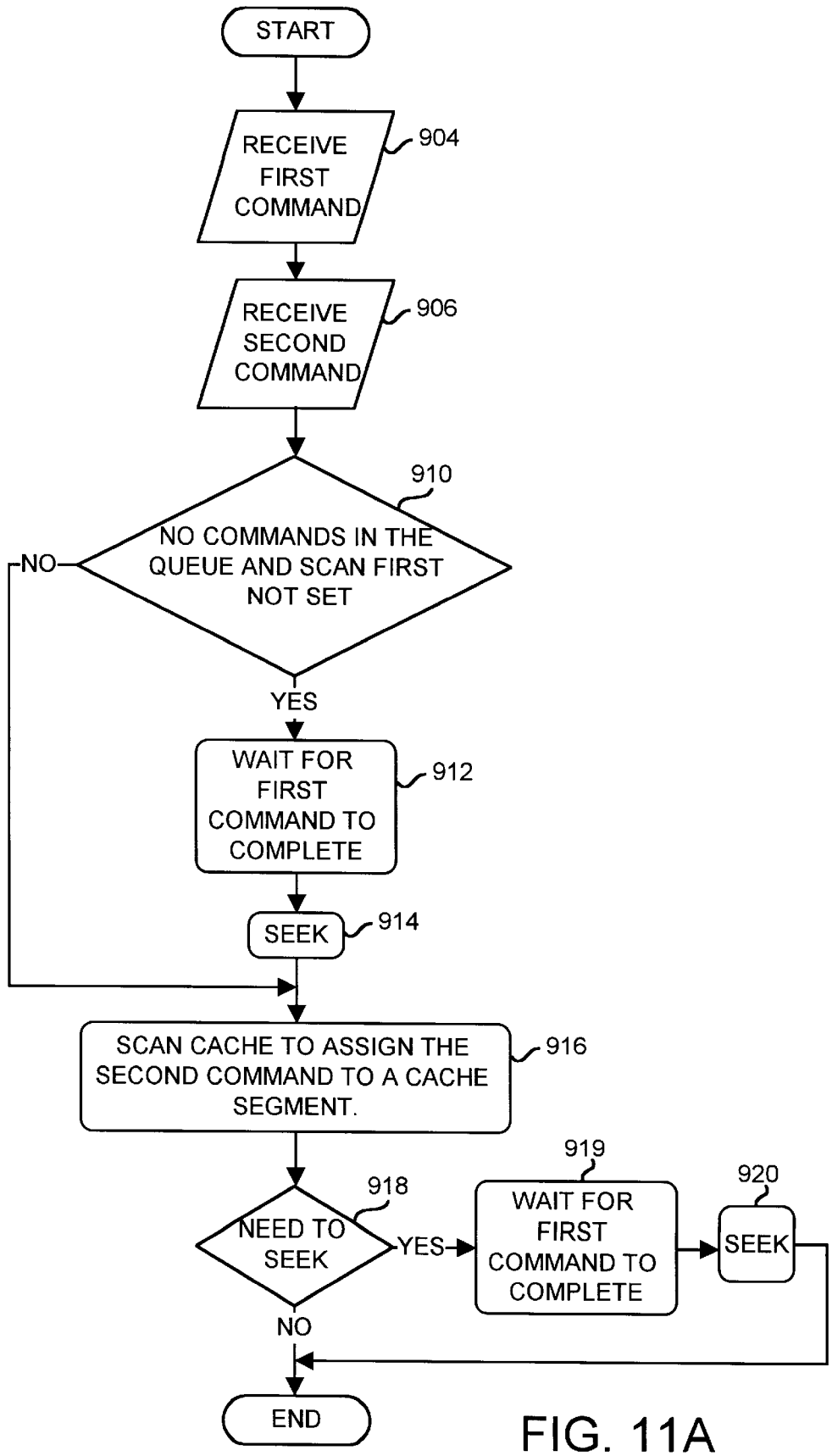
FIG. 11A shows a method of the invention to process a first and second command received from the host.

Now refer to FIG. 11A which shows a method of the invention to process a first and second command received from the host 50. The host 50 sends a first command and the disk drive 9 receives the first command in step 904. The host 50 sends a second command and the disk drive 9 receives the second command in step 906. In step 910, the method of the invention determines if there are any commands to be processed in the command queue. Also in step 910, the method of the invention checks a scan first flag. The scan first flag indicates whether or not the disk should check the cache 10 first or wait for the first command to complete. The first command is considered complete by the caching system when the disk side programs are done processing the commands. If there are no commands to be processed and the scan first state is not set the process flows to step 916 to scan the cache. Otherwise the process waits for the first command to complete in step 912, performs a seek in step 914 and flows to step 916 to scan the cache. For example, waiting for a command to complete may involve waiting for the minimum prefetch to be satisfied or for a sequential write to be completed. In step 916, the cache 10 is scanned to assign the second command to a cache segment. The process then flows to step 918 to determine whether or not to seek. If the method of the invention determines that a seek is needed in step 918, the process then flows to step 919 to wait for the first command to complete. The process then flows to step 920 to start the seek. If a seek is not needed the process ends. For example, a seek is needed if a request is in a different lba location than the current read or prefetch. For example, a seek is not needed when processing a semi-repeating request, skip-ahead reads or a full cache hit.

Figure 11B:
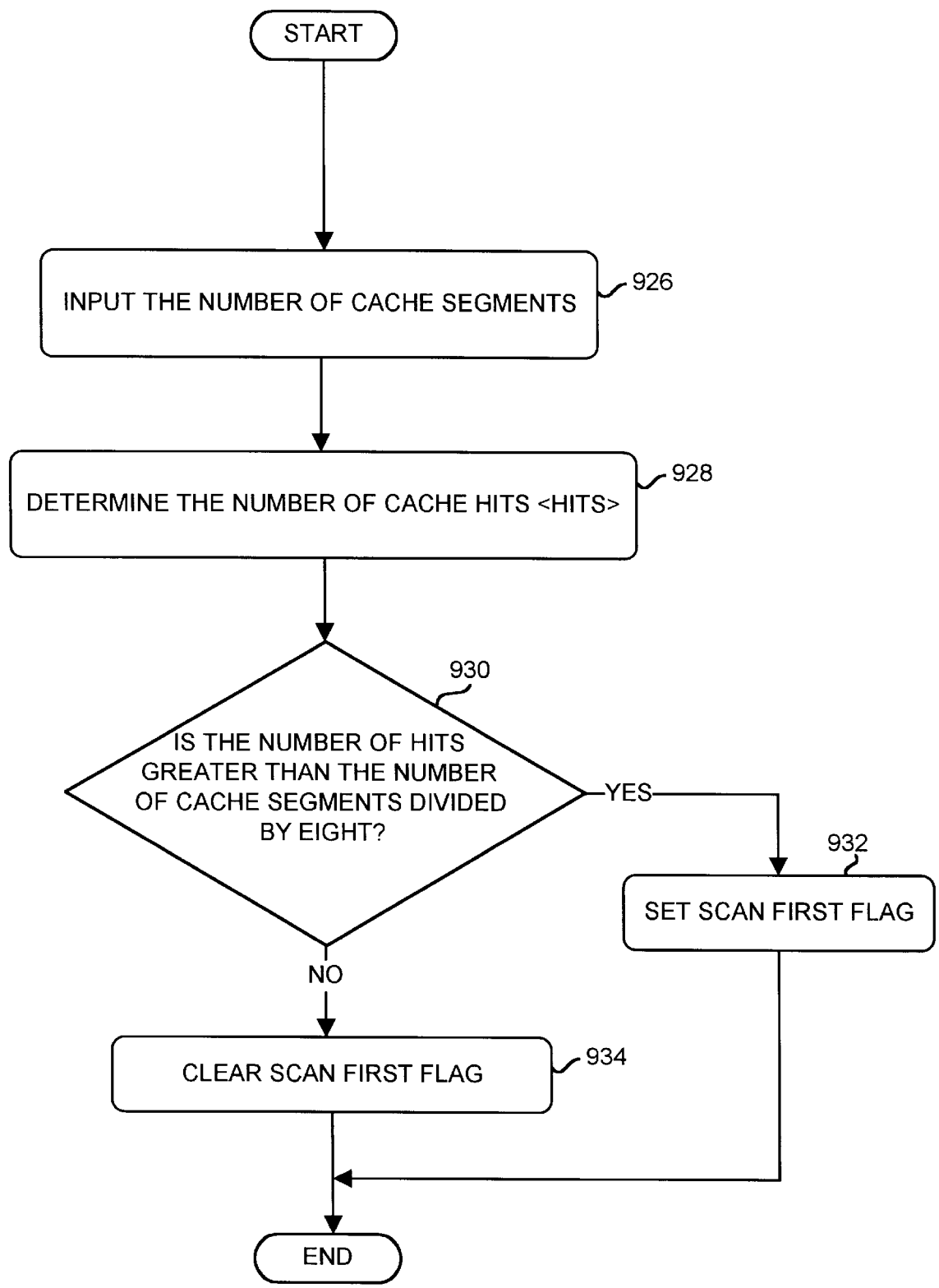
FIG. 11B shows a method of the invention to clear the scan first flag or set the scan first flag.

FIG. 11B shows a method of the invention to clear the scan first flag or set the scan first flag. The method starts in step 926 where the number of cache segments is input by the user routine. In step 928, the number of cache accesses is determined. If, in step 930, the number of accesses is greater than the number of cache segments divided by eight the scan first flag is set in step 932. If not the scan first flag is cleared in step 934.

Figure 11C:
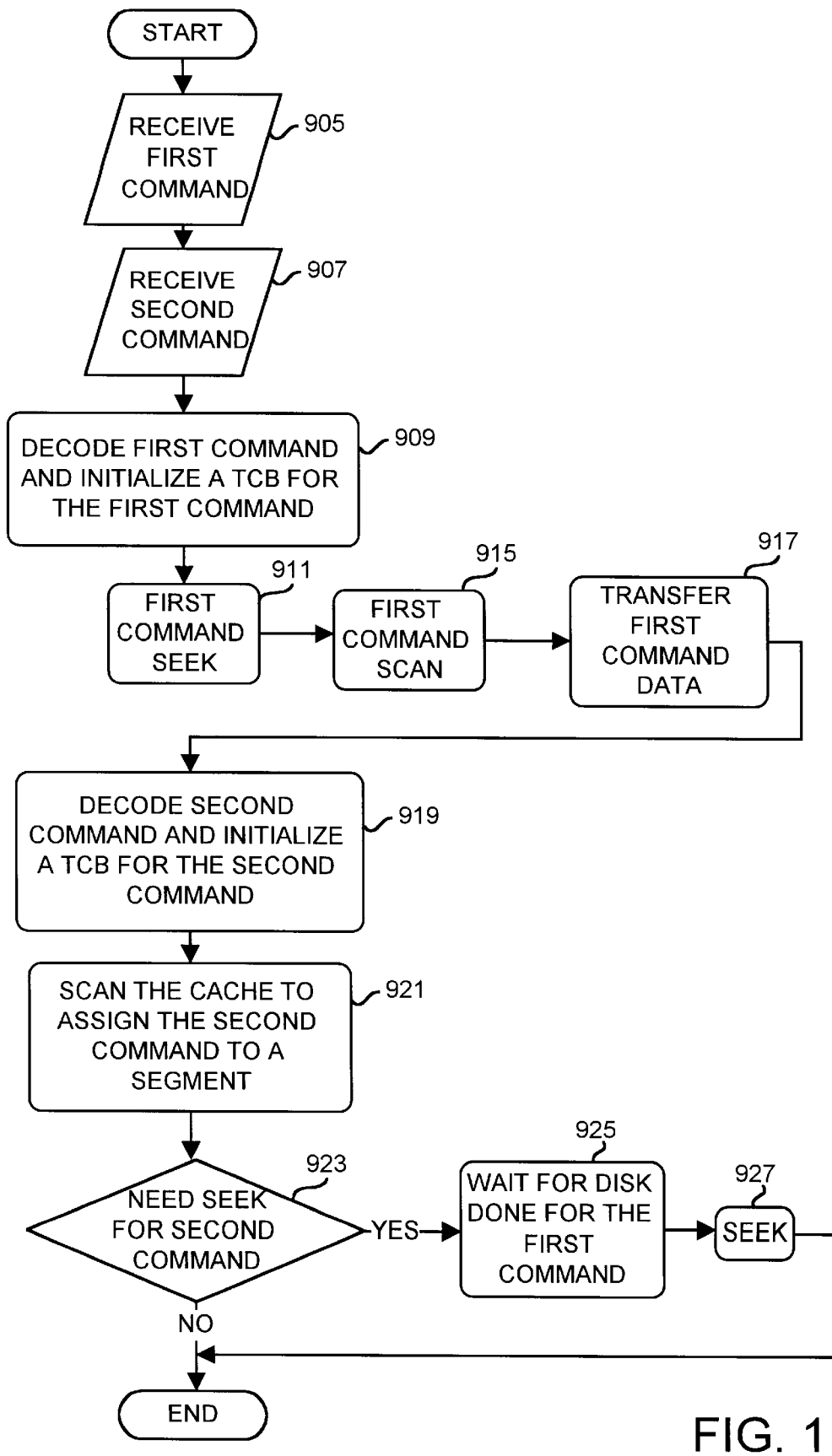
FIG. 11C shows a method of the invention to process a first and second command from a host 50.

Refer now to FIG. 11C which shows a method of the invention to process a first and second command from a host 50. The method of FIG. 11C starts by first receiving a command in step 905 from host 50. The process then receives a second command from the host 50 in step 907. In step 909, the process decodes the first command and initializes a task control block for the first command. In step 911, a seek is started for the first command. In step 915, a scan of the cache is performed to assign the first command to a segment of the cache 10. In step 917, data transfer for the first command is started. In step 919, the second command is decoded, and a task control block is initialized for the second command. In step 921, the cache is scanned to assign a second command to a segment. In step 923, a determination is made as to whether or not to seek for the second command. If a seek is required for the second command, the process flows to step 925 to wait for a disk done result for the first command. After the disk is done processing the first command, the process flows to step 927 to perform a seek and then ends.

Figure 11D:
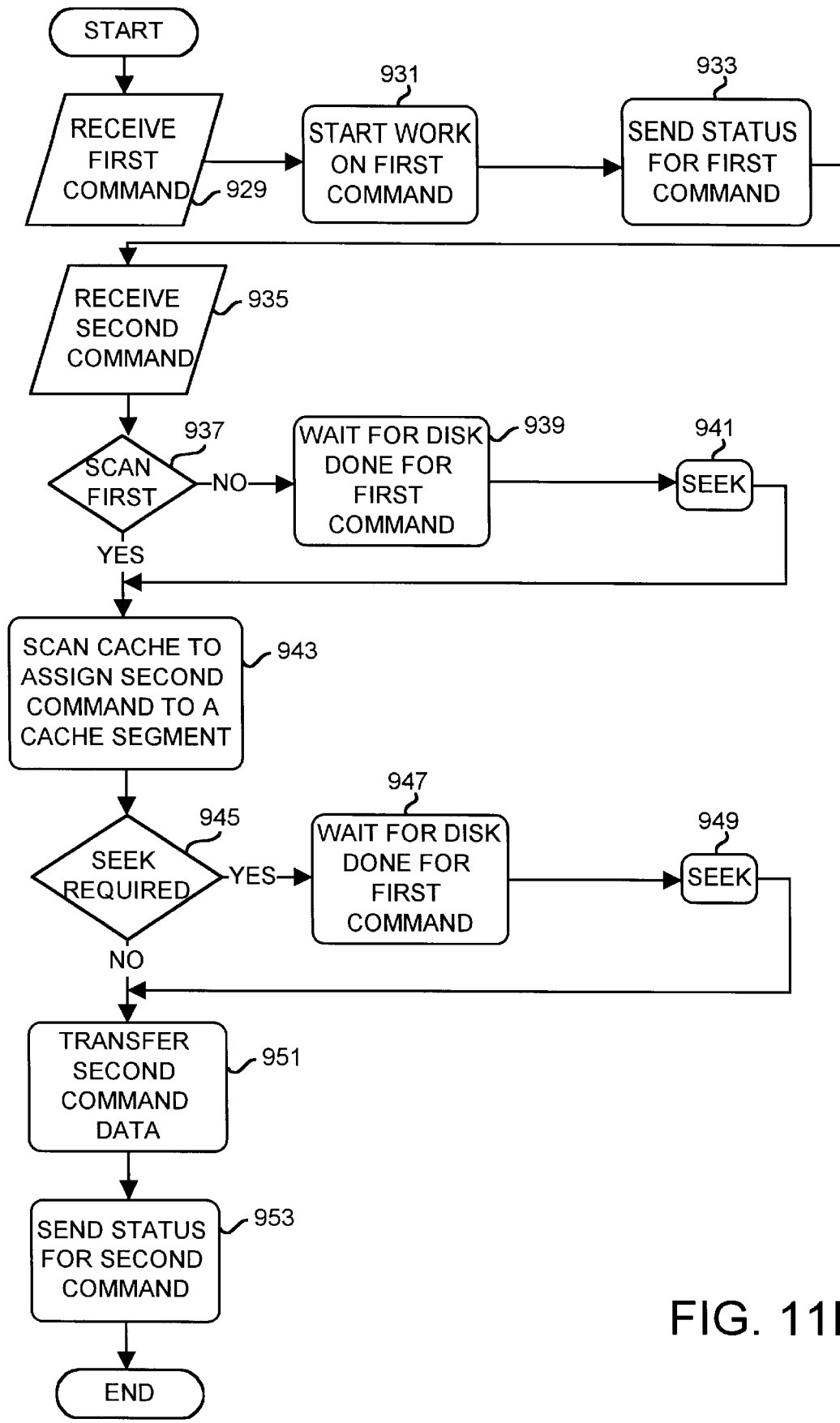
FIG. 11D shows a method of the invention to process a first and second command from a host.

Now refer to FIG. 11D which shows a method of the invention to process a first and second command from a host. In step 929, the process receives a first command from the host 50. In step 931, the method of the invention starts working on the first command, including performing a seek, scanning the cache to assign the first command to a cache segment and starting data transfer for the first command. The process then sends status in step 933 for the first command. The process flows to step 935 to receive a second command from the host 50. In step 937, a determination is made as to whether or not the scan first flag is set. If the scan first flag is not set, the process waits for the disk to finish processing the first command in step 939. In step 941, a seek is started for the second command. If the scan first flag is set, the process flows to scan the cache to assign the second command to a cache segment in step 943. In step 945, a determination is made as to whether or not to seek for the second command. If a seek for the second command is required, the process flows to step 947 to check whether the disk is done processing the first command. If the disk is done processing the first command, the process flows to step 949 to begin a seek for the second command. If, in step 945, a seek is not required for the second command, the data transfer is performed for the second command data in step 951. Status is sent, in step 953, for the second command.

Figure 11E:
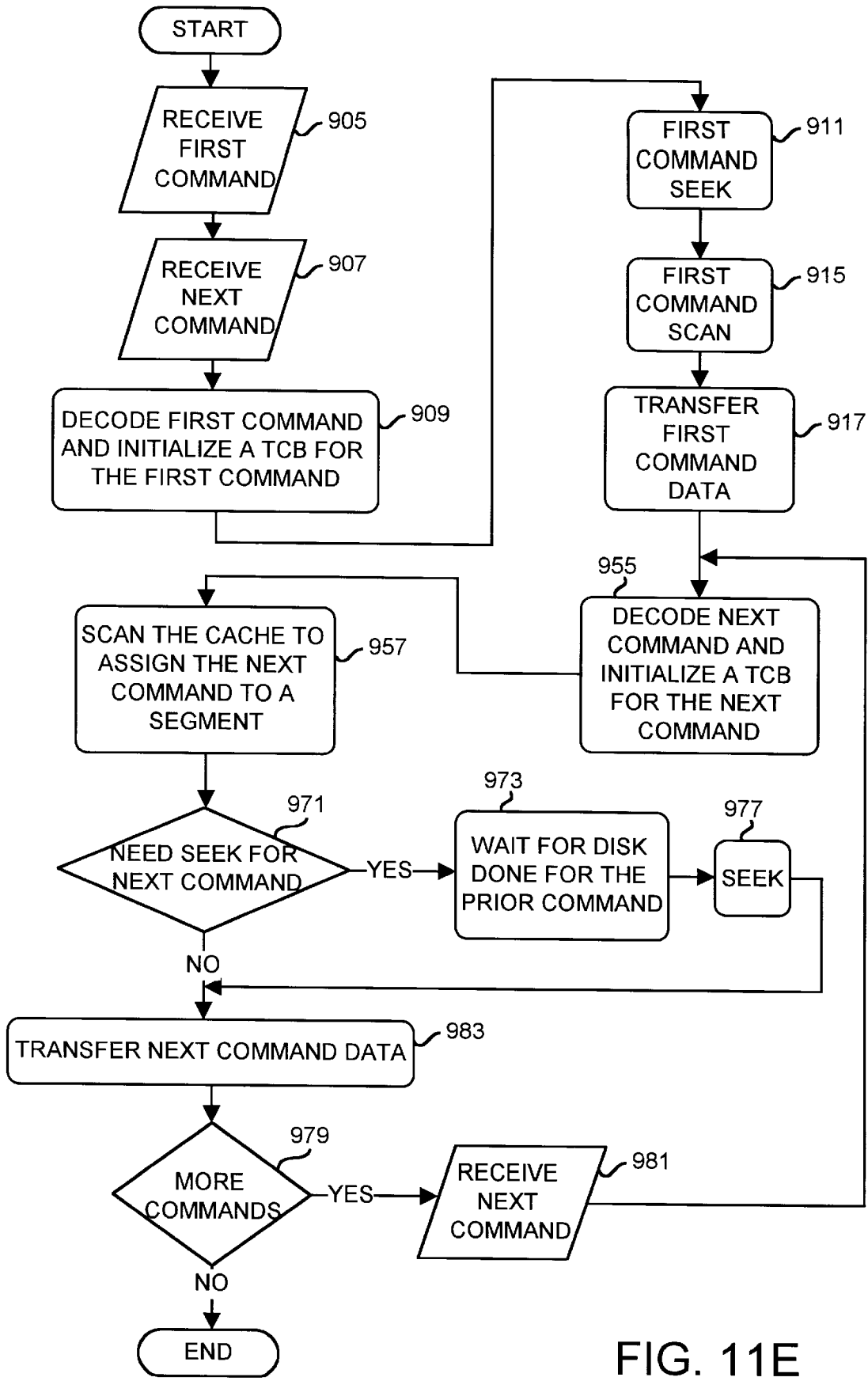
FIG. 11E which shows a method of processing multiple commands from a host.

Refer now to FIG. 11E which shows a method of processing multiple commands from a host. The method of FIG. 11E starts by first receiving a command in step 905 from host 50. The process then receives a second command from the host 50 in step 907. In step 909 the process decodes the first command and initializes a task control block for the first command. In step 911 a seek is started for the first command. In step 915 a scan of the cache is performed to assign the first command to a segment of the cache 10. In step 917 data transfer for the first command is started. In step 955 the process decodes a next command and initializes a task control block for the next command. In step 957 the cache is scanned to assign the next command to a segment. In step 971 a determination is made as to whether or not a seek is needed for the next command. If a seek is needed for the next command the process flows to step 973 to wait for the disk to be done processing the prior command. The prior command is the first command the first time through the method. The process then flows to step 977 to seek for the next command. The process then flows to step 983 to transfer data associated with the next command. If a seek is not needed the process flows directly to step 983 to transfer data for the next command. The process then flows to step 979 to determine if there are any more commands to process. If there are, the process flows to step 981 to receive the next command and returns to step 955 to decode the next command and initialize a task control block for the next command. If there are no more commands, the process ends.

Figure 12A:
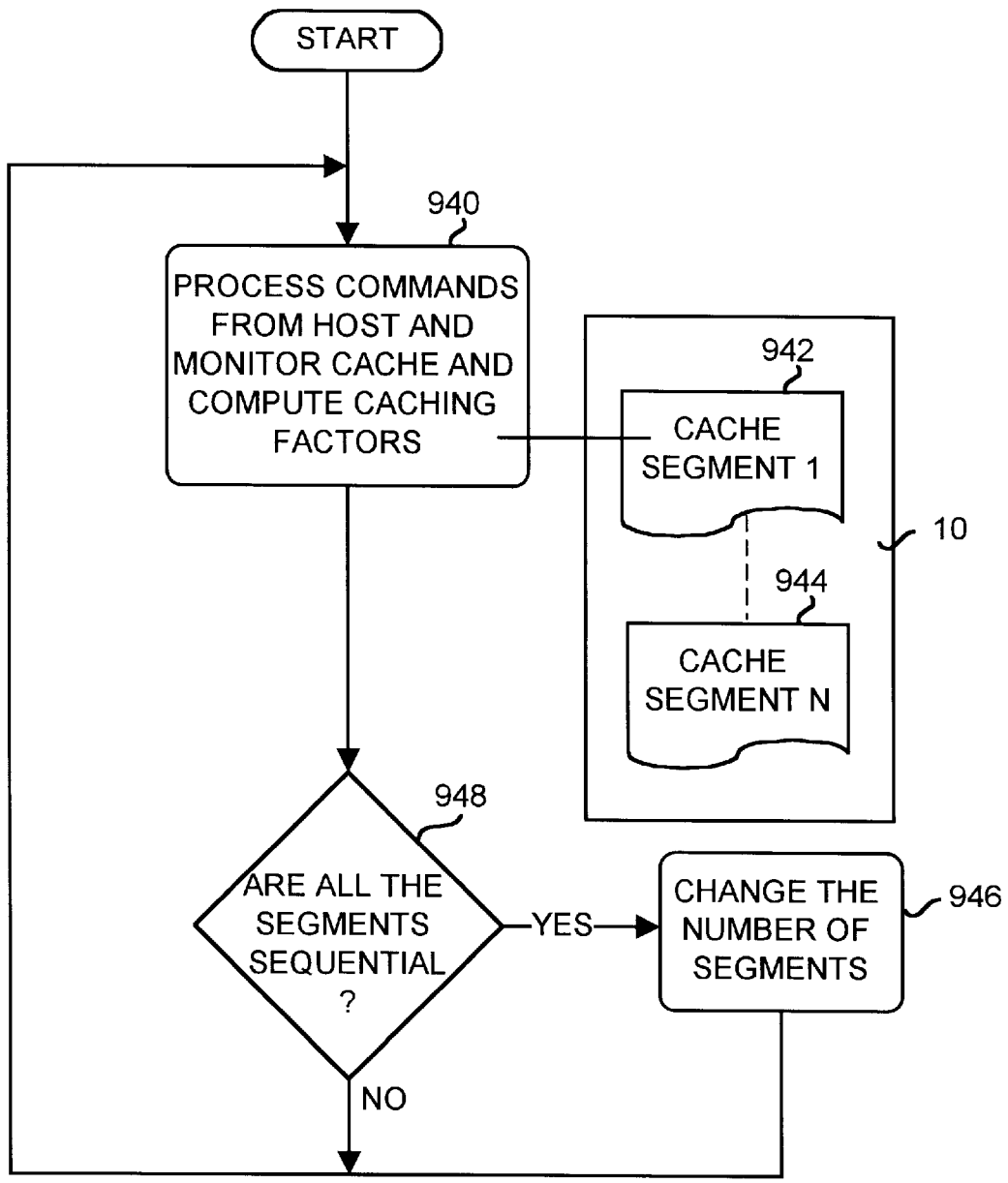
FIG. 12A shows a method of the invention to change the number of segments of the cache.

Now refer to FIG. 12A which shows the method of the invention to change the number of segments of the cache 10. In step 940, the method of the invention processes commands from the host and monitors the cache 10 and computes caching factors. In step 940, the cache segment1 942 and cache segmentn 944 are monitored. The process flows to step 948 to determine whether or not all the segments are sequential. If they are, then the process changes the number of segments in step 946. If they are not, the process repeats back to step 940 to continue monitoring the cache 10 and compute caching factors. After step 946 the process flows back to step 940 and continues monitoring commands from the host, the cache 10, and to compute caching factors.

Figure 12B:
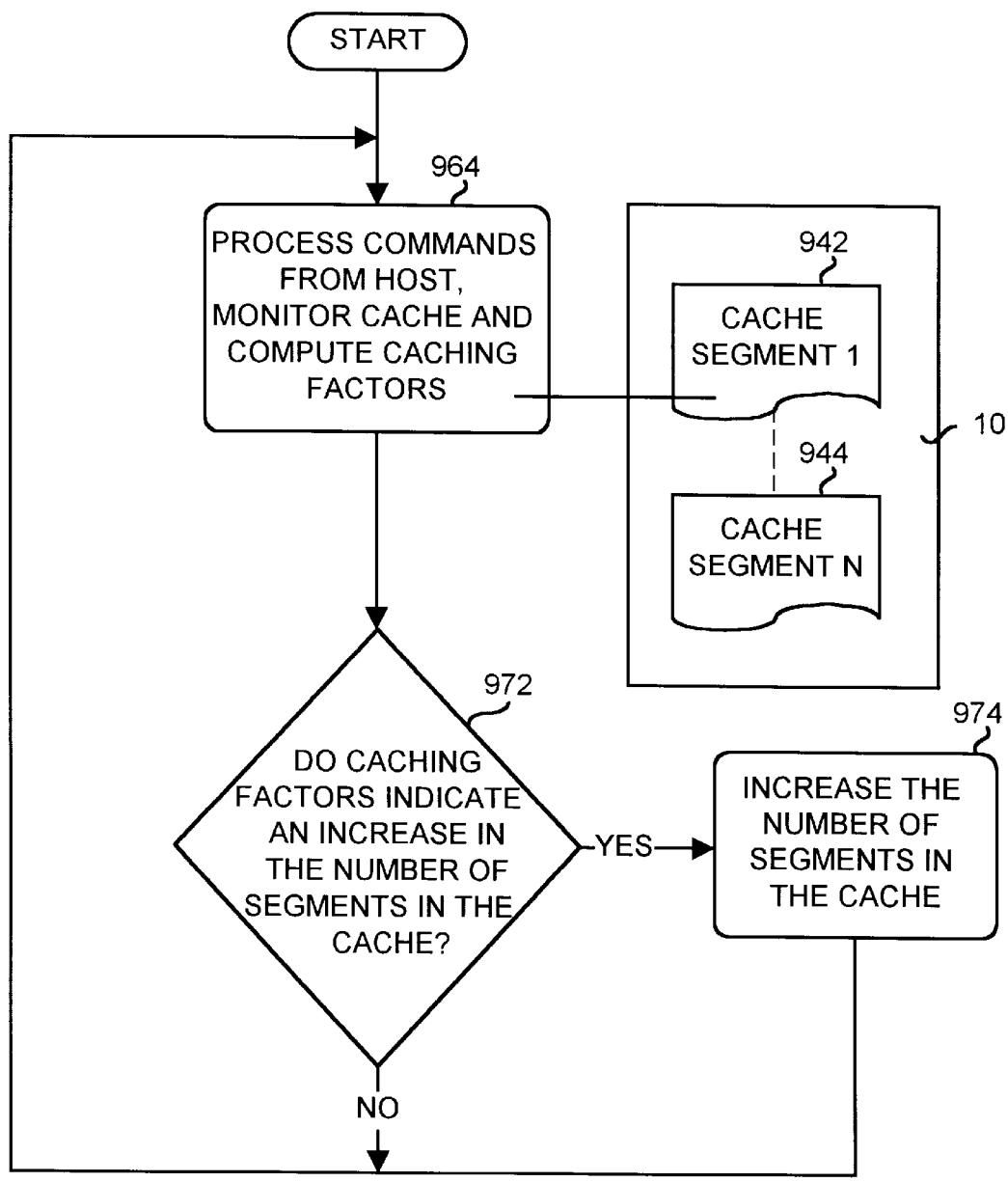
FIG. 12B shows a method of the invention to increase the number of segments in the cache.

Now refer to FIG. 12B which shows the method of the invention to increase the number of segments in the cache 10. The process starts at step 964 to process commands from the host and monitor cache and compute caching factors. The process monitors each cache segment from cache segment1, 942 to cache segmentn 944. The process flows to step 972 to determine whether the caching factors indicate an increase in the number of segments in the cache 10. If they do, the process flows to step 974 to increase the number of segments in the cache 10. If the caching factors do not indicate an increase in the number of segments, the process returns back to step 964 to process commands from the host and monitor the cache 10 and compute caching factors. After step 974 the process flows back to step 964 to continue monitoring commands from the host, the cache 10, and to compute caching factors.

Figure 12C:
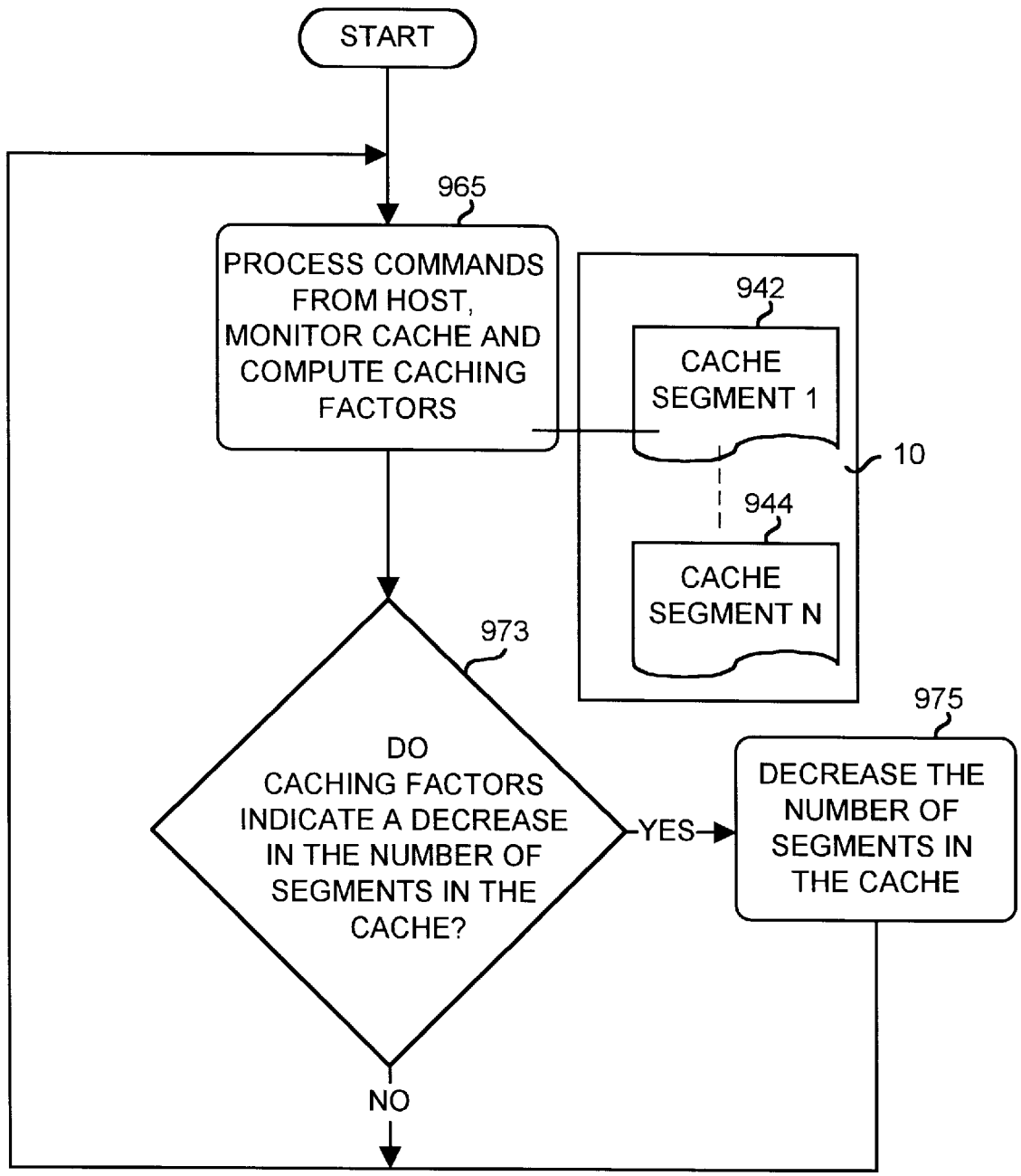
FIG. 12C shows a method of the invention to decrease the number of segments in the cache.

Refer now to FIG. 12C which shows the method of the invention used to decrease the number of segments in the cache 10. In step 965 the process of the invention monitors commands from the host 50, monitors the cache 10 and computes caching factors for each cache segment1, 942 to cache segmentn 944. The process then flows to step 973 to determine whether the caching factors indicate a decrease in the number of segments in the cache 10; if they do, the number of segments in the cache 10 is decreased in step 975. If they do not, the process flows to step 965 to continue monitoring the cache 10, processing commands from the host and computing caching factors. After step 975 the process flows back to step 965 to continue monitoring commands from the host, the cache 10, and to compute caching factors.

Figure 12D:
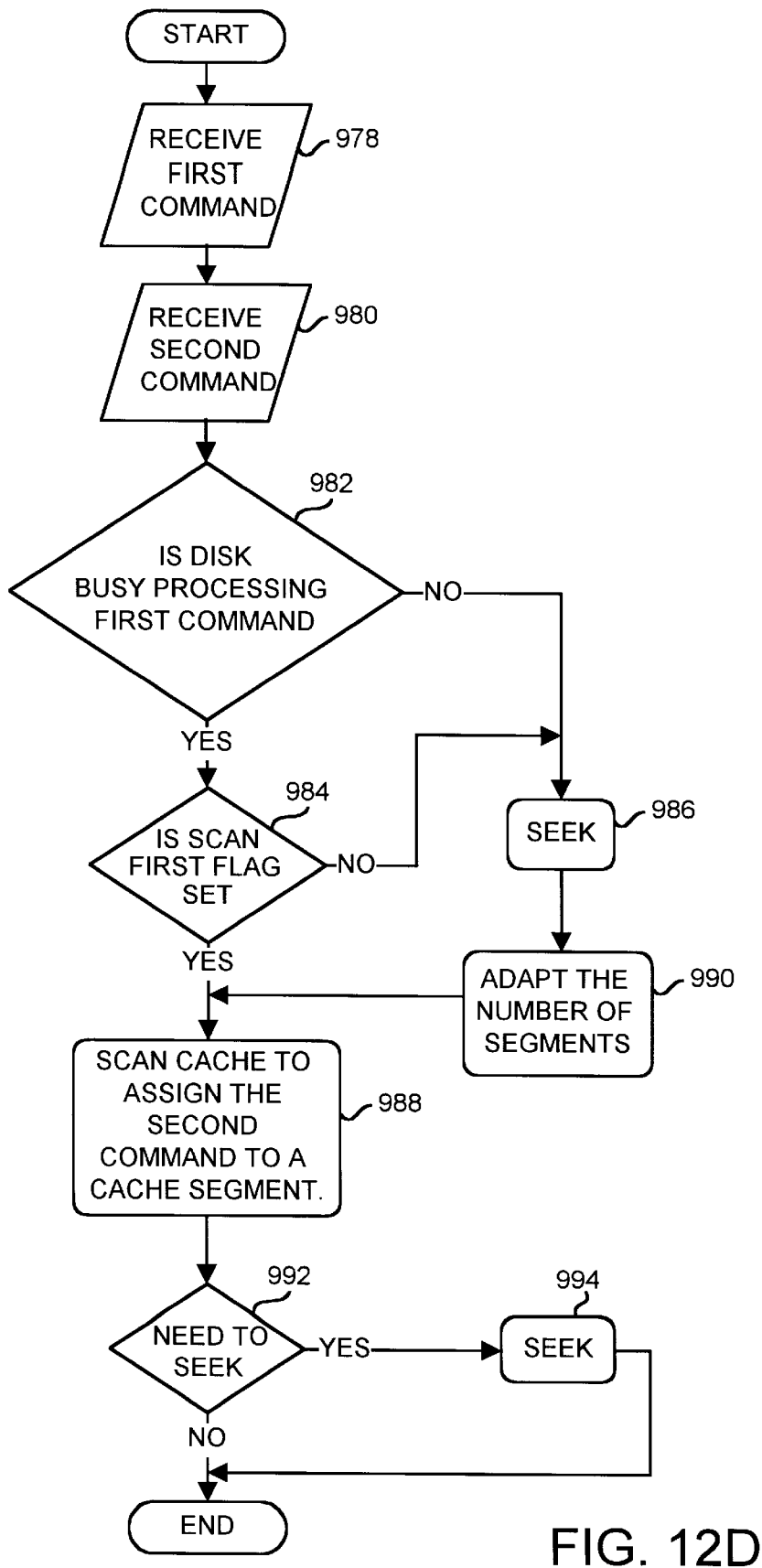
FIG. 12D shows a method of the invention to adapt a number of segments in the cache.

Now refer to FIG. 12D which shows a method of the invention to adapt the number of segments in the cache 10. The method of the invention starts by receiving a first command from the host in step 978, then receiving a second command from the host in step 980. A check is made to determine if the disk is busy processing the first command in step 982. If the disk is not busy, the method of the invention performs a seek operation in step 986. If the disk is busy processing the first command, the process flows to step 984 to determine if the scan first flag is set. If the scan first flag is not set the process performs a seek operation in step 986. If the scan first flag is set, the process flows to step 988 to scan the cache 10 to assign the second command to a cache segment. After the seek operation in step 986, the method of the invention adapts a number of segments in step 990 following the methods described above. The process flows from step 988 to step 992 to determine if a seek is needed. If a seek is needed a seek is performed in step 994. If a seek is not needed the process ends.

Figure 12E:
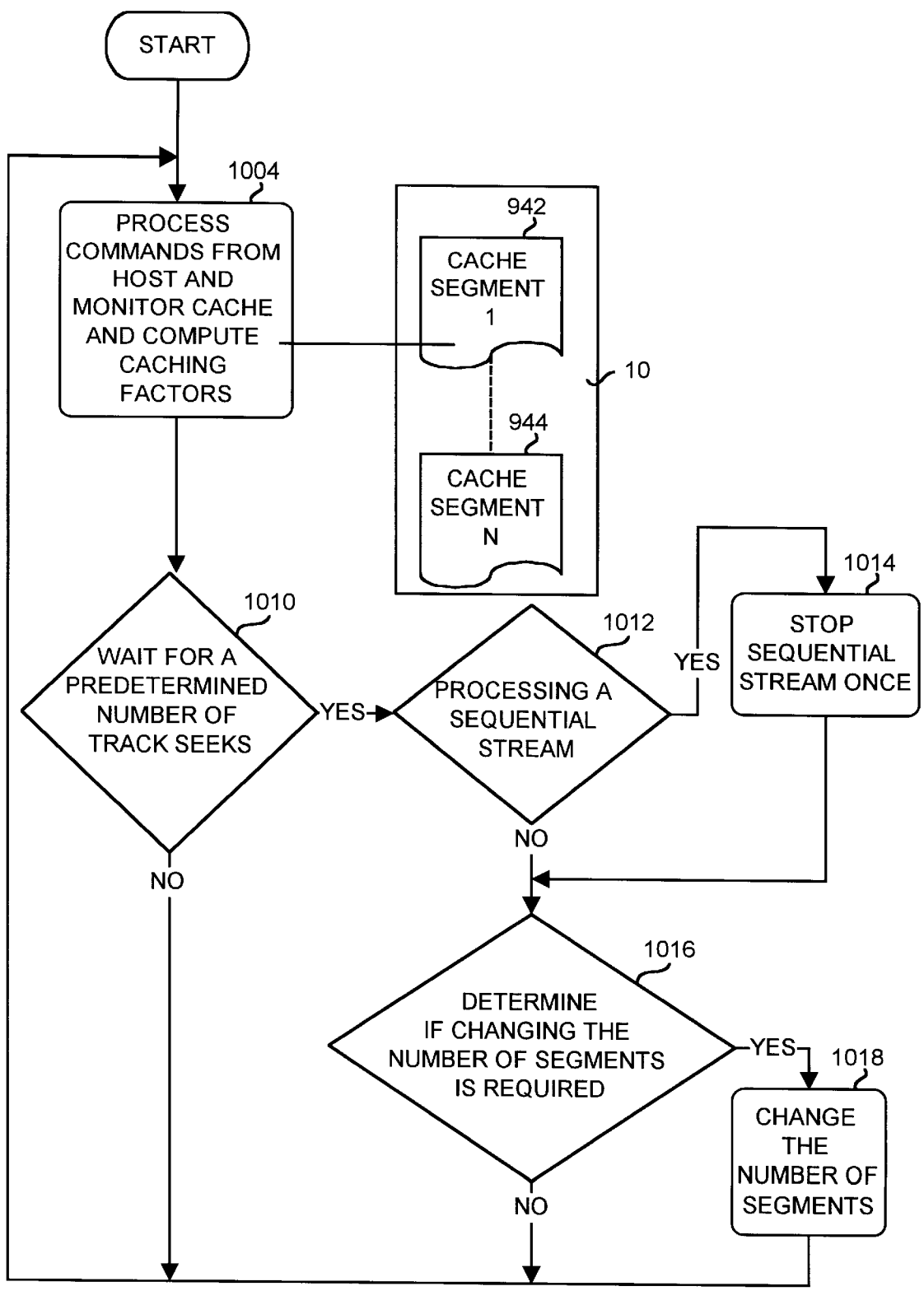
FIG. 12E shows a method of the invention to determine whether or not to change the number of segments in the cache.

Refer now to FIG. 12E, which shows a method of the invention to determine whether or not to change the number of segments in the cache 10. The method begins by processing commands from the host and monitoring the cache 10 and to compute caching factors from cache segment1, 942 through cache segmentn 944 in step 1004. The process flows to step 1010 to wait for a predetermined number of seeks. If a predetermined number of seeks have not occurred, the process returns back to step 1004 to continue processing and monitoring the cache 10. If a predetermined number of seeks have occurred, the process flows to step 1012 to determine if a sequential stream is in progress. If there is a sequential stream to progress, the sequential stream is stopped once in step 1014. From here the process flows to step 1016. When the disk is transferring data the sequential stream is being handled at the same time, stopping once means to stop the disk transfer at a good boundary and restarting the disk after reevaluating the number of segments. For example a good boundary is a block boundary. Once the stream is stopped or if there is not a sequential stream in progress, the method of the invention flows to determine if changing the number of segments is required in step 1016. If the number of segments need changing then the number of segments is changed in step 1018. If the number of segments do not need changing the process flows back to step 1004 to continue to monitor and process commands from the host, monitor the cache 10, and compute caching factors. After step 1018 the process flows back to step 1004 to continue monitoring commands from the host, the cache 10, and to compute caching factors.

Figure 13:
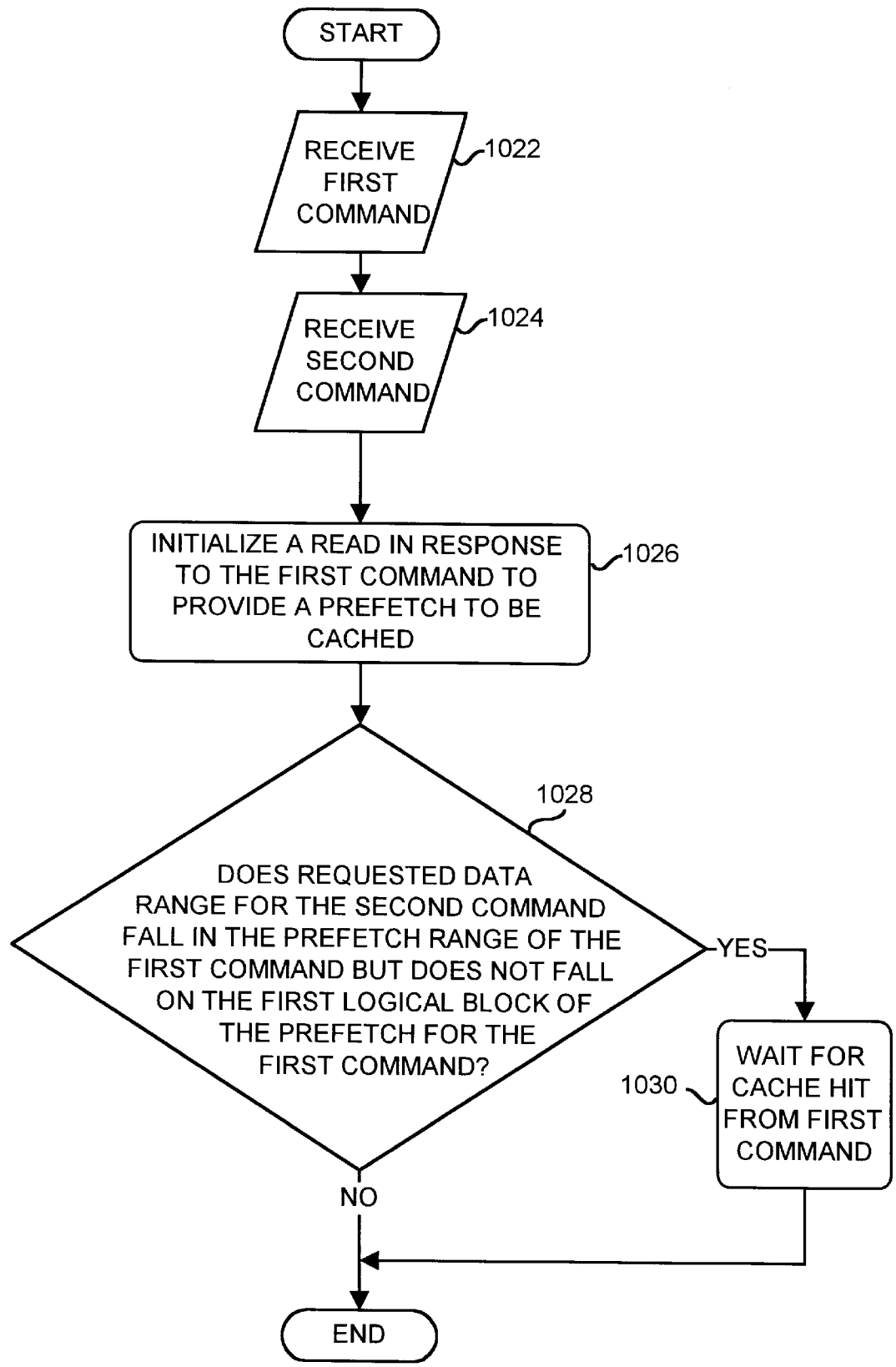
FIG. 13 shows a method of the invention to wait for a cache access that has not occurred yet.

Now refer to FIG. 13, which shows the method of the invention to wait for a cache hit that has not occurred yet. The method of the invention first receives a first command from a host in step 1022, then receives a second command from the host in step 1024. The method of the invention then initializes a read in response to the first command to provide a prefetch to be cached in step 1026. The process then flows to step 1028 to determine whether or not the requested data range for the second command falls in the prefetch range of the first command but does not fall on the first logical block of the prefetch for the first command. If this condition is true, then the method of the invention waits for a cache hit for the second command to become available from the prefetch data from the first command in step 1030. If the condition is false the process ends. The invention recognizes that there is a potential for a cache hit in the prefetch area that has not yet been realized. The invention waits for the prefetch to progress to the point where there is a cache hit and then continues processing the command. This provides an advantage for use in many different computing environment including in some "WINDOWS" (r) Microsoft Corp. based operations where skip reads take place. The invention provides the ability to continue a sequential stream that before the invention would have been broken and restarted and that would have progressed if recognized.

Figure 14A:
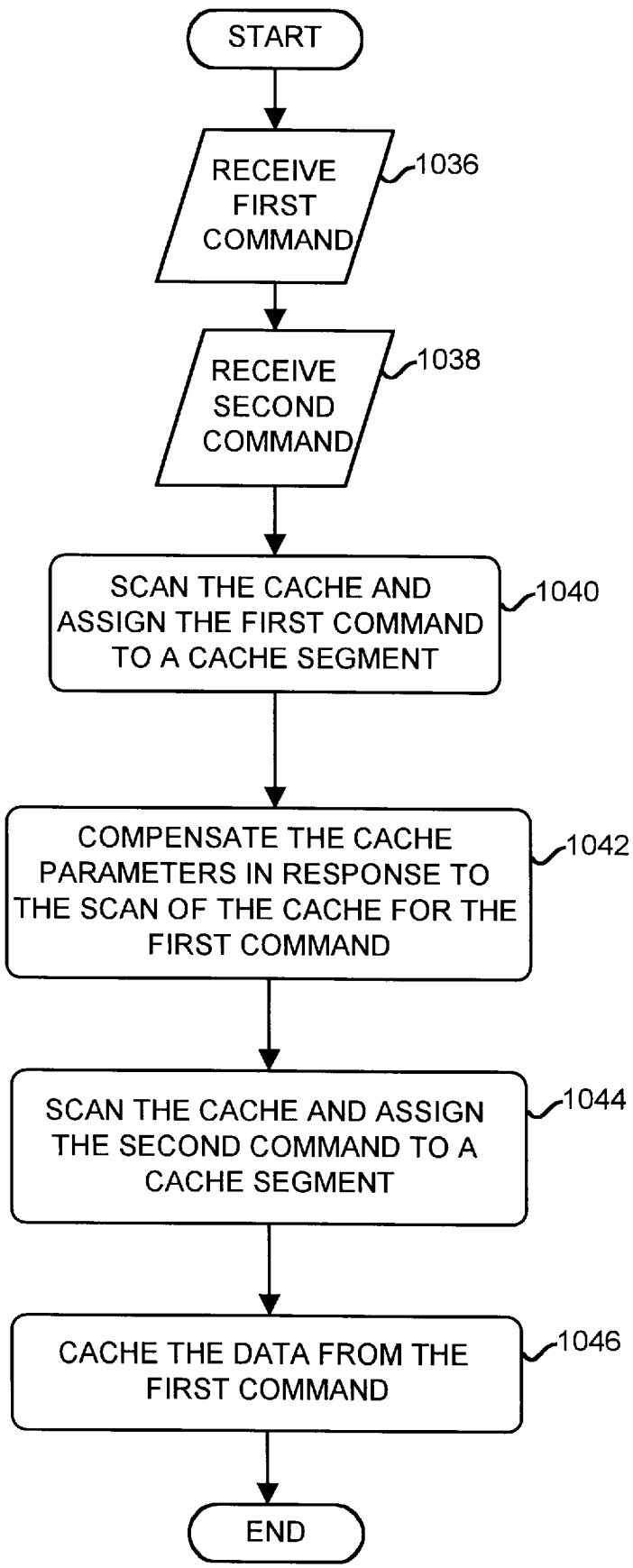
FIG. 14A shows a method of the invention to scan the cache and assign the second command to a cache segment prior to writing the cached data from a first command.

FIG. 14A shows the method of the invention to scan the cache 10 and assign the second command to a cache segment prior to caching of data from a first command. The method of the invention receives a first command in step 1036 and receives a second command in step 1038. A scan of the cache 10 is made to assign the first command to a cache segment in step 1040. In step 1042, the cache parameters are compensated in response to the scan of the cache 10 for the first command. In step 1044, the cache 10 is scanned again to assign a second command to a cache segment prior to the caching of data from the first command. In step 1046, the data is cached from the first command and the process ends.

Figure 14B:
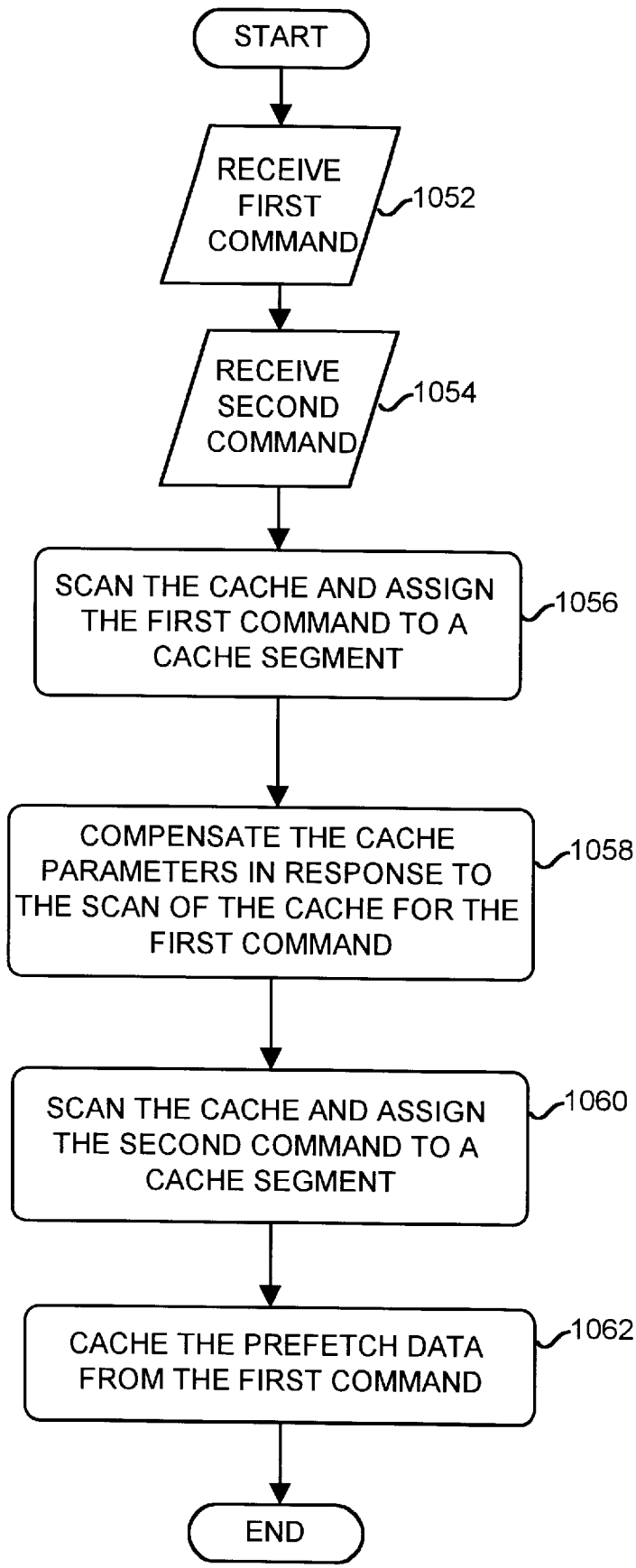
FIG. 14B shows a method of the invention to process a first command and then a second command and assign the second command to a cache segment prior to the caching of the prefetch data from the first command.

Now refer to FIG. 14B which shows a method of the invention to process a first command then a second command, scan the cache 10 and assign the second command to a cache segment prior to the caching of the prefetch data from the first command. The process starts in step 1052 to receive a first command from the host, the method receives a second command from the host in step 1054. In step 1056, the cache 10 is scanned to assign the first command to a cache segment. In step 1058, the cache parameters are compensated in response to the scan of the first command. In step 1060, the cache 10 is scanned again to assign a second command to a cache segment prior to the caching of prefetch data from the first command. In step 1062, the prefetch data is cached from the first command and the process ends.

Figure 15A:
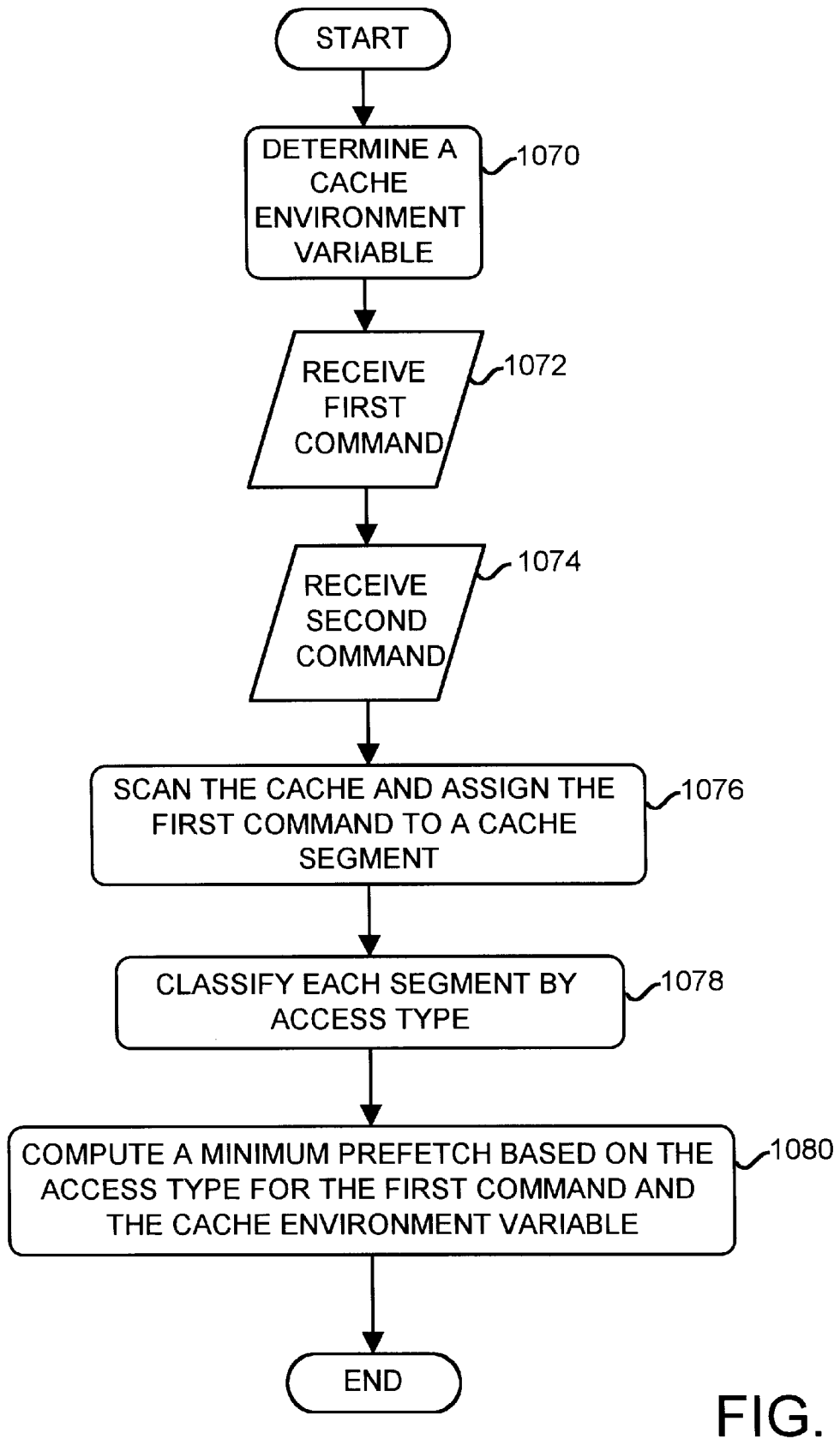
FIG. 15A shows a method of the invention to compute a minimum prefetch.

Refer now to FIG. 15A which shows a method of the invention to compute a minimum prefetch base on the access type for a first command and a cache environment variable. The method first starts at step 1070 for determining a cache environment variable. The method receives a first command in step 1072 and then receives a second command in step 1074. The cache 10 is then scanned and the first command is assigned to a cache segment in step 1076. In step 1078, each segment of the cache 10 is classified by access type. In step 1080, a minimum prefetch is computed based on the access type of the first command and the cache environment variable.

Figure 15B:
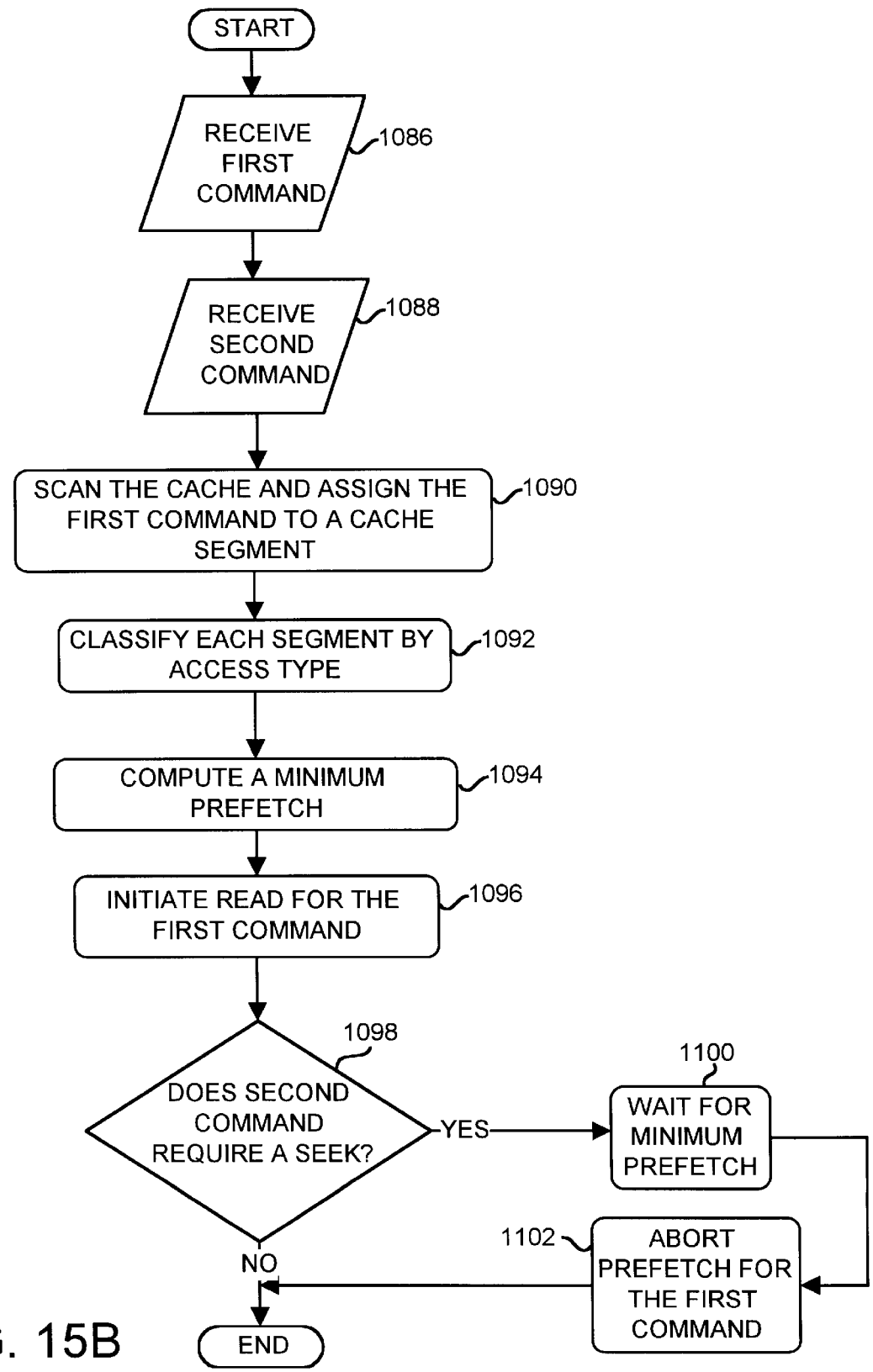
FIG. 15B shows a method of the invention to compute a minimum prefetch and wait for the minimum prefetch to complete.

Now refer to FIG. 15B which shows a method of the invention to compute and process a minimum prefetch for a command received from the host. The method starts at step 1086 by receiving a first command from the host. The disk drive 9 then receives a second command from the host at step 1088. At step 1090, the cache 10 is scanned and the first command is assigned to a cache segment. The method of the invention then classifies each segment by access type in step 1092. The method then computes a minimum prefetch for the first command in step 1094 and initiates the read for the first command in step 1096. In step 1098, a determination is made as to whether or not the second command requires a seek. If the second command requires a seek the process waits for a minimum prefetch in step 1100, then aborts the first command in step 1102. If the second command does not require a seek the process ends.

Figure 15C:
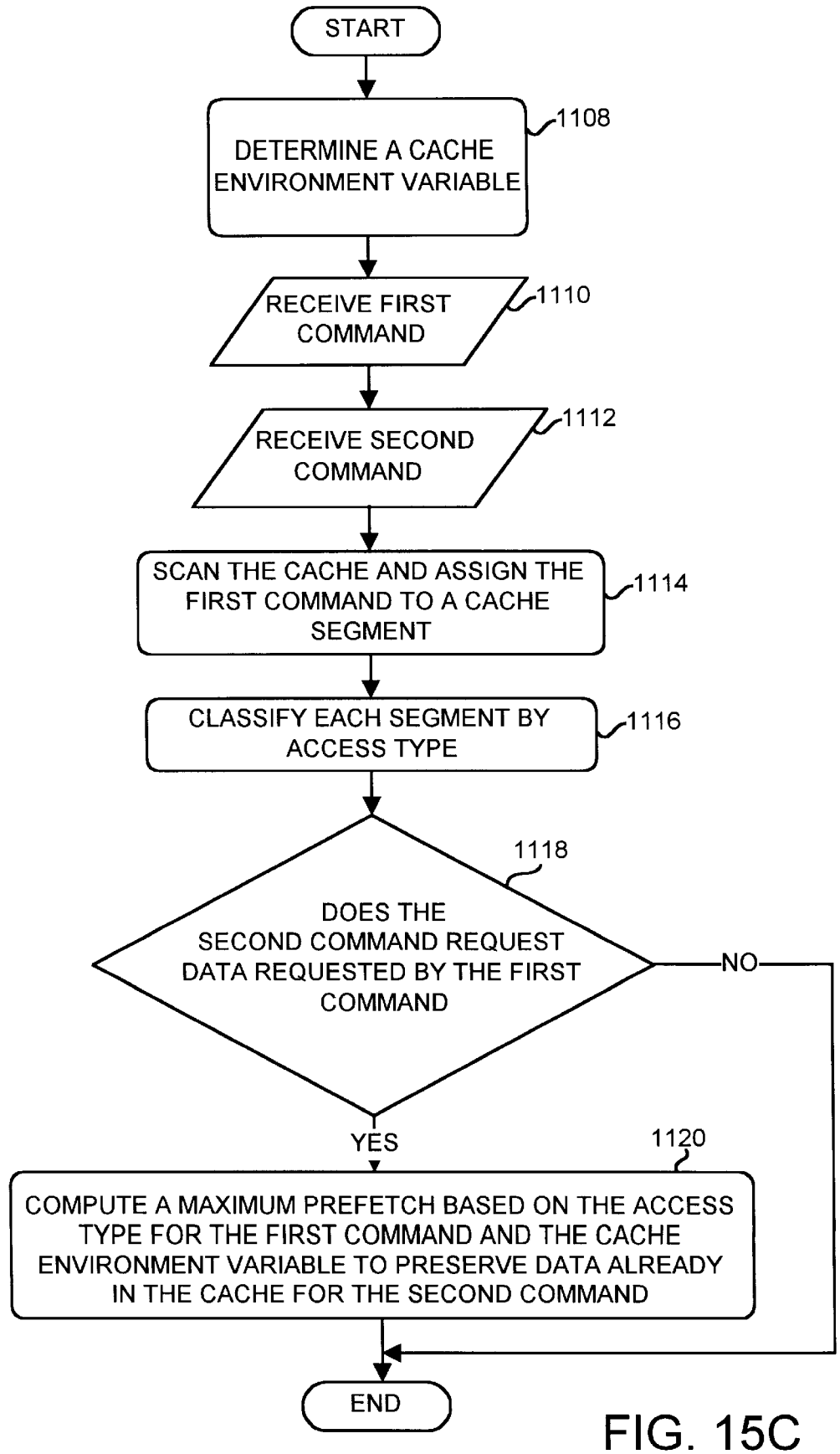
FIG. 15C shows a method of the invention to preserve data already in the cache for a second command.

Now refer to FIG. 15C which shows the method of the invention to preserve data already in the cache 10 for a second command. The method of the invention starts by determining a cache environment variable in step 1108. In step 1110, the method receives a first command and receives a second command in step 1112. The method of the invention scans the cache 10 and assigns a first command to a cache segment in step 1114. Each segment is classified by access type in segment 1116, and in step 1118, a determination is made as to whether or not the second command requests data requested by the first command. If the second command requests data requested by the first command then a maximum prefetch based on the access type for the first command and the cache environment variable is used to preserve data in the cache 10 for the second command in step 1120.

Figure 16A:
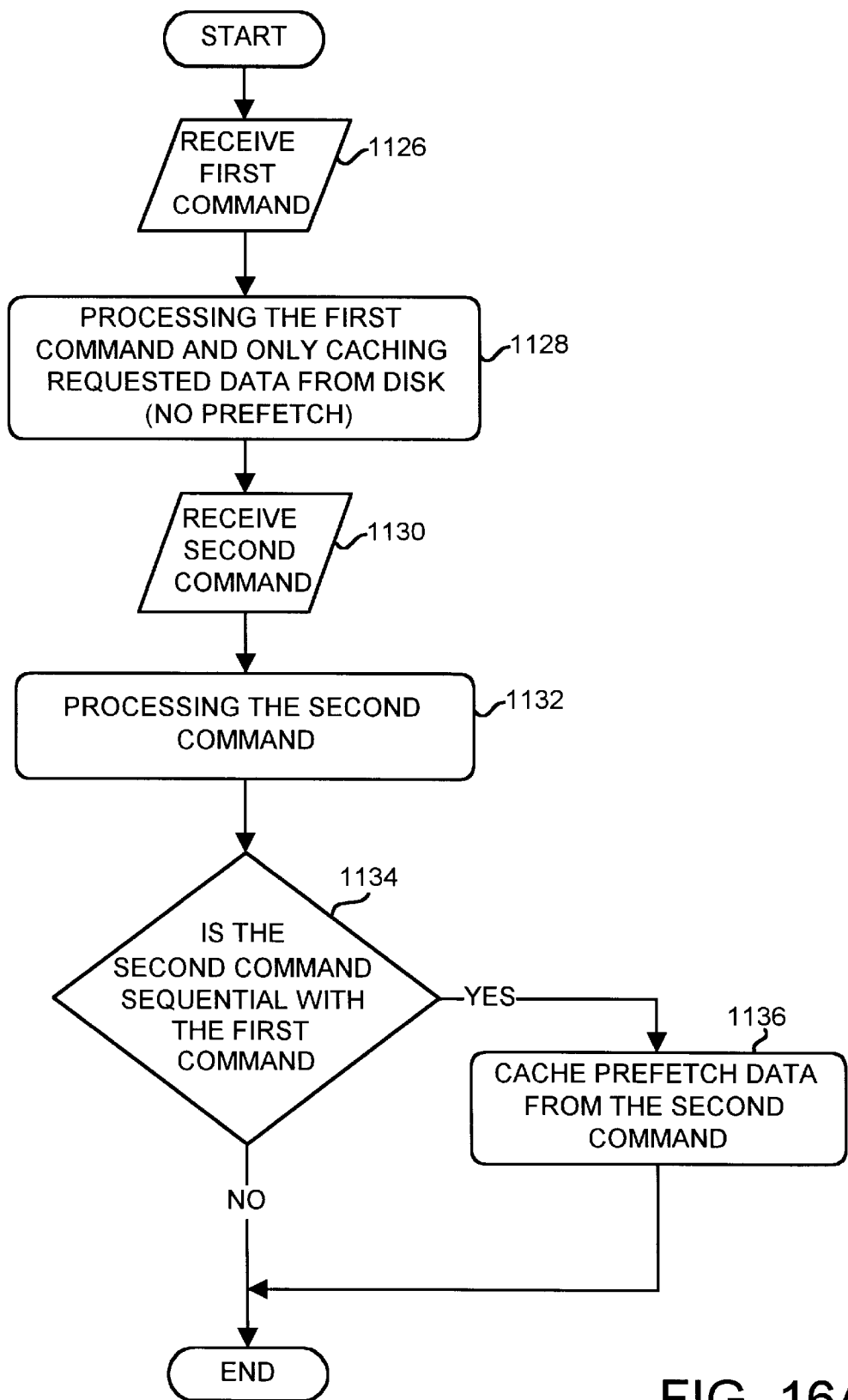
FIG. 16A shows a method of the invention for processing a sequential command.

Now refer to FIG. 16A, which shows the method of the invention for adaptively processing a command to determine if the command is a sequential or random type command. The method starts by receiving a first command in step 1126. The invention is in hyper mode at this stage of processing. The invention then processes the first command and only caches requested data from the disk with no prefetch in step 1128. The process then receives a second command in step 1130, which is assumed to be a random command, and processes the second command in step 1132. In step 1134, a determination is made as to whether or not the second command is sequential with the first command. If the second command is sequential with the first command, the process flows to step 1136 to cache prefetch data from the second command and identifies the second command as sequential. The invention also exits hyper mode because a sequential has been detected. If the second command is not sequential with the first command, the invention continues to assume that the second command is random. The invention provides adaptive hyper random mode by adapting to the command stream by exiting hyper random mode when either a cache hit is seen or a sequential command is detected. The invention defaults to hyper random mode and adaptively enters hyper random mode by following the method of FIG. 10I where hyper random mode is entered when no cache hits are detected.

Figure 16B:
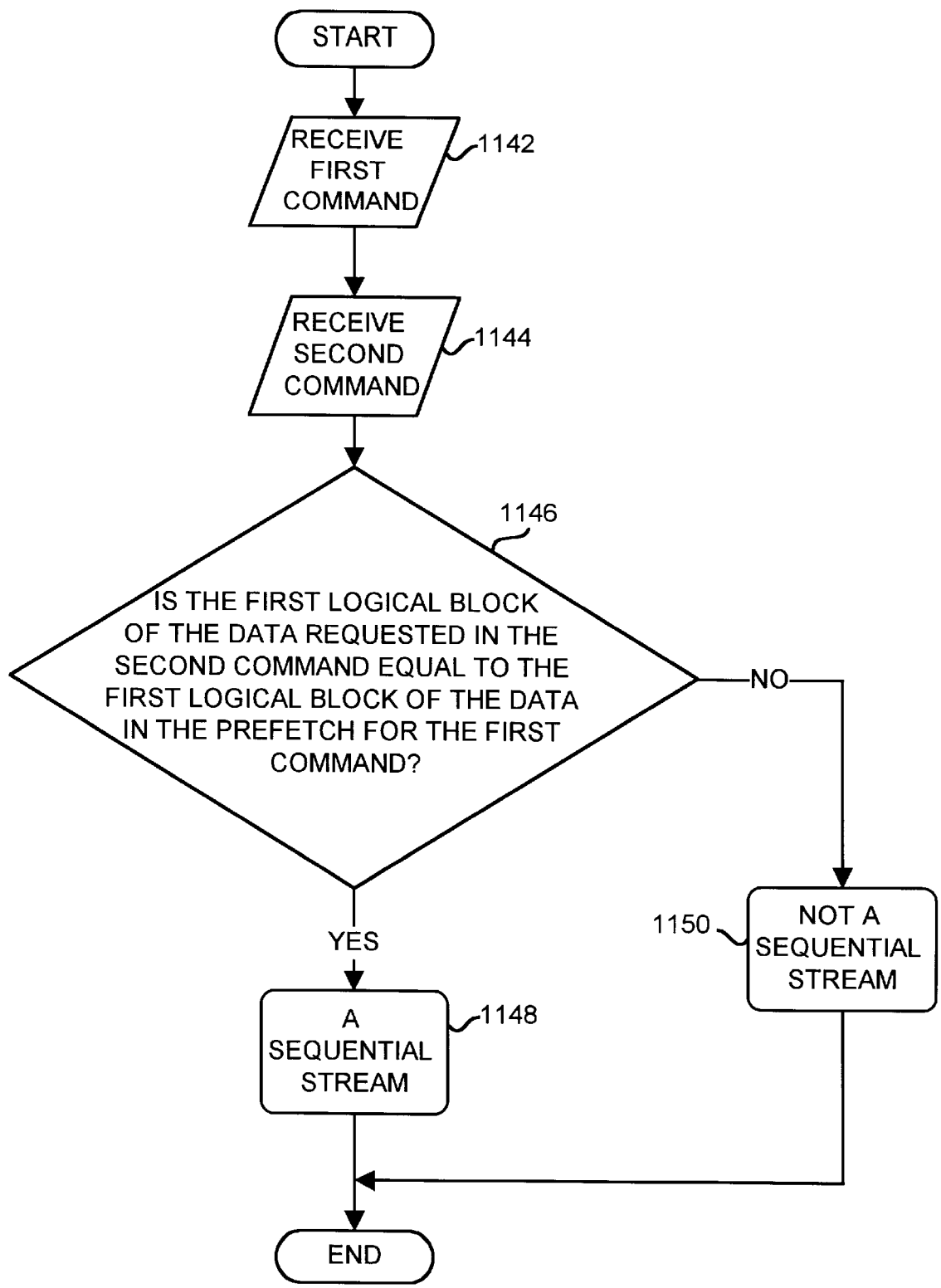
FIG. 16B shows a method of the invention to determine whether a second command is sequential with respect to the first command.

Now refer to FIG. 16B, which shows the method of the invention to determine whether a second command is sequential with a first command. The process starts by receiving a first command in step 1142, then receives a second command in step 1144. In step 1146, the method of the invention then determines if the first logical block of the data requested in the second command is equal to the first logical block of the data in the prefetch for the first command. If this condition is true the invention determines that a sequential stream has started in step 1148. If this condition is not true a sequential stream has not started in step 1150. If the environment is in hyper random mode the invention can still recognize a sequential stream. The prefetch lba is still computed as part of the cache entry structure 54 in hyper random mode even though the system is not prefetching.

Figure 17A:
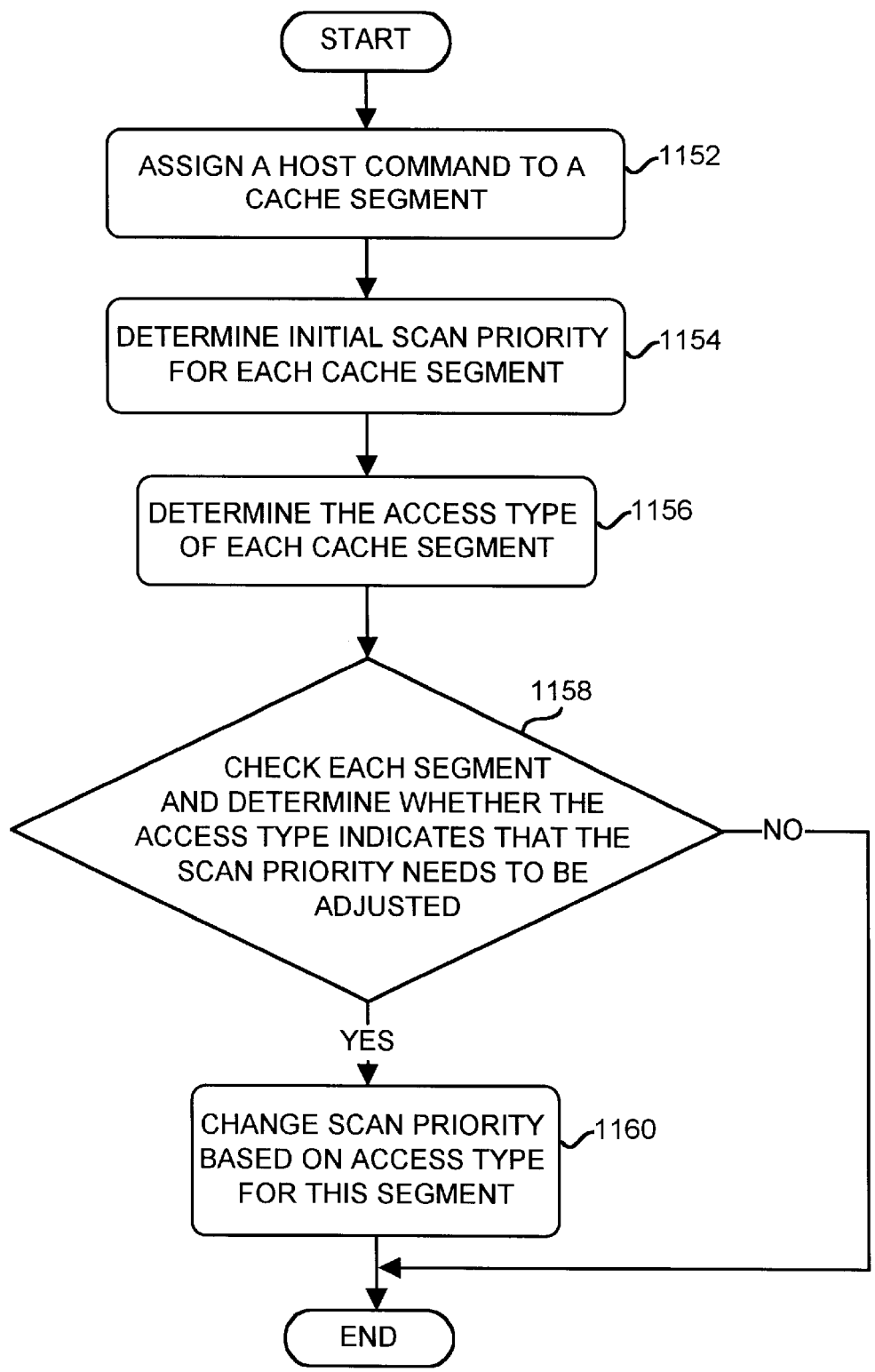
FIG. 17A shows a method of the invention to determine whether the access type of the command indicates that the scan priority needs to be adjusted for the cache segment.

FIG. 17A shows a method of the invention to determine whether the access type of the command indicates that the scan priority needs to be adjusted for the cache segments. The method starts with assigning a host command to a cache segment in step 1152. The process flows to step 1154 to determine an initial scan priority for each cache segment. The process then flows to step 1156 to determine the access type of each cache segment. The process then flows to step 1158 to check each segment to determine whether the access type indicates that the scan priority needs to be adjusted. If the scan priority needs to be adjusted the scan priority is changed based on the access type for the segment in step 1160.

Figure 17B:
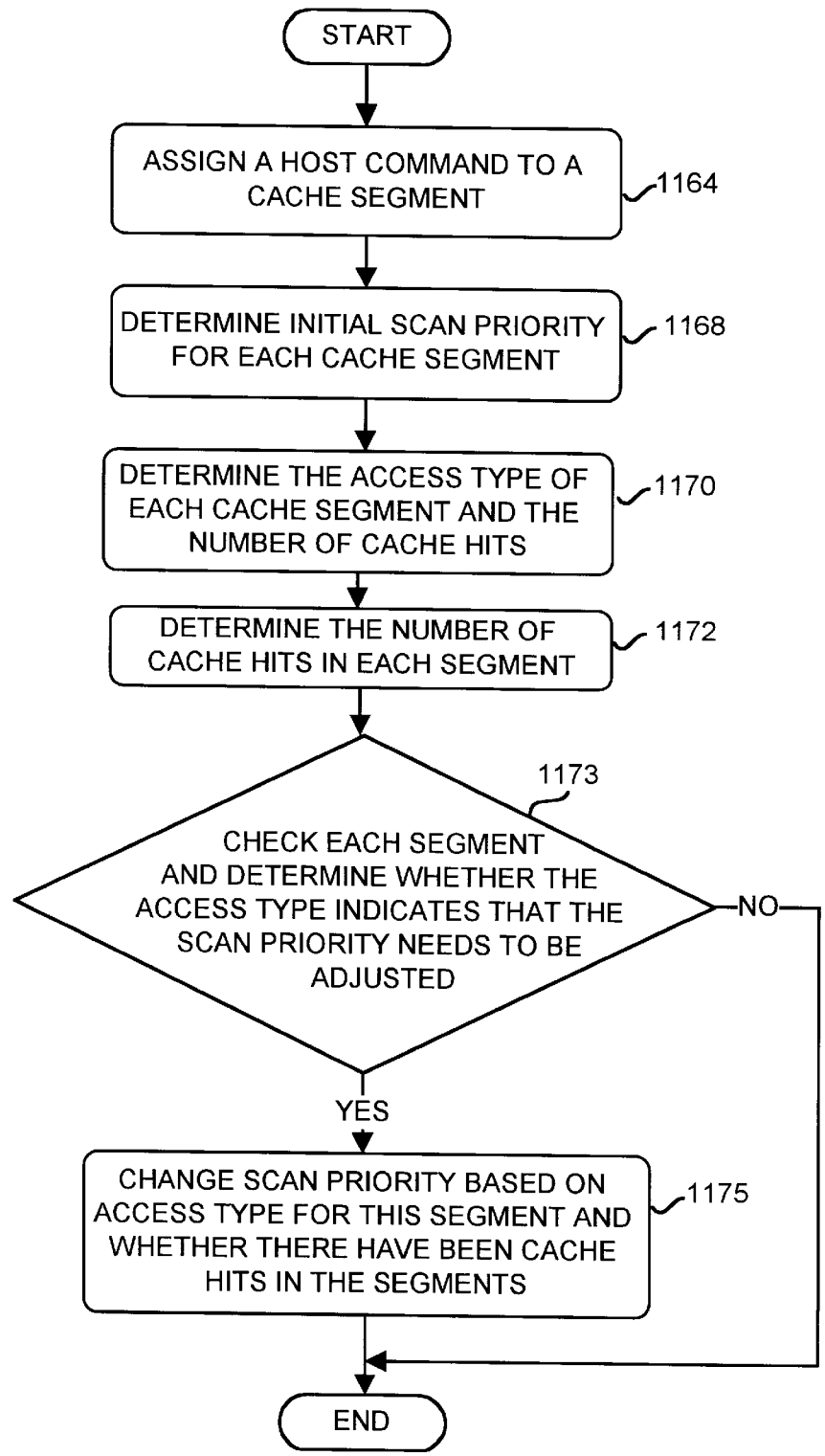
FIG. 17B shows a method of the invention to determine whether or not the access type of each cache segment indicates that the scan priority needs to be adjusted.

Now refer to FIG. 17B which shows the method of the invention to determine whether or not the access type of each cache segment indicates the scan priority needs to be adjusted. The process starts in step 1164 to assign a host command to a cache segment. The process then flows to step 1168 to determine the initial scan priority for each cache segment. The process then determines the access type of each cache segment and the number of cache hits in the segment list 52 in step 1170 after a predetermined number of commands have been processed. In step 1172, the number of cache hits in each segment is determined and in step 1173, each segment is checked to determine whether the access type indicates the segment has a scan priority that needs to be adjusted. If the scan priority needs to be adjusted the process flows to step 1175. In step 1175, the scan priority is based on the access type for the segment and whether there has been a cache hit in any segment of the cache. If the access type is sequential then the segments are determined to be proven performers.

Figure 17C:
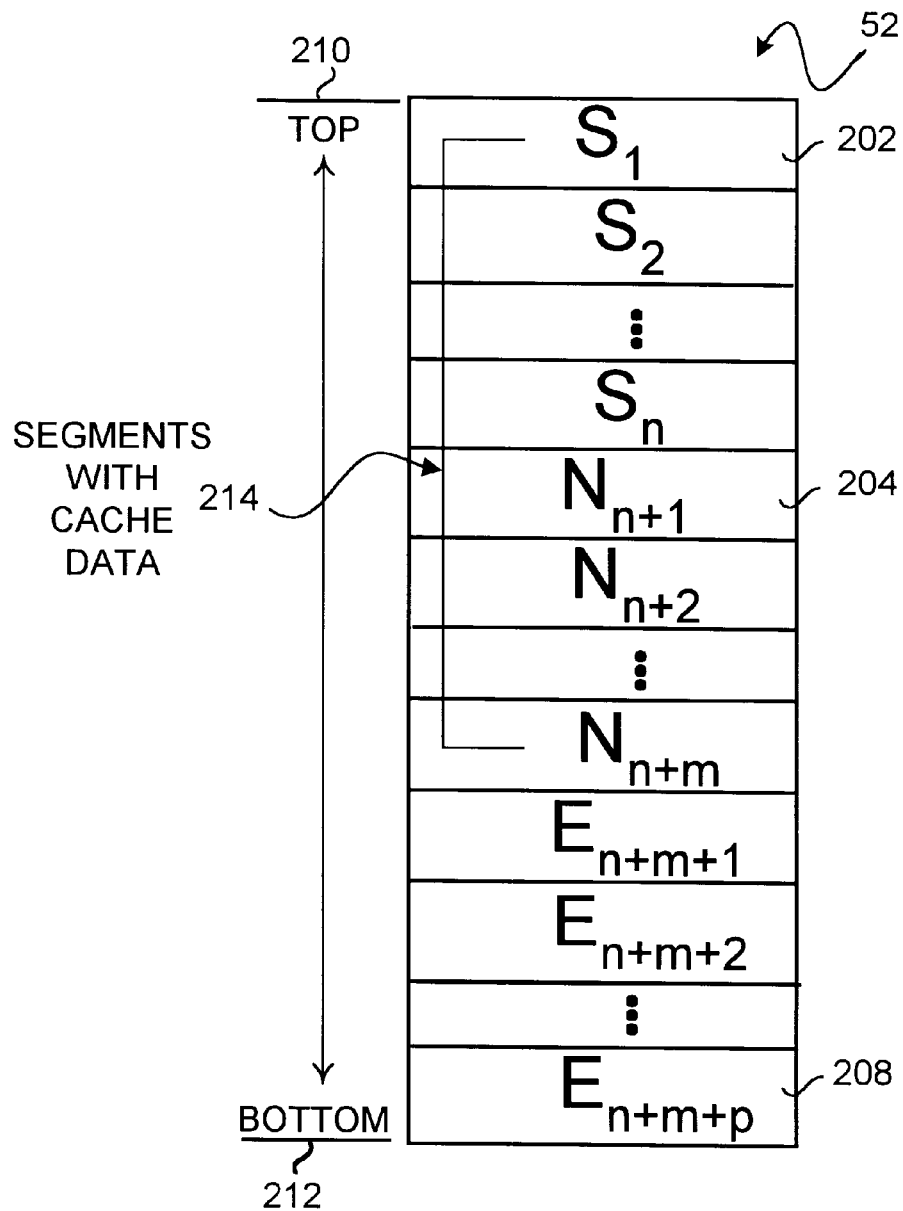
FIG. 17C shows a method of the invention to manage proven performers based on scan priority.

Now refer to FIG. 17C which shows the method of the invention to manage proven performers. Segments with cache data are shown by arrow 214. Proven performers are sequential or skip sequential segments. After a segment is assigned to a command tcb, the segment is placed on the priority list 52 either at the top of the S Segments 202, if the command is a proven performer, or at the top of the N Segments 204 if the command is not a proven performer. The S Segments 202 and N Segments 204 are in most recently used order. When segments are aged out, they are placed at the bottom 208 of the list 52, and the empty flag is set so the data in the segment is not used, making the segment available for future use. New segments are chosen from the bottom. Cache scans go from the top 210 to the bottom 212. Scans age out segments when the number of scans is greater than maxmisses. In one example, maxmisses equals the number of segments plus the number of sequentials divided by two.

Figure 18A:
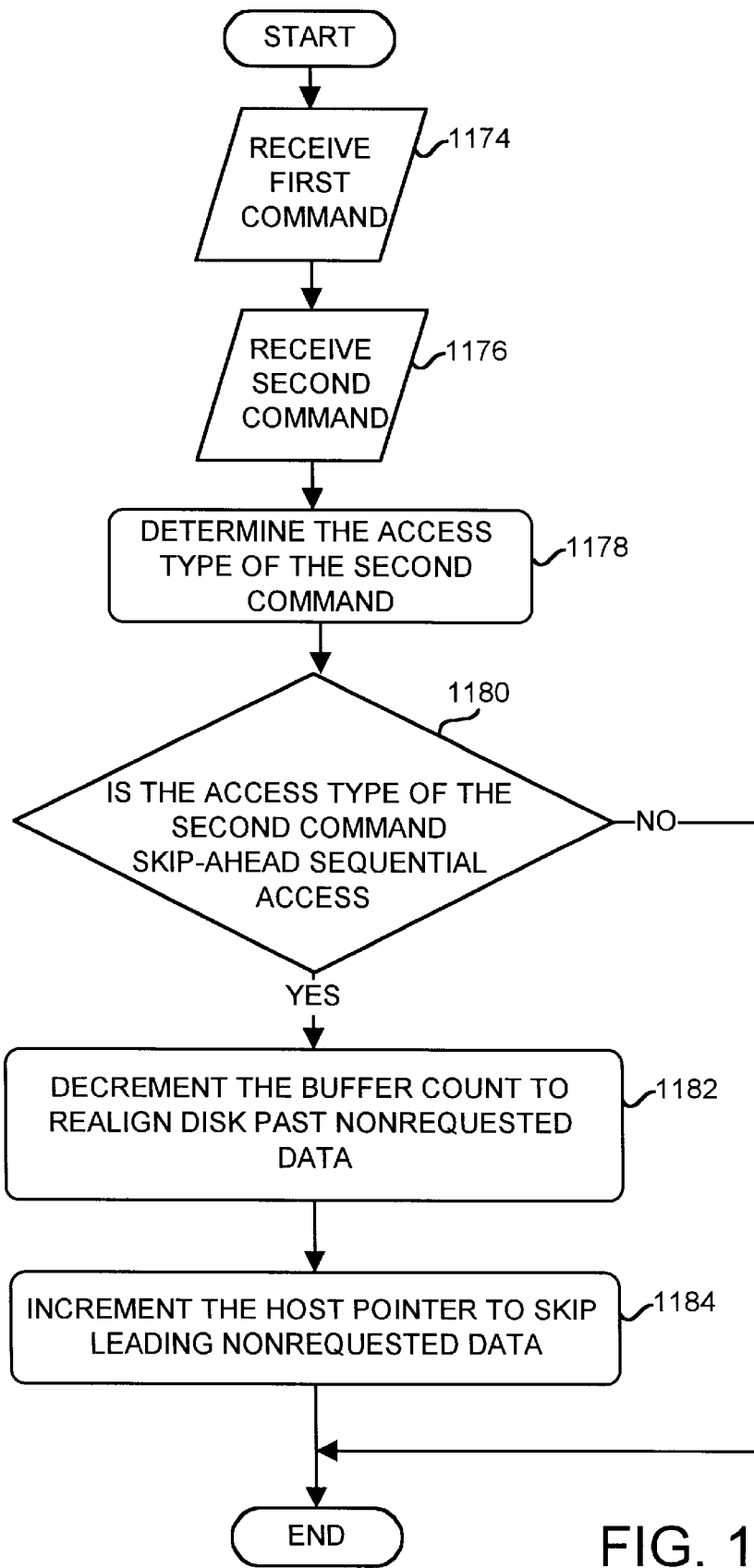
FIG. 18A shows a method of the invention to determine the disk and host pointers for a skip ahead access.

Now refer to FIG. 18A, which shows the method of the invention to determine the disk and host pointers for a skip ahead access. The process starts in step 1174 by receiving a first command and then a second command from the host in step 1176. In step 1178, the access type of the second command is determined. In step 1180, a determination is made as to whether the access type of the second command is skip ahead sequential access with respect to the first command. If the access type of the second command is skip ahead sequential access, the buffer counter is decremented to realign the disk past the nonrequested data in step 1182. The process then flows to step 1184 to increment the host pointer to skip leading nonrequested data.

Figure 18B:
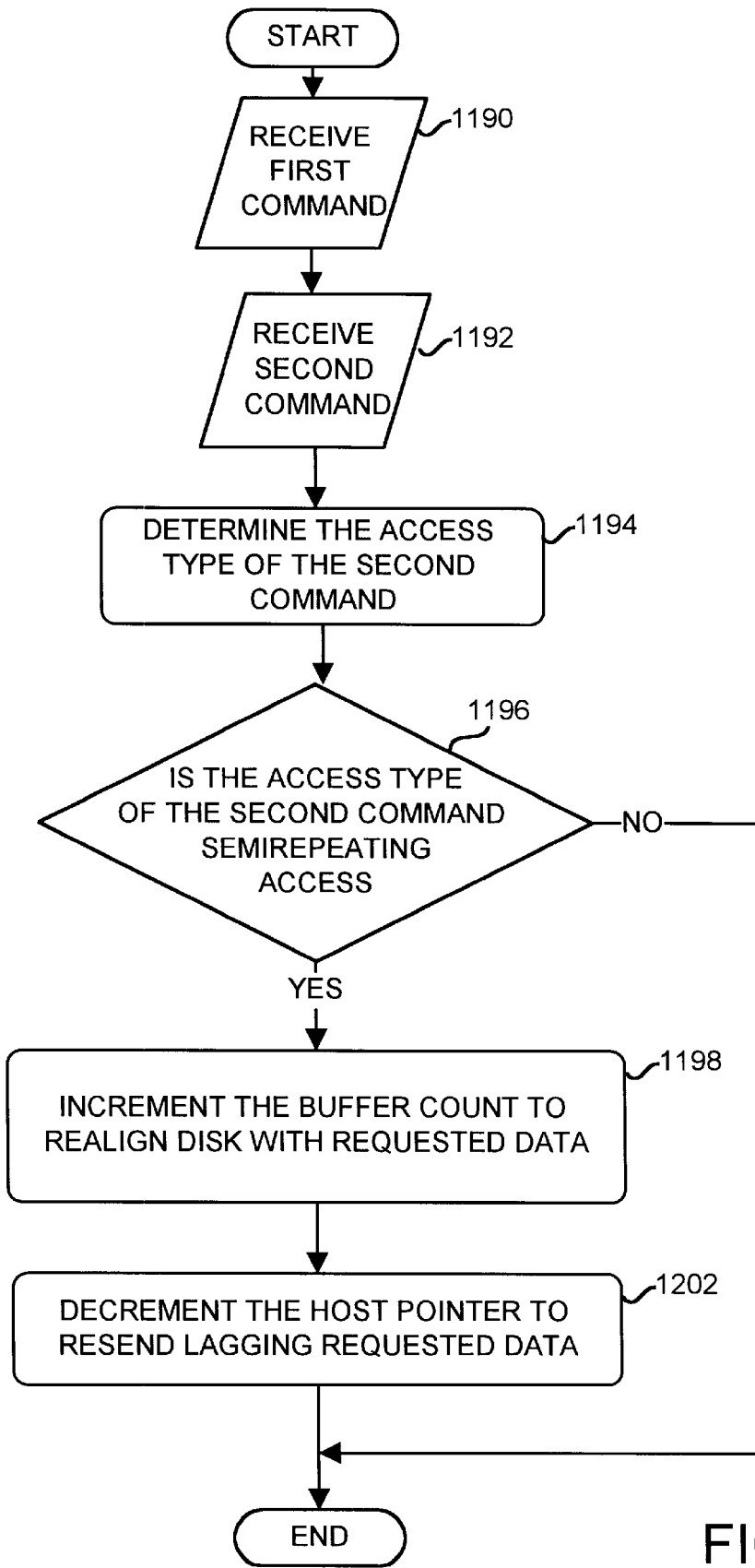
FIG. 18B shows a method of the invention to process semi-repeating access commands.

Refer now to FIG. 18B, which shows the method of the invention to process semi-repeating access commands. The process starts by receiving a first command from the host in step 1190. The process then receives a second command from the host in step 1192. In step 1194, the process determines the access type of the second command with respect to the first command. In step 1196, a determination is made as to whether or not the access type of the second command is a semi-repeating access. If the access type of the second command is semi-repeating access, the buffer counter is incremented to realign the disk with requested data in step 1198. The process then flows to step 1202, to decrement the host pointer to resend lagging requested data.

The disk drive 9 improves the throughput of I/O processes that access sequential portions of the drive's media 40. The sequential data associated with these I/O processes is accessed without the latency time of a disk revolution between each of the I/O processes.

When Read Caching is enabled, the disk drive 9 executes READ commands that request data from sequential portions of the media 40 without experiencing the latency time of a disk revolution between each of the READ commands.

When Write Caching is enabled, the disk drive 9 accumulates the data from write commands that write data to sequential portions of the media 40. The disk drive 9 writes sequential data to the media 40 without experiencing the latency time of a disk revolution between each of the WRITE commands.

The disk drive 9 retains or discards data in the cache segments according to several criteria, including a least-recently-used method, and the manner in which the data is being accessed.

When Write Caching is disabled and the initiator 50 queues WRITE commands to the disk drive 9, the disk drive 9 accumulates the data from WRITE commands that write data to sequential portions of the media 40. This requires the disk drive 9 to start the data phase on subsequent WRITE commands prior to sending status on the previous WRITE command. The disk drive 9 writes the data from these I/O processes to the media 40 without the latency time of a disk revolution between each of the WRITE commands. Once the data associated with a particular I/O process has been written to the media 40, the disk drive 9 returns status for that I/O process.

The disk drive 9 of the invention may be used with both tagged and untagged queuing. Untagged queuing is the ability of the disk drive 9 to receive at most one I/O process from each initiator. Tagged queuing is the ability of the disk drive 9 to receive multiple I/O processes from each initiator.

TABLE 9

MODE SELECT Caching Page(08h)

| Byte | Bit 7 | 6 | 5 | 4 | 3 | 2 | 1 | 0 |
|---|---|---|---|---|---|---|---|---|
| 0 | RSVD | | | Page Code = 08h | | | | |
| 1 | Page Length = 12h | | | | | | | |
| 2 | Reserved | | | | WCE | MF | RCD | |
| 3 | Demand Read Retention | | | | Write Retention Priority | | | |
| 4 | (MSB) | | | Disable pre-fetch Transfer Length | | | | |
| 5 | (LSB) | | | | | | | |
| 6 | (MSB) | | | Minimum pre-fetch | | | | |
| 7 | | | | | | | | (LSB) |
| 8 | (MSB) | | | Maximum pre-fetch | | | | |
| 9 | | | | | | | | (LSB) |
| 10 | (MSB) | | | Maximum pre fetching Ceiling | | | | |
| 11 | | | | | | | | (LSB) |
| 12 | Reserved | | | | | | | |
| 13 | Number of Cache Segments | | | | | | | |
| 14 | (MSB) | | | Reserved | | | | |
| 15 | | | | | | | | (LSB) |
| 16 | Reserved | | | | | | | |
| 17 | (MSB) | | | | | | | |
| 18 | Reserved | | | | | | | |
| 19 | | | | | | | | (LSB) |

The cache system of the invention interfaces to a Small Computer System Interface (SCSI) through an implementation of a mode page parameter. The mode select caching page, 08h, is shown in Table 9. This allows users of the caching system to adjust the operation of the cache 10 by setting the mode page parameters. For example, the initiator may set these parameters to customize the caching system.

The WCE, Write Cache Enable, bit is used in the command manager and host read/write to decide if status is sent as soon as the data is received for write commands. The command manager makes the decision based on the WCE flag whether status will be automatically sent by the host programs to the host after write data has been successfully received into the cache.

The MF, Multiplication Factor, bit is used by the caching system when calculating the prefetch. ComputePrefetch uses the MF bit to determine how to use the Mode Page 8 parameters Minimum Prefetch, Maximum Prefetch, and Maximum Prefetch Ceiling. If the MF bit is set, ComputePrefetch multiplies the block count of the current command by min and max prefetch and checks that they are not greater than max prefetch ceiling.

The RCD, Read Cache Disable, bit is used by the caching system to disable read caching. If RCD is set, disabled=True, the number of segments is set to one when Mode Page 8 Number of Segments is zero. Prefetch is disabled by setting the minimum and maximum prefetch values to zero or when RCD is set. Cache scans for both reads and writes are disabled when RCD is set, since no data is saved in the buffer.

Minimum Prefetch and Maximum Prefetch are used by the caching system of the invention when calculating the prefetch. Exclusive of adaptive caching, these parameters are the values that will be returned as the results of ComputePrefetch.

Maximum Prefetch Ceiling is used in conjunction with the MF bit in the caching system to limit the result of the calculated prefetch values in ComputePrefetch.

Number of Cache Segments is used by the caching system of the invention to set the number of segments during InitCache.

The disk drive 9 alters the execution of commands based on the way data is being accessed to maximize the overlap of processes in the disk drive 9. This maximizes performance through the execution of internal processes in parallel.

If the Number of Cache Segments is zero and read caching is enabled, the disk drive 9 adaptively determines the number of segments to use for optimal performance. The disk drive 9 also keeps or discards segments according to how the data is being accessed.

If the Minimum prefetch is set to FFFFh, adaptive minimum prefetch is enabled, the minimum amount of prefetch is adjusted to retain or discard data as required to maximize cache hit ratios.

If the Maximum prefetch is set to FFFFh, adaptive maximum prefetch is enabled, the maximum amount of prefetch is adjusted to retain or discard data as required to maximize cache hit ratios.

The read caching function is controlled by the following Caching Page 8 parameters: Multiplication Factor (MF), Read Cache Disable (RCD), Minimum prefetch, Maximum prefetch, Maximum prefetch Ceiling, and Number of Cache Segments. When read caching is enabled, the disk drive 9 may perform a prefetch following any read operation in which the media 40 was accessed. In one example embodiment prefetch amount is limited as follows.

The Maximum prefetch Ceiling limits the calculated prefetch when the MF bit is on.

The disk drive 9 does not prefetch more than the number of blocks in a cache data segment.

The prefetch is aborted if another command is received before the prefetch has completed, but only after at least Minimum prefetch blocks have been read.

The prefetch is aborted if the end of the media 40 is encountered.

The prefetch is aborted if an error is encountered.

Write caching on the disk drive 9 is controlled by the following Caching Page 8 parameters: Write Cache Enable (WCE), Read Cache Disable (RCD), and Number of Cache Segments.

When write caching is enabled, the disk drive 9 may return GOOD status for the WRITE command after successfully receiving the data into the cache 10 and before the data is written to the media 40. If an error occurs for a cached write operation after status has been returned, the error will be handled as a deferred error. Write Cache Enable (WCE) may be set if write caching is desired.

If write caching is not enabled, the data must be successfully written to the media 40 before GOOD status can be returned.

When read caching is enabled, the write data may be preserved in the cache 10 so that the data is available for subsequent read cache hits.

Cached data is written to the media 40 prior to performing the required actions in response to a SCSI bus reset. This "Safe" Write Caching implementation ensures that data received for write commands while write caching is enabled, will be written to the media 40 regardless of SCSI bus reset interruptions.

In most cases, adaptive caching should be the preferred mode of use for the disk drive 9. This is because the disk drive 9 has the ability to determine the environment in which it is being used and adjusts the way it is handling commands and data.

Adaptive caching on the disk drive 9 is affected by the following Caching Page 8 parameters: Multiplication Factor (MF), Read Cache Disable (RCD), Minimum pre-fetch, Maximum pre-fetch, Maximum pre-fetch Ceiling, and Number of Cache Segments.

As explained above, the invention allows the operation of the cache to be affected by the setting in a Mode select Caching Page. The mode select caching page defines the parameters that affect the use of the cache. Parameters used in this page may be altered based on the type of operation for the optimization of read/write performance. A summary of each parameter follows.

WCE: The WCE (Write Cache Enable) bit controls whether caching is enabled for WRITE commands. A value of 1 h specifies that the disk drive 9 may return a GOOD status for a WRITE command after successfully receiving the data and prior to having written the data to the disk drive media 40. A value of 0 h specifies that the disk drive 9 will not return a GOOD status for a WRITE command until the data has been successfully written to the disk drive media 40.

MF: The MF (Multiplication Factor) bit determines how the Minimum and Maximum prefetch values are calculated. If this bit has a value of 1 h, both the Minimum and Maximum prefetch values are multiplied by the number of logical blocks to be transferred in the current command. If this bit has a value of 0 h, both the Minimum and Maximum prefetch values indicate the number of logical blocks for the prefetch.

RCD: The RCD (Read Cache Disable) bit value of 0 h indicates that the disk drive 9 may return data requested for a READ or READ EXTENDED command by accessing either the cache 10 or media 40. A value of 1 h indicates that all data returned for a READ or READ EXTENDED command must be transferred from the media 40.

Minimum prefetch: This field indicates the lower limit on the number of blocks to prefetch after a READ or READ EXTENDED command. The value of 0 h indicates that prefetching is terminated whenever another command is ready for executing. A value of FFFFh indicates that the disk drive 9 self-adapts and optimizes the minimum prefetch. Any other value indicates the number of blocks prefetched following a read operation; these will not be preempted by a subsequent command. Other factors, such as segment size and an end of media 40 condition, may also limit the prefetch.

Maximum prefetch: This field indicates an upper limit on the number of blocks to prefetch after a READ or READ EXTENDED command. A value of FFFFh indicates that the disk drive 9 self-adapts and optimizes the Maximum prefetch. Other factors, such as segment size, an end of media 40 condition, commands in the queue, and new commands may also limit the prefetch.

Maximum prefetch Ceiling: If the MF bit is set to a value of 1 h, this field limits the number of blocks computed as the Minimum and Maximum prefetch values.

Number of Cache Segments: This field indicates the number of data buffer cache segments for which the disk drive 9 is configured. In one embodiment the disk drive 9 supports up to 16 segments. The value entered in this field is rounded down to the nearest power of two. A value of 0 h indicates that the disk drive 9 self-adapts and optimizes the number of segments.

I claim:

1. In a disk drive having an intelligent interface for communicating with a host, a magnetic disk, and a cache wherein the cache is divisible into a number of segments, wherein the cache employs a cache control structure including a cache environment variable to indicate each of a plurality of modes including a hyper random mode and a sequential mode, wherein the disk drive receives from the host a first command and a second command that each requests data, a method for managing commands from the host comprising the steps of:

a) adapting to the commands such that the cache control structure adaptively enters hyper random mode and exits hyper random mode when either a cache hit occurs or a sequential command is detected;

b) processing the first command and caching only the requested data from the disk drive; and c) processing the second command and caching prefetched data for the second command if the second command is determined to be sequential with the first command.

2. The method of claim 1, wherein the first command requests data with a logical block address range and wherein the second command requests data with a starting logical block address, further comprising the step of determining the second command to be sequential with the first command by checking if the starting logical block address is contiguous with the logical block address range.

3. The method of claim 1 further comprising the step of initializing the cache environment variable to a hyper random mode which indicates that commands from the host are random.

4. The method of claim 1 further comprising the step of changing the cache environment variable to sequential mode after the second command is determined to be sequential with the first command.

5. The method of claim 1 wherein the step of adapting to the commands from the host further comprises the step of entering hyper random mode when no cache hits are detected.

6. The method of claim 5 wherein a sequential command is detected by checking if a first logical block of the data requested in a subsequent command is equal to a first logical block of data in a prefetch area for a prior command.

7. The method of claim 1 wherein the cache environment variable is in hyper random mode further comprising the step of recognizing a sequential stream.

8. The method of claim 1 wherein the cache environment variable is in hyper random mode further comprising the step of computing a prefetch logical block address even though no prefetching is being done.

9. In a disk drive having an intelligent interface for communicating with a host wherein the host sends a plurality of commands to the disk drive, a magnetic disk, disk side programs, and a cache wherein the cache is divisible into a number of segments, wherein the cache employs a cache control structure including a cache entry table, a token that allows use of the disk side programs, a method for processing multiple commands from the host comprising the steps of:

a) selecting a first command from the plurality of commands and providing a host pointer;

b) adjusting the cache control structure for the first command by:

1) adjusting the host pointer to track data being transferred to or from the host; and 2) determining a segment of the cache to allocate to the first command by:

a) selecting a segment from the number of cache segments that is not active or is empty;

b) waiting for a minimum prefetch to complete;

c) waiting for a write operation to complete;

d) checking for a cache hit in the segment e) if there is a cache hit checking a hit count and setting the cache entry table for a virtual hit if the hit count equals zero;

f) if there is not a cache hit setting up the cache entry table for a new access; and g) resetting a scan count and activating the segment;

c) obtaining the token for disk usage;

d) starting data transfer to the host if the first command is a read command and starting data transfer from the host if the first command is a write command;

e) determining a future state of the cache and adjusting the cache control structure to reflect the future state of the cache;

f) selecting a next command from the plurality of commands; and g) trying to start the next command before the first command completes.

10. The method of claim 9 wherein the plurality of commands from the host are represented by a command descriptor block following the SCSI standard.

11. The method of claim 9 wherein the first command is represented by a task control block.

12. The method of claim 11 wherein the task control block comprises a segmentOffset, representing how far into a segment the start of the requested data begins, a block size, representing the number of bytes in a block, a xferCount, representing the number of bytes being transferred by the host programs to or from the cache, xferOffset, representing where in the cache the bytes are being transferred to or from, and a segmentNumber, representing the segment being transferred.

13. The method of claim 12 wherein the host pointer is an internal variable in the host side programs and is controlled by setting the xferOffset variable in the task control block structure.

14. The method of claim 9 wherein the token allows data transfer to and from the magnetic disk.

15. The method of claim 9 further comprising the step of returning to step a) to process a third command.

* * * * *